(12) United States Patent
Franquin et al.

(10) Patent No.: US 12,287,893 B2
(45) Date of Patent: Apr. 29, 2025

(54) DATA GOVERNANCE SYSTEMS AND METHODS

(71) Applicant: Ab Initio Technology LLC, Lexington, MA (US)

(72) Inventors: Pierre Franquin, Lexington, MA (US); Ken Krigelman, Lexington, MA (US); Andrew Schon, Lexington, MA (US); Justin Voshell, Lexington, MA (US)

(73) Assignee: Ab Initio Technology LLC, Lexington, MA (US)

( * ) Notice: Subject to any disclaimer, the term of this patent is extended or adjusted under 35 U.S.C. 154(b) by 228 days.

(21) Appl. No.: 17/834,492

(22) Filed: Jun. 7, 2022

(65) Prior Publication Data

US 2022/0398337 A1 Dec. 15, 2022

Related U.S. Application Data

(60) Provisional application No. 63/295,693, filed on Dec. 31, 2021, provisional application No. 63/210,951, filed on Jun. 15, 2021.

(51) Int. Cl.
G06F 16/28 (2019.01)
G06F 16/2455 (2019.01)
G06F 21/62 (2013.01)

(52) U.S. Cl.
CPC .... *G06F 21/6218* (2013.01); *G06F 16/24564* (2019.01); *G06F 16/287* (2019.01)

(58) Field of Classification Search
CPC ............... G06F 21/6218; G06F 16/287; G06F 16/24564

USPC ........................................................ 707/758
See application file for complete search history.

(56) References Cited

U.S. PATENT DOCUMENTS

| | | | | |
|---|---|---|---|---|
| 9,558,260 | B1* | 1/2017 | Halberstadt | G06F 16/24564 |
| 10,521,442 | B1* | 12/2019 | Gatchell | G06F 16/2474 |
| 10,565,236 | B1* | 2/2020 | Barday | G06F 15/76 |
| 2016/0026819 | A1* | 1/2016 | Malik | G06F 21/6218 |
| | | | | 726/1 |

(Continued)

OTHER PUBLICATIONS

PCT/US2022/032485, Sep. 2, 2022, International Search Report and Written Opinion.

(Continued)

*Primary Examiner* — Joshua Bullock
(74) *Attorney, Agent, or Firm* — Wolf, Greenfield & Sacks, P.C.

(57) ABSTRACT

Some embodiments relate to a method for use in connection with governance of a plurality of data assets managed by a data processing system, the method comprising: using at least one computer hardware processor to perform: accessing a data governance policy comprising a first data standard (e.g., by obtaining information about the first standard stored in a database system); generating a first data asset collection at least in part by automatically selecting, from among the plurality of data assets managed by the data processing system and using at least one data asset criterion, one or more data assets that meet the at least one data asset criterion; associating the first data asset collection with the first data standard; and verifying whether at least one of the one or more data assets in the first data asset collection complies with the first data standard.

20 Claims, 29 Drawing Sheets

(56) References Cited

U.S. PATENT DOCUMENTS

| | | | | |
|---|---|---|---|---|
| 2018/0336264 A1* | 11/2018 | Barday | ................ | H04L 67/306 |
| 2019/0108359 A1* | 4/2019 | Malik | ................ | G06F 21/6218 |
| 2019/0156041 A1* | 5/2019 | Levy | .................... | G06F 21/577 |
| 2019/0188294 A1* | 6/2019 | Mackenthun | .......... | G06Q 10/10 |
| 2020/0134083 A1* | 4/2020 | Elliman | ............... | G06F 3/0482 |
| 2021/0256161 A1* | 8/2021 | Barday | .................. | G06F 15/76 |
| 2022/0391380 A1* | 12/2022 | Raghavan | ............... | G06F 21/31 |
| 2022/0398337 A1* | 12/2022 | Franquin | ............... | G06F 16/287 |
| 2023/0297596 A1* | 9/2023 | Sun | ...................... | G06F 16/285 |
| | | | | 707/740 |

OTHER PUBLICATIONS

International Search Report and Written Opinion for International Application No. PCT/US2022/032485 mailed Sep. 2, 2022.
Helvoirt et al., Operationalizing data governance via multi-level metadata management. International Federation for Information Processing. Oct. 13, 2015:160-72.

* cited by examiner

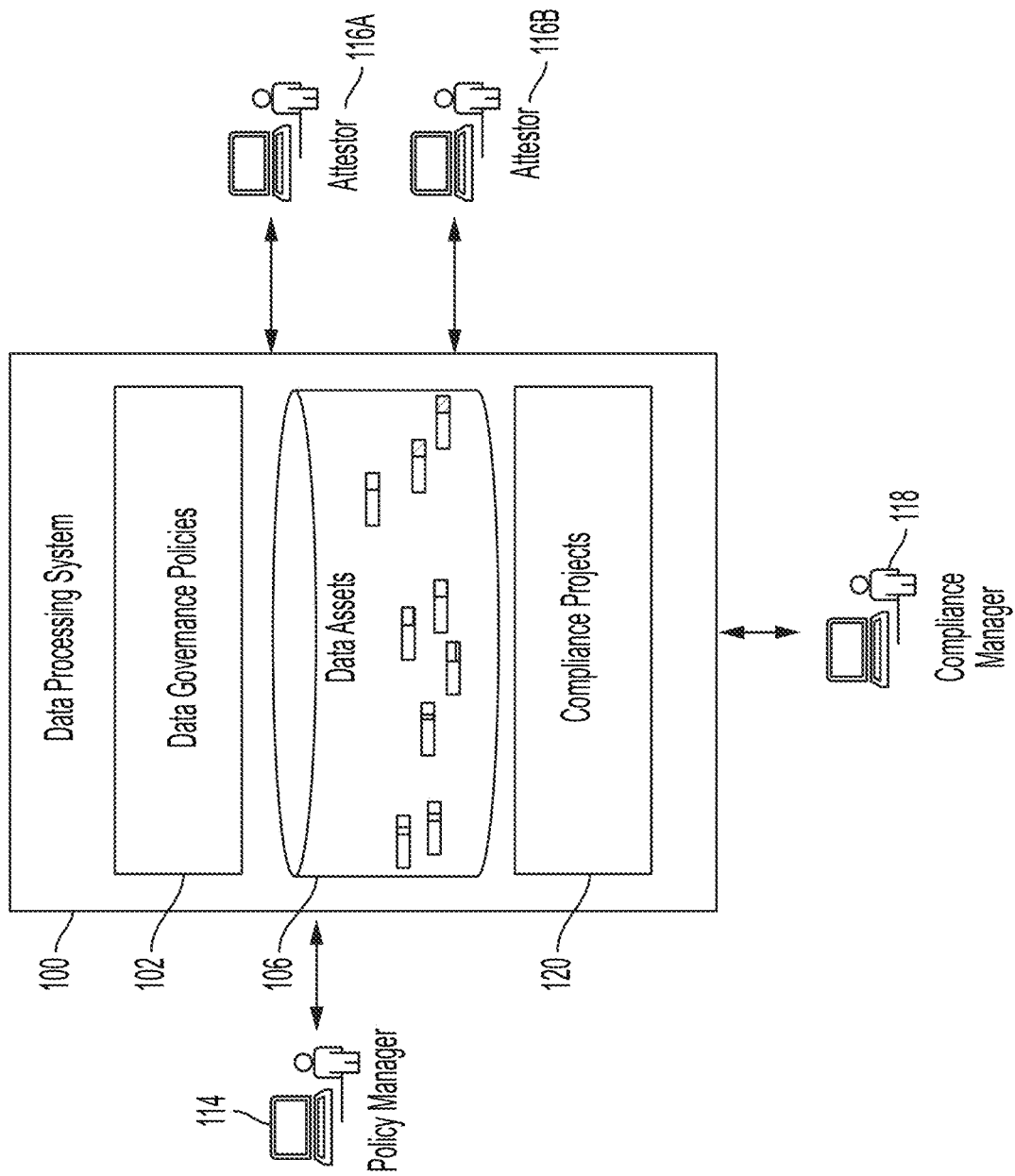

COMPLIANCE PROJECT  Quarterly Data Handling Review

○ Info

GENERAL INFORMATION

Name  Quarterly Data Handling Review — 1402

Description
Examine current data handling practices for governed data sets and attest to the observed level of compliance with governing — 1404
policies.

Start Date 6/1/2021 — 1406
Due Date 6/15/2021

Data Standards

Versions

Permissions

ADDITIONAL INFORMATION — 1407

Project Owner  Dianna R. Porras

TAGS  [Edit]
No tags assigned

COMPLIANCE REVIEWS

| Name | Description | Standard | Asset | Status |
|---|---|---|---|---|
| Customer PII/PHI Data Handling | Ensure that data labeled as PII/PHI does indeed contain PII/PHI data and that it is labeled with the correct level value. | 002: Must indicate PII/PHI Content | | [Meets standard? No 1/15 (6.67%)] |

COMPLIANCE REVIEW  🗂 Customer PII/PHI Data Handling

ⓘ Info
🎖 Data Standards
🕘 Versions
🔒 Permissions

TAGS  [✎ Edit]
No tags assigned

GENERAL INFORMATION

Compliance Project 🎖 Quarterly Data Handling Review —— 1502
Name 🗂 Customer PII/PHI Data Handling —— 1504
Description
Ensure that data labeled as PII/PHI does indeed contain PII/PHI data and that is labeled with the correct level value —— 1506
Start Date 6/1/2021
End Date 6/15/2021 —— 1508

ADDITIONAL INFORMATION

Project Owner 👤 Dianna R. Porras —— 1507
Review Owner

STANDARD UNDER REVIEW 🎖 002: MUST INDICATE PII/PHI CONTENT —— 1510

| Attestations | Assets —— 1514 | Meets Standard? —— 1516 |
|---|---|---|
| ☐ ATTESTATION-77 | 🗂 Account Holder's Date of Birth | Undefined |
| ☐ ATTESTATION-76 | 🗂 Account Holder's Full Name | Undefined |
| ☐ ATTESTATION-81 | 🗂 Customer Credit Card number | Undefined |
| ☐ ATTESTATION-78 | 🗂 Customer Date of Birth | Undefined |
| ☐ ATTESTATION-80 | 🗂 Customer Mobile Phone Number | Undefined |
| ☐ ATTESTATION-82 | 🗂 Customer Social Security Number | Undefined |
| ☐ ATTESTATION-87 | 🗂 Customer SSN | Undefined |
| ☐ ATTESTATION-89 | 🗂 Customer SSN | Undefined |
| ☐ ATTESTATION-90 | 🗂 Customer SSN | Undefined |
| ☐ ATTESTATION-85 | 🗂 Customer SSN | Undefined |
| ☐ ATTESTATION-86 | 🗂 Customer SSN | Undefined |
| ☐ ATTESTATION-83 | 🗂 Customer SSN | Undefined |
| ☐ ATTESTATION-84 | 🗂 Customer SSN | Undefined |
| ☐ ATTESTATION-79 | 🗂 Employee DoB | Undefined |

DATA GOVERNANCE SYSTEMS AND METHODS

RELATED APPLICATIONS

The present application claims the benefit of priority under 35 U.S.C. 119(e) to U.S. Provisional Patent Application No. 63/210,951; filed on Jun. 15, 2021 and titled "DATA GOVERNANCE SYSTEMS AND METHODS", and U.S. Provisional Patent Application No. 63/295,693; filed on Dec. 31, 2021 and titled "DATA GOVERNANCE SYSTEMS AND METHODS", each of which is hereby incorporated by reference herein in its entirety.

FIELD

Aspects of the present disclosure relate to data governance techniques for data managed by a data processing system. In particular, aspects of the present disclosure provide techniques for efficiently verifying that data assets managed by a data processing system comply with one or more data governance policies.

BACKGROUND

Modern data processing systems manage vast amounts of data (e.g., millions, billions, or trillions of data records) and manage how these data may be accessed (e.g., created, updated, read, or deleted). The data managed by a data processing system may be of any suitable type. For example, the data managed by the data processing system may include transactions, documents, tables, files, or any other suitable type of data. As another example, the data managed by the data processing system may include "metadata," which is data that contains information about other data (e.g., stored in the same data processing system and/or another data processing system). For example, a data processing system may store metadata about credit card transaction data stored in a table of a credit card company's database. Non-limiting examples of such metadata include information indicating the size of the table in memory, when the table was created, when the table was last updated, the number of rows and/or columns in the table, where the table is stored, who has permission to read, update, delete or perform any other suitable action(s) with respect to the data table.

SUMMARY

Some embodiments provide a method for determining whether data managed by a data processing system complies with a data governance policy. The data processing system stores the data in multiple data assets each comprising one or more attribute-value pairs. The data governance policy comprises one or more data standards each indicating one or more rules that data assets have to satisfy in order to meet the data standard. The method comprises: using at least one computer hardware processor to perform: receiving user input indicating at least one criterion for inclusion of data assets into a first data asset collection; generating the first data asset collection by automatically identifying, from among the multiple data assets, data assets that meet the at least one criterion; selecting a first data standard from among the one or more data standards of the data governance policy; associating the first data standard with the first data asset collection; and determining whether the data managed by the data processing system complies with the data governance policy at least in part by verifying whether data assets in the first data asset collection satisfy one or more rules specified by the first data standard.

In some embodiments, the at least one criterion is indicative of at least one value that at least one attribute in a data asset must take on to meet the at least one criterion. In some embodiments, the method further comprises: selecting a second data standard from among the one or more data standards of the data; associating the second data standard with the first data asset collection; and determining whether the data managed by the data processing system complies with the data governance policy at least in part by verifying whether the data assets in the first data asset collection satisfy one or more rules specified by the second data standard.

In some embodiments, the method further comprises: updating the first data asset collection using the at least one criterion prior to verifying whether the data assets in the first data asset collection satisfy the one or more rules specified by the first data standard. In some embodiments, updating the first data asset collection using the at least one criterion comprises: identifying at least one data asset in the multiple data assets that is not in the first data asset collection and meets the at least one criterion; and in response to identifying the at least one data asset that meets the at least one criterion, adding the at least one data asset to the data asset collection. In some embodiments, updating the first dynamic data asset collection using the at least one data asset criterion comprises: identifying at least one data asset in the first data asset collection that no longer meets the at least one data asset criterion; and in response to identifying the at least one data asset that does not meet the at least one data asset criterion, removing the at least one data asset from the first data asset collection.

In some embodiments, associating the first data standard with the first data asset collection comprises: receiving, through a graphical user interface (GUI), user input indicating selection of the first data asset collection from among a plurality of data asset collections; and associating the first data standard with the first data asset collection in response to receiving the user input. In some embodiments, associating the first data standard with the first data asset collection comprises: receiving, through a graphical user interface (GUI), user input indicating selection of the first data standard; and associating the first data standard with the first data asset collection in response to receiving the user input. In some embodiments, the GUI displays GUI elements representing multiple data asset collections, and the user input indicates a selection of the first data asset collection by indicating a selection of one of the GUI elements. In some embodiments, the GUI displays, after selection of the first data asset collection, information indicating one or more data assets that meet the at least one criterion. In some embodiments, the GUI comprises an interface that allows a user to search for data assets that meet the at least one criterion.

In some embodiments, the method further comprises: generating a first GUI displaying a listing of at least some of the data assets in the first data asset collection; generating a first GUI displaying information about the first data standard, the information including an indication of the first data asset collection; receiving, through the first GUI, user input indicating a selection of a data asset in the list of the at least some data assets; and in response to receiving the user input, generating a second GUI displaying information about the selected data asset.

In some embodiments, verifying whether the data assets in the first data asset collection satisfy the one or more rules indicated by the first data standard comprises, for at least one of the data assets in the first data asset collection: identifying, based on at least one attribute of the at least one data asset, a user to determine whether the at least one data asset satisfies the one or more rules indicated by the first data standard; transmitting, to a computing device associated with the user and through a communication network, information about the at least one data asset and the first data standard; and receiving, from the computing device associated with the user through the communication network, information indicating whether the at least one data asset satisfies the one or more rules indicated by the first data standard.

In some embodiments, verifying whether the data assets in the first data asset collection satisfy the one or more rules indicated by the first data standard comprises, for each particular data asset of at least some of the data assets in the first data asset collection: identifying, based on at least one attribute of the particular data asset, a user to determine whether the particular data asset satisfies the one or more rules indicated by the first data standard; transmitting, to a computing device associated with the user and through a communication network, information about the particular data asset and the first data standard; and receiving, from the computing device associated with the user through the communication network, information indicating whether the particular data asset satisfies the one or more rules indicated by the first data standard. In some embodiments, the information indicating whether the particular data asset satisfies the one or more rules indicated by the first data standard comprises an attestation by the user as to whether the particular data asset satisfies the one or more rules indicated by the first data standard.

In some embodiments, verifying whether the data assets in the first data asset collection satisfy the one or more rules indicated by the first data standard comprises automatically verifying whether the data assets satisfy the one or more rules indicated by the first data standard. In some embodiments, the method further comprises: receiving user input indicating at least one second criterion for inclusion of data assets into a second data asset collection; generating the second data asset collection by automatically identifying, from among the multiple data assets, data assets that meet the at least one second criterion for inclusion of data assets into the second data asset collection; selecting a second data standard from among the one or more data standards of the data governance policy; associating the second data standard with the second data asset collection; and determining whether the data managed by the data processing system complies with the data governance policy at least in part by verifying whether data assets in the second data asset collection satisfy one or more rules specified by the second data standard.

In some embodiments, the method further comprises: selecting a second data standard from among the one or more data standards of the data governance policy; associating the second data standard with the first data asset collection; and determining whether the data managed by the data processing system complies with the data governance policy at least in part by verifying whether the data assets in the first data asset collection satisfy one or more rules specified by the second data standard. In some embodiments, associating the first data standard with the first data asset collection comprises storing an indication of the first data asset collection in the first data standard. In some embodiments, the data managed by the data managed by the data processing system comprises information associated with data in an enterprise system.

Some embodiments provide a non-transitory computer-readable storage medium storing instructions. The instructions, when executed by at least one computer hardware processor, cause the at least one computer hardware processor to perform a method for determining whether data managed by a data processing system complies with a data governance policy. The data processing system stores the data in multiple data assets each comprising one or more attribute-value pairs. The data governance policy comprises one or more data standards each indicating one or more rules that data assets have to satisfy in order to meet the data standard. The method comprises: receiving user input indicating at least one criterion for inclusion of data assets into a first data asset collection; generating the first data asset collection by automatically identifying, from among the multiple data assets, data assets that meet the at least one criterion; selecting a first data standard from among the one or more data standards of the data governance policy; associating the first data standard with the first data asset collection; and determining whether the data managed by the data processing system complies with the data governance policy at least in part by verifying whether data assets in the first data asset collection satisfy one or more rules specified by the first data standard.

Some embodiments provide a system for determining whether data managed by a data processing system complies with a data governance policy. The data processing system stores data in multiple data assets each comprising one or more attribute-value pairs. The data governance policy comprises one or more data standards each indicating one or more rules that data assets have to satisfy in order to meet the data standard. The system comprises: at least one computer hardware processor; and at least one non-transitory computer-readable storage medium storing instructions that, when executed by the at least one computer hardware processor, cause the at least one computer hardware processor to perform: receiving user input indicating at least one criterion for inclusion of data assets into a first data asset collection; generating the first data asset collection by automatically identifying, from among the multiple data assets, data assets that meet the at least one criterion; selecting a first data standard from among the one or more data standards of the data governance policy; associating the first data standard with the first data asset collection; and determining whether the data managed by the data processing system complies with the data governance policy at least in part by verifying whether data assets in the first data asset collection satisfy one or more rules specified by the first data standard.

Some embodiments provide a method for determining whether data managed by a data processing system complies with a data governance policy. The data processing system stores the data in multiple data assets each comprising one or more attribute-value pairs. The data governance policy comprises one or more data standards each indicating one or more rules that data assets have to satisfy in order to meet the data standard. The one or more data standards are each associated with one or more data asset collections. The one or more data standards include a first data standard associated with a first data asset collection of the one or more data asset collections. The method comprises: using at least one computer hardware processor to perform: accessing a first data asset from the first data asset collection associated with the first data standard; identifying, based on data in the first data asset, a first user to attest to whether the first data asset satisfies one or more rules indicated by the first data standard; transmitting, to a first computing device associated with the first user and through a communication network, information about the first data asset and the first data standard; obtaining, from the first computing device and through the communication network, first input indicating a first attestation by the first user as to whether the first data asset satisfies the one or more rules indicated by the first data standard; and determining whether the data managed by the data processing system complies with the data governance policy using the first input indicating the first attestation.

In some embodiments, the at least one criterion indicates at least one value that at least one attribute in a data asset must take on to meet the at least one criterion. In some embodiments, the method further comprises: accessing a second data asset from the first data asset collection; identifying, based on at least one attribute-value pair of the second data asset, a second user to attest to whether the second data asset satisfies the one or more rules indicated by the first data standard; transmitting, to a second computing device associated with the second user and through the communication network, information about the second data asset and the first data standard; obtaining, from the second computing device and through the communication network, second input indicting a second attestation by the second user as to whether the second data asset satisfies the one or more rules indicated by the first data standard; and determining whether the data managed by the data processing system complies with the data governance policy using the second input indicating the second attestation.

In some embodiments, identifying the first user to attest whether the first data asset satisfies the one or more rules indicated by the first data standard comprises: identifying one or more users indicated by the at least one attribute-value pair of the first data asset as being responsible for management of the first data asset; and selecting the first user from the one or more users. In some embodiments, obtaining the first user input indicating the first attestation comprises obtaining the first user input through a GUI. In some embodiments, the method further comprises obtaining, from the first computing device and through the communication network, information indicating evidence of the first attestation by the first user as to whether the first data asset satisfies the one or more rules indicated by the first data standard.

In some embodiments, the method further comprises tracking multiple attestations as to whether data assets of the first data asset collection satisfy the one or more rules indicated by the first data standard. In some embodiments, the method further comprises generating a GUI element indicating a degree to which the attestations have been completed. In some embodiments, the method further comprises generating a first attestation object for the first data asset; and storing information indicating the first attestation in the first attestation object. In some embodiments, the method further comprises storing an association of the first data standard with the first data asset in the first attestation object.

In some embodiments, the first attestation indicates that the first data asset meets the first data standard, partially meets the first standard, is undefined, does not meet the first standard, or that the first data standard does not apply to the first data asset. In some embodiments, the first data asset collection is associated with a second data standard of the one or more data standards, and the method further comprises: identifying, based on the at least one attribute-value pair of the first data asset, the first user to attest to whether the first data asset satisfies one or more rules indicated by the second data standard; transmitting, to the first computing device associated with the first user and through the communication network, information about the first data asset and the second data standard; obtaining, from the first computing device and through the communication network, second input indicating a second attestation by the first user as to whether the first data asset satisfies the one or more rules indicated by the second data standard; and determining whether the data managed by the data processing system complies with the data governance policy using the second input indicating the second attestation.

Some embodiments provide a non-transitory computer-readable storage medium storing instructions. The instructions, when executed by at least one computer hardware processor, cause the at least one computer hardware processor to perform a method for determining whether data managed by a data processing system complies with a data governance policy. The data processing system stores the data in multiple data assets each comprising one or more attribute-value pairs. The data governance policy comprises one or more data standards each indicating one or more rules that data assets have to satisfy in order to meet the data standard. The one or more data standards are each associated with one or more data asset collections. The one or more data standards include a first data standard associated with a first data asset collection of the one or more data asset collections. The method comprises: accessing a first data asset from the first data asset collection associated with the first data standard; identifying, based on data in the first data asset, a first user to attest to whether the first data asset satisfies one or more rules indicated by the first data standard; transmitting, to a first computing device associated with the first user and through a communication network, information about the first data asset and the first data standard; obtaining, from the first computing device and through the communication network, first input indicating a first attestation by the first user as to whether the first data asset satisfies the one or more rules indicated by the first data standard; and determining whether the data managed by the data processing system complies with the data governance policy using the first input indicating the first attestation.

Some embodiments provide a system for determining whether data managed by a data processing system complies with a data governance policy. The data processing system stores the data in multiple data assets each comprising one or more attribute-value pairs. The data governance policy comprises one or more data standards each indicating one or more rules that data assets have to satisfy in order to meet the data standard. The one or more data standards are each associated with one or more data asset collections. The one or more data standards include a first data standard associated with a first data asset collection of the one or more data asset collections. The system comprises: at least one computer hardware processor; and at least one non-transitory computer-readable storage medium storing instructions that, when executed by the at least one computer hardware processor, cause the at least one computer hardware processor to perform: accessing a first data asset from the first data asset collection associated with the first data standard; identifying, based on data in the first data asset, a first user to attest to whether the first data asset satisfies one or more rules indicated by the first data standard; transmitting, to a first computing device associated with the first user and through a communication network, information about the first data asset and the first data standard; obtaining, from the first computing device and through the communication network, first input indicating a first attestation by the first user as to whether the first data asset satisfies the one or more rules indicated by the first data standard; and determining whether the data managed by the data processing system complies with the data governance policy using the first input indicating the first attestation.

Some embodiments provide a method for use in connection with governance of a plurality of data assets managed by a data processing system. The method comprises: using at least one computer hardware processor to perform: accessing a data governance policy comprising a first data standard; generating a first data asset collection at least in part by automatically selecting, from among the plurality of data assets managed by the data processing system and using at least one data asset criterion, one or more data assets that meet the at least one data asset criterion; associating the first data asset collection with the first data standard; and verifying whether at least one of the one or more data assets in the first data asset collection complies with the first data standard.

In some embodiments, the at least one of the one or more data assets in the first data asset collection comprises a first data asset and the verifying comprises: identifying, based on at least one attribute of the first data asset, a first user to attest to whether the first data asset complies with the first data standard. In some embodiments, the method further comprises updating the first data asset collection using the at least one data asset criterion. In some embodiments, updating the first data asset collection using the at least one data asset criterion comprises: identifying one or more data assets in the plurality of data assets that are not in the first data asset collection and meet the at least one data asset criterion; and in response to identifying the one or more data assets that meet the at least one data asset criterion, adding the one or more data assets to the first data asset collection. In some embodiments, updating the first data asset collection using the at least one data asset criterion comprises: identifying one or more data assets in the first data asset collection that no longer meet the at least one data asset criterion; and in response to identifying the one or more data assets that do not meet the at least one data asset criterion, removing the one or more data assets from the first data asset collection.

In some embodiments, the method further comprises: generating a second data asset collection at least in part by automatically selecting, from among the plurality of data assets and using at least one other data asset criterion, one or more data assets that meet the at least one other data asset criterion; associating the second data asset collection with the first data standard; and verifying whether at least one of the one or more data assets in the second data asset collection complies with the first data standard. In some embodiments, the data governance policy comprises a second data standard and the method further comprises: generating a second data asset collection at least in part by automatically selecting, from among the plurality of data assets and using at least one other data asset criterion, one or more data assets that meet the at least one other data asset criterion; associating the second data asset collection with the second data standard; and verifying whether at least one of the one or more data assets in the second data asset collection complies with the second data standard.

In some embodiments, the data governance policy comprises a second data standard, and the method further comprises: associating the first data asset collection with the second data standard; and verifying whether the at least one data asset in the first data asset collection complies with the second data standard. In some embodiments, associating the first data asset collection with the first data standard comprises storing an indication of the first data asset collection in the first data standard. In some embodiments, generating the first data asset collection using the first at least one data asset criterion comprises: identifying the one or more data assets that meet the at least one data asset criterion from among the plurality data assets managed by the data processing system; and including the identified one or more data assets in the first data asset collection.

In some embodiments, associating the first data asset collection with the first data standard comprises: receiving, through a graphical user interface (GUI), user input indicating that the first data asset collection is to be associated with the first data standard. In some embodiments, the GUI displays GUI elements representing multiple data asset collections, and the user input indicates a selection of the first data asset collection by selecting one of the GUI elements. In some embodiments, the GUI displays, after selection of the first data asset collection, information indicating the one or more data assets that meet the at least one data asset criterion. In some embodiments, the GUI comprises an interface that allows a user to search for data assets that meet the least one data asset criterion.

In some embodiments, the first data asset collection comprises a plurality of data assets, the method further comprises: generating a first GUI displaying a listing of at least some of the plurality of data assets of the first data asset collection; generating a first GUI displaying information about the first data standard, the information including an indication of the first data asset collection; receiving, through the first GUI, user input indicating a selection of a data asset in the list of the at least some data assets; and in response to receiving the user input, generating a second GUI displaying information about the selected data asset. In some embodiments, the data governance policy comprises a plurality of data standards, the method further comprises: generating a first GUI displaying information about the data governance policy, the information about the data governance policy including an indication of the first data standard; generating a first GUI displaying a listing of at least some of the plurality of data standards, the at least some data standards including the first data standard; receiving, through the first GUI, user input indicating a selection of the first data standard from the listing; and in response to receiving the user input, generating a second GUI displaying information about the first data standard.

Some embodiments provide a system for use in connection with governance of a plurality of data assets managed by a data processing system. The system comprises: at least one computer hardware processor; and at least one non-transitory computer-readable storage medium storing instructions that, when executed by the at least one computer hardware processor, cause the at least one hard processor to perform: accessing a data governance policy comprising a first data standard; generating a first data asset collection at least in part by automatically selecting, from among the plurality of data assets managed by the data processing system and using at least one data asset criterion, one or more data assets that meet the at least one data asset criterion; associating the first data asset collection with the first data standard; and verifying whether at least one of the one or more data assets in the first data asset collection complies with the first data standard.

Some embodiments provide a non-transitory computer-readable storage medium storing instructions. The instructions, when executed by at least one computer hardware processor, cause the at least one computer hardware processor to perform: accessing a data governance policy comprising a first data standard; generating a first data asset collection at least in part by automatically selecting, from among a plurality of data assets managed by a data processing system and using at least one data asset criterion, one or more data assets that meet the at least one data asset criterion; associating the first data asset collection with the first data standard; and verifying whether at least one of the one or more data assets in the first data asset collection complies with the first data standard.

Some embodiments provide a method comprising: verifying, using at least one computer hardware processor, whether data assets managed by a data processing system comply with a data governance policy comprising a first data standard associated with a first data asset, the verifying comprising: identifying, based on at least one attribute of the first data asset, a first user to attest to whether the first data asset complies with the first data standard; transmitting, to a first computing device associated with the first user and through a communication network, information about the first data asset and the first data standard; obtaining, from the first computing device through the communication network, first input indicating a first attestation by the first user as to whether the first data asset complies with the first data standard; and verifying whether the first data asset complies with the first data standard based on the input indicating the first attestation.

In some embodiments, identifying the first user to attest whether the first data asset complies with the first data standard comprises determining that the first user is responsible for management of the first data asset. In some embodiments, determining that the first user is responsible for management of the first data asset comprises accessing information associated with the data asset indicating that the first user is responsible for the first data asset.

In some embodiments, the first data standard is associated with a second data asset and the method further comprises: identifying, based on at least one attribute of the second data asset, a second user to attest to whether the second data asset complies with the second data standard; transmitting, to a second computing device associated with the second user and through the communication network, information about the second data asset and the first data standard; obtaining, from the second computing device through the communication network, second input indicting a second attestation by the second user as to whether the second data asset complies with the first data standard; and verifying whether the second data asset complies with the second data standard based on the second attestation.

In some embodiments, the data governance policy comprises a second data standard associated with a second data asset, and the method further comprises: identifying, based on at least one attribute of the second data asset, a second user to attest to whether the first data asset complies with the second data standard; transmitting, to a second computing device associated with the second user and through the communication network, information about the second data asset and the second data standard; obtaining, from the second computing device through the communication network, second input indicating a second attestation by the second user as to whether the second data asset complies with the second data standard; and verifying whether the second data asset complies with the second data standard based on the second attestation.

In some embodiments, the data governance policy comprises a second data standard associated with a second data asset, and the method further comprises: identifying, based on at least one attribute of the second data asset, the first user to attest to whether the first data asset complies with the second data standard; transmitting, to the first computing device through the communication network, information about the second data asset and the second data standard; obtaining, from the first computing device through the communication network, second input indicating a second attestation by the first user as to whether the second data asset complies with the second data standard; and verifying whether the second data asset complies with the second data standard based on the second attestation.

In some embodiments, the method further comprises generating a first attestation object, and storing the first input indicating the first attestation in the first attestation object. In some embodiments, the method further comprises storing an association of the first data standard with the first data asset in the first attestation object. In some embodiments, obtaining the first user input indicating the first attestation comprises obtaining the first user input through a GUI. In some embodiments, the GUI displays information indicating an association of the first standard with the first data asset. In some embodiments, the first attestation indicates that the first data asset complies with the first data standard, partially complies with the first standard, is undefined, does not apply, or does not comply with the first standard. In some embodiments, the method further comprises obtaining, from the first computing device through the communication network, information indicating evidence of the first attestation.

Some embodiments provide a system. The system comprises: at least one computer hardware processor; and at least one non-transitory computer-readable storage medium storing instructions that, when executed by the at least one computer hardware processor, cause the at least one hard processor to perform: verifying, using at least one computer hardware processor, whether data assets managed by a data processing system comply with a data governance policy comprising a first data standard associated with a first data asset, the verifying comprising: identifying, based on at least one attribute of the first data asset, a first user to attest to whether the first data asset complies with the first data standard; transmitting, to a first computing device associated with the first user and through a communication network, information about the first data asset and the first data standard; obtaining, from the first computing device through the communication network, first input indicating a first attestation by the first user as to whether the first data asset complies with the first data standard; and verifying whether the first data asset complies with the first data standard based on the input indicating the first attestation.

Some embodiments provide a non-transitory computer-readable storage medium storing instructions. The instructions, when executed by at least one computer hardware processor, cause the at least one computer hardware processor to perform: verifying, using at least one computer hardware processor, whether data assets managed by a data processing system comply with a data governance policy comprising a first data standard associated with a first data asset, the verifying comprising: identifying, based on at least one attribute of the first data asset, a first user to attest to whether the first data asset complies with the first data standard; transmitting, to a first computing device associated with the first user and through a communication network, information about the first data asset and the first data standard; obtaining, from the first computing device through the communication network, first input indicating a first attestation by the first user as to whether the first data asset complies with the first data standard; and verifying whether the first data asset complies with the first data standard based on the input indicating the first attestation.

Some embodiments provide a method for processing data assets managed by a data processing system. The method comprises: using at least one computer hardware processor to perform: accessing a plurality of data standards that each specify one or more rules that data assets have to satisfy in order to meet the data standard; generating a plurality of data asset collections, each comprising a collection of data, the generating comprising, for each data asset collection, automatically selecting, from among a plurality of data assets managed by the data processing system and using at least one data asset criterion, one or more data assets that meet the at least one data asset criterion; associating each data asset collection with one or more of the plurality of data standards; verifying whether at least one of the one or more data assets in each of the data asset collections complies with each of one or more associated data standards by, for each of the at least one of the one or more data assets in each of the data asset collections: identifying, based on at least one attribute of the data asset, a user to attest to whether the data asset complies with the data standard; determining a computing device associated with the identified user; transmitting, to the identified computing device associated with the identified user and through a communication network, information about the data asset and the data standard; obtaining, from the computing device through the communication network, input indicating an attestation by the user as to whether the data asset complies with the data standard; and verifying the data asset complies with the data standard based on the input indicating the attestation.

In some embodiments, at least some of the users identified with respect to different data asset collections are different. In some embodiments, the data processing system further comprises a queue for each user, and the method further comprises storing a queue of attestations that are to be performed by a respective user, the attestations comprising information about one or more of the data assets and the one or more associated data standards.

The foregoing is a non-limiting summary.

BRIEF DESCRIPTION OF DRAWINGS

Various aspects and embodiments will be described with reference to the following figures. It should be appreciated that the figures are not necessarily drawn to scale. Items appearing in multiple figures are indicated by the same or a similar reference number in all the figures in which they appear.

FIG. 2A shows a diagram of a data processing system 100, according to some embodiments of the technology described herein.

FIG. 8 is an illustration of example graphical user interface (GUI) 800 displaying information about a data governance policy, according to some embodiments of the technology described herein.

FIG. 13 is an illustration of example graphical user interface (GUI) 1300 displaying information about a data standard, according to some embodiments of the technology described herein.

FIG. 14 is an illustration of example graphical user interface (GUI) 1400 displaying information about a compliance project, according to some embodiments of the technology described herein.

FIG. 15 is an illustration of example graphical user interface (GUI) 1500 displaying information about a compliance review, according to some embodiments of the technology described herein.

FIG. 17 is an illustration of example graphical user interface (GUI) 1700 displaying information about multiple compliance projects, according to some embodiments of the technology described herein.

FIG. 18 is an illustration of example graphical user interface (GUI) 1800 that displays information about a status of attestations of a compliance project, according to some embodiments of the technology described herein.

FIG. 19 is an illustration of example graphical user interface (GUI) 1900 that allows a user to perform edits to one or attestations, according to some embodiments of the technology described herein.

FIG. 21 is an illustration of example graphical user interface (GUI) 2100 displaying information about attestations related to a data asset, according to some embodiments of the technology described herein.

DETAILED DESCRIPTION

Figure 1:
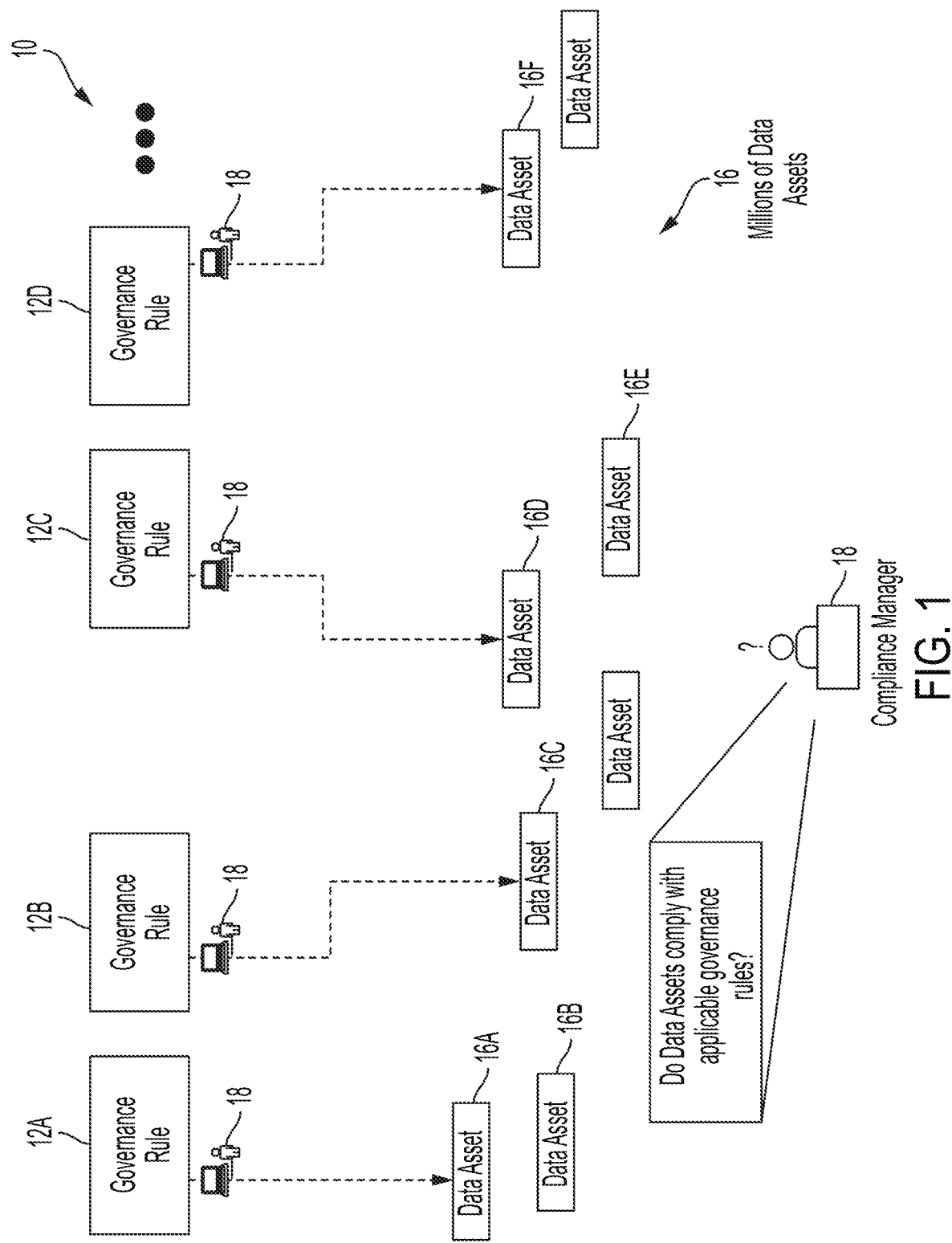
FIG. 1 shows a diagram 10 of a system implementing conventional data governance techniques for data assets.

The inventors have developed new techniques that allow for efficiently verifying whether data assets managed by a data processing system comply with a data governance policy.

A "data asset" may be any suitable collection of data managed by the data processing system. For example, a data asset may include one or more data records, one or more data sets, one or more documents, one or more transactions, one or more files, one or more tables, and/or a collection of any of the foregoing. As another example, in some embodiments, a data asset may include one or more data entities. In some such embodiments, a data processing system may manage at least some data using data entities, which are used to organize the data using an object-oriented paradigm. Similar to how object-oriented programming involves classes and instances thereof, a data processing system may be configured with definitions of data entities and manage data using instances of the data entities and the data entity definitions.

In some embodiments, a data asset may comprise data as well as information about the data. In some embodiments, the information about the data may be stored in attribute-value pairs. For example, a data asset may comprise one or more attributes having values and the information about the data in the data asset may comprise the values of the attributes. A data asset may be stored by the data processing system in any suitable format and/or using any suitable data structure(s), as aspects of the technology described herein are not limited in this respect.

In some embodiments, a data processing system may manage data assets for an organization, for example, a multinational corporation (e.g., a financial institution, a utility company, an automotive company, an electronics company, etc.) or other business or organization. A large organization may have a vast number of data assets and, as such, in some embodiments, a data processing system may be used to manage a large number (e.g., millions, billions, or trillions) of data assets for the organization.

For example, in some embodiments, a data processing system may be configured to manage millions or billions of data assets. In some such embodiments, a data processing system may be used for metadata management in an enterprise setting, whereby data assets store information about individual data sets (e.g., tables, transactions, documents, data records, etc.) stored across a globally distributed information technology (IT) infrastructure comprising many databases, data warehouses, data lakes, etc. In this context, a data asset may store information about a corresponding dataset such as, for example, when the dataset was created, where it is stored, its size, the identity of the user(s) that are allowed to edit the dataset, information identifying which application programs use the dataset, information identifying the sensitivity level of the data, etc. Since a large organization (e.g., a financial institution such as a bank or credit card company, a utility such as a phone or electric company, etc.) will typically manage millions or billions of such datasets, there may be millions or billions of data assets storing information about such datasets that would be managed by the data processing system. Since, in this example application, the data processing system would store information about other data (sometimes called "metadata"), this example application may be called "metadata management". However, it should be appreciated that the techniques described herein are not limited to data processing systems being used for metadata management and may be applied to any data processing system using data assets to manage data irrespective of whether the managed data is metadata or any other type of data.

Data governance, in the context of an organization's data, refers to processes, policies, procedures, and standards used to manage and/or regulate various aspects of the organization's data including, but not limited to, data quality and integrity, data security, data privacy, data versioning, data lineage and traceability of changes to data, data availability and usability, and/or any other suitable aspects of the organization's data and/or its management.

An organization may implement data governance through establishing data governance policies that regulate data managed by the data processing system. In some embodiments, the techniques described herein provide a system enabling members of an organization to specify one or multiple data governance policies, each of which comprises one or multiple data standards. A data governance policy may comprise any suitable number of data standards (e.g., at least one data standard, at least two data standards, at least 5 data standards, at least 10 data standards, between 1 and 50 data standards, between 10 and 100 data standards, or any other suitable range within these ranges). In some embodiments, a data standard may specify one or more rules that a data asset must satisfy in order to meet the data standard. By meeting the data standard, a data asset may at least partially comply with a data governance policy to which the data standard belongs (each data standard may be part of one or multiple data governance policies). A data governance policy and its constituent data standards may be stored by the data processing system in any suitable way (e.g., in any suitable format(s), using any suitable data structure(s)), as aspects of the technology described herein are not limited in this respect.

As an illustrative example, a data governance policy may state that social security numbers in data managed by a data processing system should adhere to a consistent format. The data governance policy may include a data standard requiring that social security numbers be stored in a format of "NNN-NN-NNNN", where N represents a digit between 0 and 9. As another example, a data governance policy may state that an application is only to use data from a trusted source. The data governance policy may include a data standard specifying a list of trusted sources that the application is allowed to use data from. As another example, a data governance policy may state that sensitive data has to meet one or more security criteria, and a constituent data standard may require that data assets are to be stored on a system that is protected from external data access. Additional examples of data governance policies and constituent data standards are provided herein.

In practice, an organization may have numerous data governance policies, and numerous data standards per policy as described above. The organization may have millions or billions of data assets to which the data governance policies and data standards may apply. For example, an organization such as a banking institution may have millions or billions of data assets (e.g., customer records, transaction records, and/or account records) stored across multiple different locations globally. As another example, an organization such a telephone company may have millions or billions of data assets (e.g., phone call records, data usage records, customer information, and/or account information) stored across multiple different locations globally. Verifying whether the large number (e.g., millions or billions) of data assets managed by the data processing system comply with various data governance policies and their constituent data standards is a major technical challenge. This challenge is further complicated by the fact that the data assets are dynamic in that at least some of the data in a data asset may be updated. For example, when a data asset comprises attribute-value pairs, one or more attribute values may be changed. As a result, a data asset may comply with one or more data standards at one point in time, but not comply with one of these data standard(s) at a later point in time. For example, the compliance of a data asset with a particular data standard may depend on the value of an attribute in the data asset and if that attribute value is changed, a previously compliant data asset may no longer be compliant (or vice versa).

FIG. 1 shows a diagram 10 of a system implementing conventional data governance techniques for data assets 16. As shown in FIG. 1, the system includes multiple data governance rules including Data Governance Rules 12A, 12B, 12C, 12D. Compliance Manager 18 is responsible for manually associating each of the Data Governance Rules 12A, 12B, 12C, 12D with one or more of the millions of data assets 16 that may be managed by the system. The system illustrated by diagram 10 would require the Compliance Manager 18 to associate each data asset with applicable data governance rule(s). In the example of FIG. 1, the Compliance Manager 18 has manually associated Governance Rule 12A with Data Asset 16A, Governance Rule 12B with Data Asset 16C, data Governance Rule 12C with Data Asset 16D, and Governance Rule 12D with Data Asset 16F.

In a data processing system, there may be a large number (e.g., thousands, millions, or more) of data assets to which a data governance rule applies. Moreover, data assets may be updated such that new data assets may need to be governed by a different data governance rule and/or data assets may no longer be governed by a data governance rule. For example, if Governance Rule 12A no longer applies to Data Asset 16A, then the association would have to be manually removed. As another example, if Data Asset 16D is updated such that Governance Rule 12B applies to Data Asset 16D, then the Data Asset 16D would have to be manually associated with Governance Rule 12B. Accordingly, the system is unable to dynamically associate data assets with applicable data governance rules in response to changes in the data assets. Moreover, the Compliance Manager 18 may fail to associate governance rules with all data assets that the governance rules are applicable to. In the example of FIG. 1, Governance Rule 12A may apply to Data Asset 16B. However, the Compliance Manager 18 has failed to associate Governance Rule 12A with Data Asset 16B. In another example, Governance Rule 12C may apply to Data Asset 16E. However, the Compliance Manager 18 has failed to associate Governance Rule 12C with Data Asset 16E.

In the system of FIG. 1, the Compliance Manager 18 who associated Governance Rules 12A, 12B, 12C, 12D with respective data assets is also responsible for then determining whether the data assets comply with the governance rules that they are associated with. In a system with thousands or even millions of associations of governance rules with data assets, it may be impossible for the Compliance Manager 18 to determine whether data assets of the system comply with their applicable governance rules. As illustrated in FIG. 1, the Compliance Manager 18 is unable to provide any indication as to whether the data assets comply with their applicable governance rules. Moreover, the Compliance Manager 18 may not be the one with knowledge of a particular data asset to determine whether the data asset complies with an applicable governance rule. Thus, the system is unable to effectively determine compliance of data assets with governance rules.

To address the above-described challenges, the inventors have developed a system that allows efficient verification of whether data assets managed by the data processing system comply with data governance policies and their constituent data standards. The system achieves this, in part, by using: (1) a process through which a data processing system automatically associates data assets with applicable data governance policies and/or data standards (with the association performed, for example, based on values of the data in the data assets); and (2) a process through which a data processing system (a) automatically identifies users ("attestors") who are to review data assets for compliance with one or more data standards; and (b) guides the identified users through workflows that allow the users attest to whether data assets comply with the data governance policies and their constituent standards.

In some embodiments, in order to associate data assets with applicable data governance policies and data standards, the system may be configured to generate data asset collections, and associate the data asset collections with one or more data standards. A data asset collection may be generated in any suitable way. For example, in some embodiments, the system may be configured to generate a data asset collection using one or more criteria, which may define a data asset collection, such that the data collection includes those assets that meet the one or more criteria and exclude data assets that do not meet the one or more criteria. For example, in some embodiments, the system may automatically generate a data collection using one or more criteria by selecting, from among multiple data assets managed by the data processing system, those data assets that meet the one or more criteria.

In some embodiments, a criterion for including a data asset into a data asset collection may include a condition on one or more attributes of a data asset. In some embodiments, the criterion may indicate, for each of the attribute(s), one or more values that the attribute in the data asset must take on to meet the criterion. For example, the system may group data assets of the same type (e.g., a credit score data asset, a customer ID data asset, and/or a debit account data asset) as indicated by their values of attribute(s) into the same data asset collection. As another example, data assets storing information associated with a particular region or location (e.g., United States, Europe, Japan, etc.) as indicated by their values of attribute(s) may be grouped into the same data asset collection. As yet another example, the system may group data assets associated with the same system or the same application as indicated by their values of attribute(s) into the same data asset collection. As yet another example, the system may group data assets associated with a common security level (e.g., all assets containing personal identifiable information (PII)) as indicated by their values of attribute(s) into the same data asset collection. More generally, the data assets may have attribute values and the system may group the data assets into a data asset collection based on criteria specified with respect to the attribute values (e.g., data assets having the same or similar values for one or more attributes are grouped into the same data asset collection, data assets with one or more attributes having a particular value or values or falling into specified range of values are grouped into the same data asset collection, etc.). In some embodiments, the system may be configured to group a data asset into none, one, or multiple data asset collections, as aspects of the technology described herein are not limited in this respect.

In some embodiments, after one or more data asset collections are generated, the system may dynamically update the data asset collection(s) based on updates to data assets managed by the data processing system. For example, the data processing system may remove a data asset from a data asset collection when, after the data asset is updated, the updated data asset no longer meets a criterion for inclusion into the data asset collection. As another example, the data processing system may add a data asset to the data asset collection when, after the data asset is updated, the updated data assets meet one or more criteria for including data assets in the data asset collection. Thus, the association of data governance policies and data standards with data assets may be dynamic and kept up to date to reflect the most recent state of data assets. In some embodiments, the system may be configured to periodically update data asset collections. For example, the system may update data asset collections according to a predetermined schedule. In some embodiments, the system may be configured to update data asset collections in response to an event. For example, the system may update data asset collections in response to the data asset collection being accessed by a user and/or the system (e.g., in connection with verification of compliance of assets within the data asset collection with one or more data standards). In some embodiments, the system may be configured to update a data asset collection when a compliance project for determining compliance of the data asset collection is created. The system may be further configured to freeze the data asset collection after creation of the data asset collection (e.g., until the compliance project is complete).

In some embodiments, to efficiently verify whether a data asset complies with a data standard associated with a data asset collection that includes that data asset, the system automatically identifies a user to attest whether a data asset complies with an applicable data standard. The system may use information from a data asset to identify the user. In some embodiments, a data asset may organize data stored therein into one or more attributes, which may take on different values such as numbers, strings, or references to other data assets. One or more attributes of a data asset may indicate, directly or indirectly, a user that is responsible for the data asset. The system may automatically identify a user to attest whether a data asset complies with a data standard using an attribute value of the data asset (e.g., a user indicated by a "business data steward" attribute of the data asset). The system may provide the identified user with information about the data asset and an applicable data standard (e.g., through a graphical user interface (GUI)). The identified user: (1) may view information about the data standard (e.g., a rule or requirement) and information about the data asset (e.g., attribute value(s) of the data asset); and (2) attest as to whether the data asset complies with the data standard (e.g., meets a rule and/or requirement of the data standard). For example, the system may provide one or more workflows through which the user may view the information about the data asset and the data standard and submit an attestation. The system may further allow and/or require a user to provide evidence (e.g., file, statement, link, or other information) to support a submitted attestation. The evidence may be used to subsequently confirm whether an attestation is correct.

In some embodiments, the data processing system described herein enables the definition and monitoring of large scale compliance projects. The data processing system may use the compliance project to manage verification of whether multiple data assets comply with one or more data standards. The compliance project provides a mechanism through which workflows can be implemented across multiple computing devices. The system may use the workflows to obtain information from users about whether data assets comply with one or more data standards. In some embodiments, the information may include attestations by users as to whether data assets comply with the data standard(s) (e.g., by satisfying rules specified by the data standard(s)). The compliance project may comprise of multiple attestations as to whether the data assets comply with the respective data standards and data governance policies. In some embodiments, the system may be configured distribute the workflows to multiple different users associated with different computing devices. The system may thus distribute verification across multiple computing devices. The system may generate statistics about progress of a compliance project (e.g., percentage of attestations therein completed and incomplete). The compliance project thus provides an efficient tool and interface through which verification of compliance with data standards and data governance policies may be managed by a data processing system.

Described herein are improved techniques for data governance in data processing systems. In particular, the system maintains dynamic associations between data standards and data assets to which the data standards applies through data asset collections. The system updates data asset collections based on changes to data assets (e.g., based on changes in data asset attribute values). Thus, the system may maintain an updated association of data standards to applicable data assets. Additionally, the system uses information stored in the data assets to automatically identify users to attest to whether the data assets comply with applicable data standards. The system may use the identified users to create and manage compliance projects through which verification that data assets comply with data standards may be performed more efficiently than in conventional data governance systems.

Some embodiments relate to a method for use in connection with governance of a plurality of data assets managed by a data processing system, the method comprising: using at least one computer hardware processor to perform: accessing a data governance policy comprising a first data standard (e.g., by obtaining information about the first standard stored in a database system); generating a first data asset collection at least in part by automatically selecting, from among the plurality of data assets managed by the data processing system and using at least one data asset criterion, one or more data assets that meet the at least one data asset criterion; associating the first data asset collection with the first data standard; and verifying whether at least one of the one or more data assets in the first data asset collection complies with the first data standard.

In some embodiments, the at least one of the one or more data assets in the first data asset collection comprises a first data asset and wherein the verifying comprises: identifying, based on at least one attribute of the first data asset, a first user (e.g., a person responsible for the first data asset) to attest to whether the first data asset complies with the first data standard.

In some embodiments, the method comprises updating the first data asset collection using the at least one data asset criterion (e.g., to reflect the latest state of data assets managed by the data processing system). In some embodiments, updating the first data asset collection using the at least one data asset criterion comprises: identifying one or more data assets in the plurality of data assets that are not in the first data asset collection and meet the at least one data asset criterion; and in response to identifying the one or more data assets that meet the at least one data asset criterion, adding the one or more data assets to the first data asset collection. In some embodiments, updating the first data asset collection using the at least one data asset criterion comprises: identifying one or more data assets in the first data asset collection that no longer meet the at least one data asset criterion; and in response to identifying the one or more data assets that do not meet the at least one data asset criterion, removing the one or more data assets from the first data asset collection.

In some embodiments, the method comprises: generating a second data asset collection at least in part by automatically selecting, from among the plurality of data assets and using at least one other data asset criterion, one or more data assets that meet the at least one other data asset criterion; associating the second data asset collection with the first data standard; and verifying whether at least one of the one or more data assets in the second data asset collection complies with the first data standard.

In some embodiments, the data governance policy comprises a second data standard and the method further comprises: generating a second data asset collection at least in part by automatically selecting, from among the plurality of data assets and using at least one other data asset criterion, one or more data assets that meet the at least one other data asset criterion; associating the second data asset collection with the second data standard; and verifying whether at least one of the one or more data assets in the second data asset collection complies with the second data standard.

In some embodiments, the data governance policy comprises a second data standard, and the method further comprises: associating the first data asset collection with the second data standard; and verifying whether the at least one data asset in the first data asset collection complies with the second data standard. In some embodiments, associating the first data asset collection with the first data standard comprises storing an indication of the first data asset collection in the first data standard. For example, the first data standard may store a reference to the first data asset collection.

In some embodiments, generating the first data asset collection using the first at least one data asset criterion comprises: identifying the one or more data assets that meet the at least one data asset criterion from among the plurality of data assets managed by the data processing system; and including the identified one or more data assets in the first data asset collection.

In some embodiments, associating the first data asset collection with the first data standard comprises: receiving, through a graphical user interface (GUI), user input indicating that the first data asset collection is to be associated with the first data standard. In some embodiments, the GUI displays GUI elements representing multiple data asset collections, and the user input indicates a selection of the first data asset collection by selecting one of the GUI elements. In some embodiments, the GUI displays, after selection of the first data asset collection, information indicating the one or more data assets that meet the at least one data asset criterion. In some embodiments, the GUI comprises an interface that allows a user to search for data assets that meet the least one data asset criterion.

In some embodiments, the first data asset collection comprises a plurality of data assets, the method further comprises: generating a first GUI displaying a listing of at least some of the plurality of data assets of the first data asset collection; generating a first GUI displaying information about the first data standard, the information including an indication of the first data asset collection; receiving, through the first GUI, user input indicating a selection of a data asset in the list of the at least some data assets; and in response to receiving the user input, generating a second GUI displaying information about the selected data asset.

In some embodiments, the data governance policy comprises a plurality of data standards, and the method further comprises: generating a first GUI displaying information about the data governance policy, the information about the data governance policy including an indication of the first data standard; generating a first GUI displaying a listing of at least some of the plurality of data standards, the at least some data standards including the first data standard; receiving, through the first GUI, user input indicating a selection of the first data standard from the listing; and in response to receiving the user input, generating a second GUI displaying information about the first data standard.

Some embodiments verify, using at least one computer hardware processor, whether data assets managed by a data processing system comply with a data governance policy comprising a first data standard associated with a first data asset The verifying comprises: identifying, based on at least one attribute of the first data asset, a first user (e.g., who is responsible for the first data asset) to attest to whether the first data asset complies with the first data standard; transmitting, to a first computing device associated with the first user and through a communication network, information about the first data asset and the first data standard; obtaining, from the first computing device through the communication network, first input indicating a first attestation by the first user as to whether the first data asset complies with the first data standard; and verifying whether the first data asset complies with the first data standard based on the input indicating the first attestation.

In some embodiments, identifying the first user to attest whether the first data asset complies with the first data standard comprises determining that the first user is responsible for management of the first data asset (e.g., based on an attribute value of the first data asset). In some embodiments, determining that the first user is responsible for management of the first data asset comprises accessing information associated with the data asset indicating that the first user is responsible for the first data asset.

In some embodiments, the first data standard is associated with a second data asset and the method further comprises: identifying, based on at least one attribute of the second data asset, a second user to attest to whether the second data asset complies with the second data standard; transmitting, to a second computing device associated with the second user and through the communication network, information about the second data asset and the first data standard; obtaining, from the second computing device through the communication network, second input indicating a second attestation by the second user as to whether the second data asset complies with the first data standard; and verifying whether the second data asset complies with the second data standard based on the second attestation.

In some embodiments, the data governance policy comprises a second data standard associated with a second data asset, and the method comprises: identifying, based on at least one attribute of the second data asset, a second user to attest to whether the first data asset complies with the second data standard; transmitting, to a second computing device associated with the second user and through the communication network, information about the second data asset and the second data standard; obtaining, from the second computing device through the communication network, second input indicating a second attestation by the second user as to whether the second data asset complies with the second data standard; and verifying whether the second data asset complies with the second data standard based on the second attestation.

In some embodiments, the data governance policy comprises a second data standard associated with a second data asset, and the method comprises: identifying, based on at least one attribute of the second data asset, the first user to attest to whether the first data asset complies with the second data standard; transmitting, to the first computing device through the communication network, information about the second data asset and the second data standard; obtaining, from the first computing device through the communication network, second input indicating a second attestation by the first user as to whether the second data asset complies with the second data standard; and verifying whether the second data asset complies with the second data standard based on the second attestation.

In some embodiments, the method comprises generating a first attestation object, and storing the first input indicating the first attestation in the first attestation object. In some embodiments, the method comprises storing an association of the first data standard with the first data asset in the first attestation object.

In some embodiments, obtaining the first user input indicating the first attestation comprises obtaining the first user input through a GUI. In some embodiments, the GUI displays information indicating an association of the first standard with the first data asset. In some embodiments, the first attestation indicates that the first data asset complies with the first data standard, partially complies with the first standard, or does not comply with the first standard. In some embodiments, the method comprises obtaining, from the first computing device through the communication network, information indicating evidence of the first attestation.

The techniques described herein may be implemented in any of numerous ways, as the techniques are not limited to any particular manner of implementation. Examples of details of implementation are provided herein solely for illustrative purposes. Furthermore, the techniques disclosed herein may be used individually or in any suitable combination, as aspects of the technology described herein are not limited to the use of any particular technique or combination of techniques.

FIG. 2A shows a diagram of a data processing system 100, according to some embodiments of the technology described herein. As illustrated in FIG. 2A, the data processing system 100 includes data governance policies 102, data assets 106, and compliance projects 120.

The data processing system 100 may be configured to use the data governance policies 102 to govern the data assets 106 managed by the data processing system 100. More specifically, each of the data governance policies 102 comprises a set of one or more constituent data standards. Compliance of data assets with a data governance policy may be determined based on compliance of the data assets with their associated data standards. The data processing system 100 may include any number of data governance policies. In some embodiments, the data governance policies 102 may provide regulations for data assets of the data processing system 100, and the data standards of the data governance policies 102 may be specific rules that, when satisfied, indicate conformance with the guidelines of the data governance policies 102. An example data governance policy and constituent data standard is described herein with reference to FIG. 4A.

As shown in FIG. 2A, the data processing system 100 manages data assets 106. In some embodiments, the data processing system 100 may be configured to manage thousands, millions, or billions of data assets. In some embodiments, each data asset may store a set of attribute values. For example, each data asset may store a set of attribute values. Although the example embodiment of FIG. 2A illustrates the data assets 106 in data storage of the data processing system 100, in some embodiments, at least some of the data assets 106 may be stored in other systems. The data processing system 100 may be configured to access data assets stored in other systems.

In some embodiments, the data processing system 100 may be configured to use compliance projects 120 to determine compliance of the data assets 106 with the data governance policies 102. The data processing system 100 may be configured to create a compliance project to determine whether one or more of the data assets 106 comply with one or more data standards. In some embodiments, the data processing system 100 may be configured to create a compliance project to determine compliance with a data governance policy. A compliance project may allow a user (e.g., Compliance Manager 118) to manage reviews of data assets that need to be performed in order to determine their compliance with a data governance policy. As discussed in more detail herein, in some embodiments, a compliance project may include attestations that data assets comply with applicable data standards organized into one or more compliance reviews. The data processing system 100 may be configured to assign the attestations to users to perform. Accordingly, the compliance projects 120 distribute tasks associated with determining compliance of the data assets 106 with the data governance policies 102 among various different users.

As illustrated in FIG. 2A, various types of users interact with the data processing system 100. Such users include Compliance Manager 118, Policy Manager 114, and Attestors 116A, 116B.

In some embodiments, Policy Manager 114 is responsible for creating data governance policies of the data processing system 100. The Policy Manager 114 may create a data governance policy and its constituent data standard(s). For example, the Policy Manager 114 may create a data governance policy by: (1) defining the data governance policy; and (2) determining one or more data standards that will be included in the data governance policy (e.g., for use in determining whether data assets comply with the data governance policy). The Policy Manager 114 may define a data governance policy by naming and describing the data governance policy. The Policy Manager 114 may further name and define data standard(s) of the data governance policy. The Policy Manager 114 may further determine which data assets each data standard applies to, and associate each data standard to its applicable data assets. As described herein with reference to FIG. 2B, the Policy Manager 114 may associate a data standard with data assets by associating the data standard with one or more collections of data assets (also referred to herein as "data asset collection(s)").

In some embodiments, Compliance Manager 118 is responsible for verifying whether the data assets 106 comply with the data governance policies 102. Compliance Manager 118 may use compliance projects 120 to determine whether the data assets 106 comply with the data governance policies 102. More specifically, Compliance Manager 118 may use a compliance project to manage attestations as to whether data assets comply with data standards of the data governance policies 102. As described herein with reference to FIGS. 2D-2E, the attestations may be assigned to various different users (also referred to herein as "attestors") (e.g., Attestors 116A, 116B).

In a compliance project, a system of some embodiments may pair data assets with applicable data standards and provided to Attestors 116A, 116B for them to attest to whether data assets comply with their applicable data standards. The Attestors 116A, 116B are responsible for reviewing data assets and their applicable data standards to determine whether the data assets comply with the application data standards. The Attestors 116A, 116B may provide input indicating their attestation. In some embodiments, the system may further require Attestors 116A to provide information in addition to the attestation such as comments and/or evidence to support an attestation.

Figure 2B:
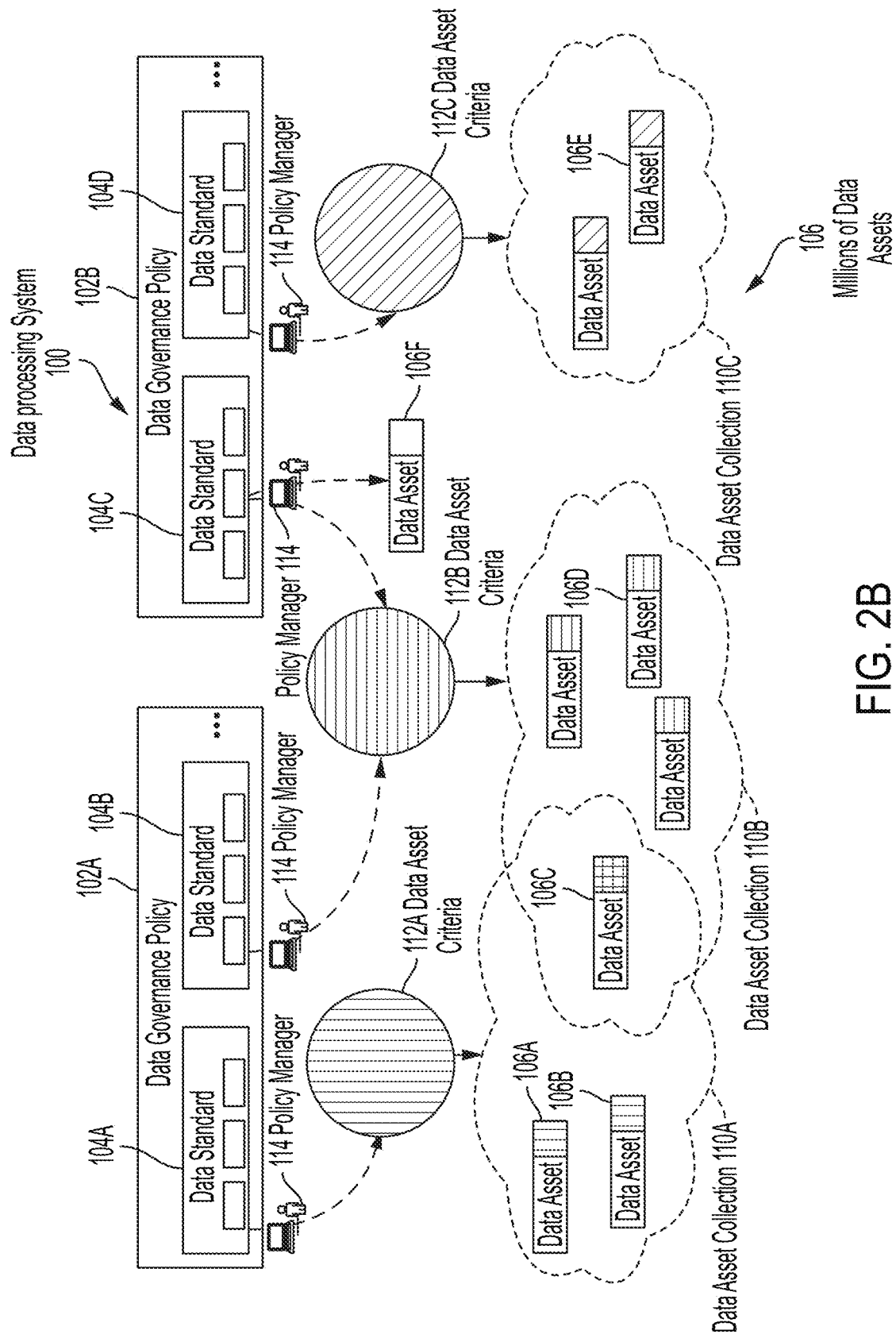
FIG. 2B shows an example system to facilitate data governance in the data processing system 100 of FIG. 2A, according to some embodiments of the technology described herein.

FIG. 2B shows an example system to facilitate data governance in the data processing system 100 of FIG. 2A, according to some embodiments of the technology described herein. As described in reference to FIG. 2A, each of the data governance policies 102 comprises a respective set of data standards. In the example of FIG. 2B, the Data Governance Policy 102A includes Data Standard 104A and Data Standard 104B, while Data Governance Policy 102B includes Data Standard 104C and Data Standard 104D. As indicated by the three dots in each of the data governance policies 102A, 102B, the data governance policies 102A, 102B may include one or more other data standards not shown in FIG. 2B. Each data governance policy may have any suitable number of data standards (e.g., one, two, three, at least five, at least ten, at least 20, between 1 and 10, between 5 and 20, between 1 and 30, or any other suitable range within these ranges). Although the example of FIG. 2B shows each data governance policy with a different set of data standards, in some embodiments, data governance policies may share a data standard. For example, Data Standard 104A may be included in Data Governance Policy 102B in addition to Data Governance Policy 102A.

As an illustrative example, the Data Governance Policy 102A may state that data input to an application must come from a trusted source. Data Standard 104A of Data Governance Policy 102A may indicate that data used by the application must come from a list of trusted sources; and (2) Data Standard 104B may indicate that social security numbers used by the application must be from a particular database. Data Governance Policy 102B may state that user identification numbers must adhere to a standard format. Data Standard 104C may indicate that social security numbers must have the format "NNN-NN-NNNN" where N is a digit between 0 and 9. Data Standard 104D may indicate that phone numbers must have the format "(NNN)NNN-NNNN" where N is a digit between 0 and 9. The Data Standards 102A, 102B, 104A, 104B thus provide specific requirements of compliance that demonstrate adherence of data assets to the data governance policies 102, 104.

As shown in FIG. 2B, the system organizes the data assets 106 into Data Asset Collections 110A, 110B, 110C. The system may be configured to generate each data asset collection using a respective set of one or more data asset criteria. In the example of FIG. 2B, the Data Asset Collection 110A is generated using Data Asset Criteria 112A, the Data Asset Collection 110B is generated using Data Asset Criteria 112B, and the Data Asset Collection 110C is generated using Data Asset Criteria 112C. The system may be configured to generate a data asset collection using a set of criteria by: (1) identifying data assets of the millions of data assets 106 that meet the criteria; and (2) including the identified data assets as members of the data asset collection. For example, the Data Asset Criteria 112A may include a criterion that data assets are sourced from the United States for use in an application, Data Asset Criteria 112B may include a criterion that data assets include social security numbers of customers, and Data Asset Criteria 112C may include a criterion that data assets include contact information for people in Brazil. The system may use the sets of Data Asset Criteria 112A, 112B, 112C to generate: (1) Data Asset Collection 110A comprising data assets that include information sourced from the United States; (2) Data Asset Collection 110B comprising data assets that include social security numbers of customers; and (3) Data Asset Collection 110C comprising data assets that include contact information for people in Brazil. In the example of FIG. 2B, the Data Asset Collection 110A includes Data Assets 106A, 106B, 106C the Data Asset Collection 110B includes Data Asset 106C, 106D, and the Data Asset Collection 110C includes Data Asset 106E.

As indicated by the pattern filled portion of each data asset in the Data Asset Collections 110A, 110B, 110C, the data assets in Data Asset Collections 110A, 110B, 110C meet corresponding Data Asset Criteria 112A, 112B, 112C. For example, Data Assets 106A, 106B, 106C meet Data Asset Criteria 112A, as indicated by the pattern of vertical lines. Data Assets 106C, 106D meet Data Asset Criteria 112B as indicated by the pattern of horizontal lines. Data Asset 106C includes a pattern of horizontal and vertical lines because it meets Data Asset Criteria 112A and Data Asset Criteria 112B. Data Asset 106E includes a pattern of diagonal lines because it meets Data Asset Criteria 112C.

As shown in the example of FIG. 2B, in some embodiments, data assets may be members of multiple data asset collections. In FIG. 2B, Data Asset 106C is a member of both Data Asset Collection 110A and Data Asset Collection 110B. Continuing with the previous example, Data Asset 106C may include a social security number sourced in the United States and thus be a member of both Data Asset Collection 110A and Data Asset Collection 110B. In some embodiments, the system may associate a data standard with multiple data asset collections. For example, the system may further associate Data Standard 104B with Data Asset Collection 110C.

Policy Manager 114 may associate data standards with data asset collections that the data standards apply to. As illustrated in the example of FIG. 2B, Policy Manager 114 may associate a data standard with a data asset collection by associating the data standard with data asset criteria used to generate the data asset collection. For example, Policy Manager 114 may associate a data standard to a data asset collection by selecting the data asset collection from a list. In another example, the Policy Manager 114 may: (1) create a set of data asset criteria defining a new data asset collection; and (2) associate a data standard to the new data asset collection. Accordingly, Policy Manager 114 does not need to manually associate each data standard with individual data assets 106. In the example of FIG. 2B, Policy Manager 114 has associated Data Standard 104A with Data Asset Collection 110A via Data Asset Criteria 112A, Data Standard 104B with Data Asset Collection 110B via Data Asset Criteria 112B, Data Standard 104C with Data Asset Collection 110B via Data Asset Criteria 112B, and Data Standard 104D with Data Asset Collection 110C via Data Asset Criteria 112C.

As illustrated in FIG. 2B, the system may further be configured to associate a data standard directly with a data asset in addition to or instead of associating the data standard with a data asset collection. In the example of FIG. 2B, Policy Manager 114 has associated Data Standard 104C with Data Asset 106F. The system may use the association of Data Standard 104C with the Data Asset 106F to determine whether the Data Asset 106F complies with Data Standard 104C. Data Asset 106F does not belong to any of Data Asset Collections 110A, 110B, 110C shown in FIG. 2B as indicated by its lack of a pattern fill.

As illustrated by FIG. 2B, the system uses the data asset criteria as a layer of abstraction between the data standards and the data assets to which the data standards apply. By creating this layer of abstraction, the system provides a dynamic association between the data standards and data assets. When a data asset no longer meets a set of data asset criteria corresponding to a data asset collection, the system may no longer include data asset in the data asset collection. This in turn removes its association with data standard(s) that the data asset collection is associated with. Likewise, when a data asset is updated to meet a set of data asset criteria corresponding to a data asset collection, the system may include the data asset in the data asset collection and thus automatically associate the data asset with any applicable data standard(s).

Figure 2C:
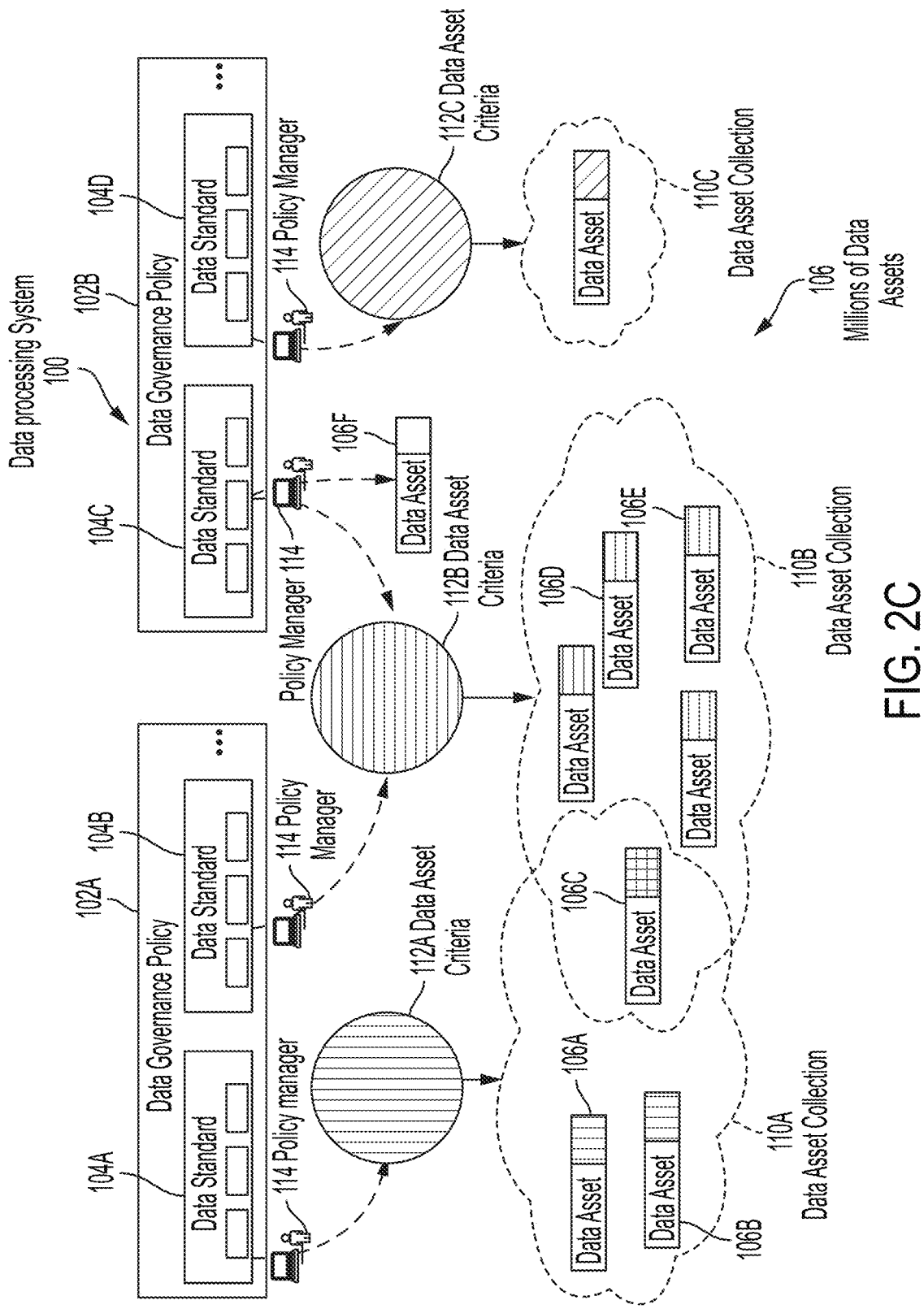
FIG. 2C shows the system of FIG. 2B after an update to data assets, according to some embodiments of the technology described herein.

In some embodiments, the Data Asset Collections 110A, 110B, 110C may be dynamic. The system may be configured to update the membership of each data asset collection in response to updates to data assets. For example, the system may add one or more data assets to and/or removed one or more data assets from a data asset collection based on whether the data asset(s) meet one or more criteria that define the data asset collection. FIG. 2C shows the system of FIG. 2B after an update to some data assets, according to some embodiments of the technology described herein. In the example of FIG. 2C, the Data Asset 106E has been updated such that it no longer meets the Data Asset Criteria 112C and does meet the Data Asset Criteria 112B. As a result, the membership of Data Asset Collection 110B has been updated to include Data Asset 106E, and the membership of Data Asset Collection 110C has been updated to not include Data Asset 106E. In some embodiments, the system may be configured to periodically determine membership of data asset collections (e.g., every hour, daily, weekly, monthly, or other suitable period). In some embodiments, the system may be configured to determine membership of data asset collections in response to an action. For example, the system may determine membership of data asset collections when a compliance project is created. In another example, the system may determine membership of data asset collections when a user requests to view information about data asset collection and/or an associated data standard.

Figure 2D:
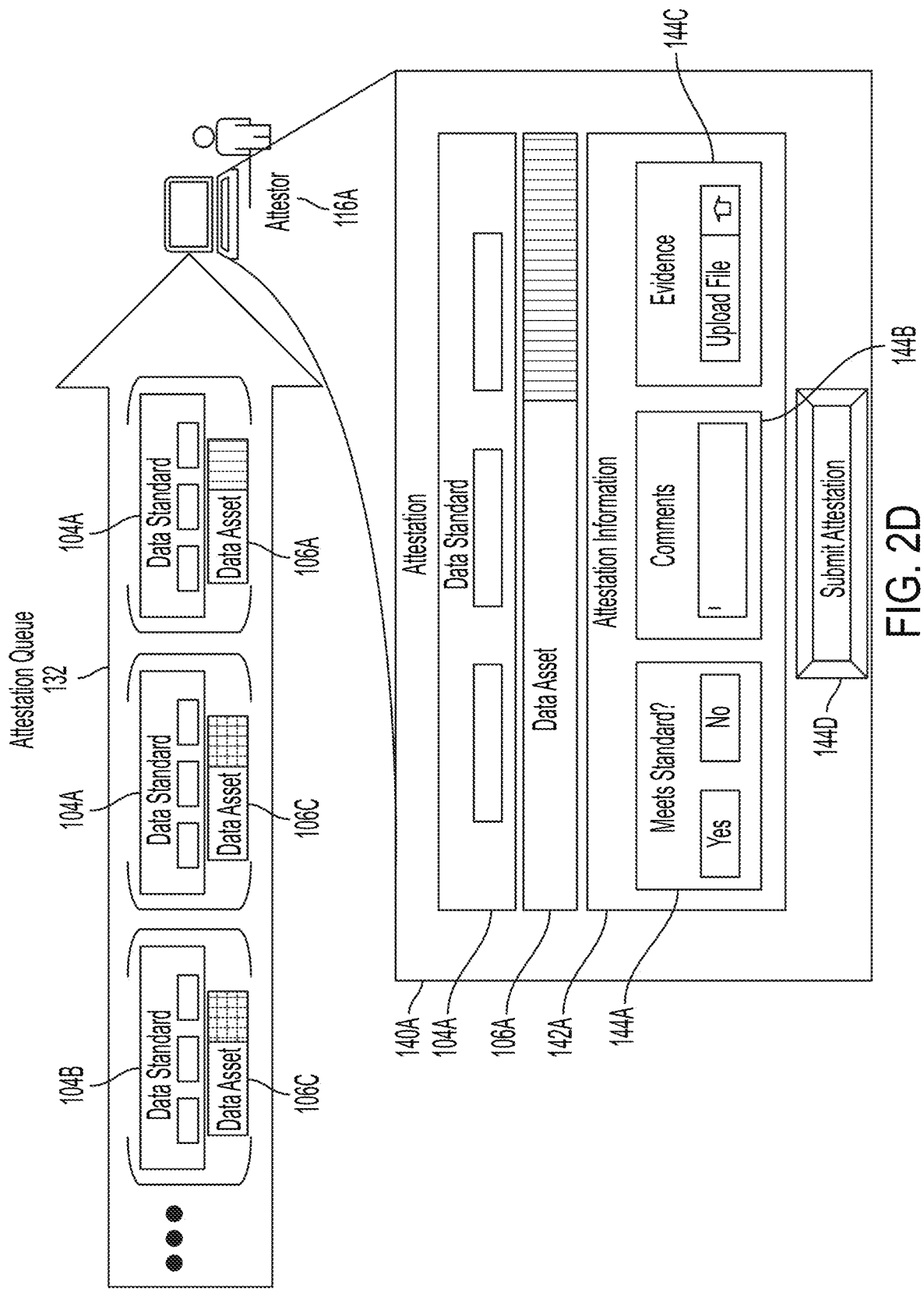
FIG. 2D shows an example of how the system of FIG. 2B obtains an attestation, according to some embodiments of the technology described herein.

FIG. 2D shows an example of how the system of FIG. 2B obtains attestations of whether data assets comply with data standards, according to some embodiments of the technology described herein. As shown in the example of FIG. 2D, the system pairs data standards with corresponding data assets in attestations which are provided to Attestor 116A through an attestation queue 132 of Attestor 116A. The attestation queue 132 may be a set of attestations that are to be performed by the Attestor 116A. For example, the system may store a queue of attestations that are to be performed by a user. As illustrated in FIG. 2D, the system may be configured to generate an attestation by paring a data standard with one or more data assets in a data asset collection that the data standard is associated with (e.g., via corresponding data asset criteria). In the example of FIG. 2D, the system pairs Data Standard 104A with Data Asset 106A, Data Standard 104A with Data Asset 106C, and Data Standard 104B with Data Asset 106C. The system may be configured to determine the pairings based on the association of Data Standard 104A with Data Asset Collection 110A, and the association of Data Standard 104B with Data Asset Collection 110B shown in FIG. 2B.

The system may be configured to add an attestation to the attestation queue 132 by: (1) determining whether the Attestor 116A is responsible for performing the attestation; and (2) adding the attestation to the attestation queue 132 when it is determined that the Attestor 116A is responsible for the attestation. In some embodiments, the system may be configured to determine that the Attestor 116A is responsible for an attestation based on information from a data asset involved in the attestation. For example, the data asset may store an attribute indicating a user who is in charge of managing the data asset (e.g., a data steward). In this example, the system may determine that the Attestor 116A is responsible based on determining that the user indicated by the attribute is Attestor 116A. In some embodiments, the system may be configured to determine that the Attestor 116A is responsible for an attestation based on input from another user. For example, the Compliance Manager 118 may provide input indicating that the Attestor 116A is responsible for an attestation. The system may be configured to transmit information to a computing device associated with Attestor 116A. For example, the system may transmit the information through a communication network (e.g., the Internet) to the computing device. The information includes information about the data standards and data assets paired in attestations that are assigned to Attestor 116A.

FIG. 2D further illustrates an example graphical user interface (GUI) through which the Attestor 116A would perform an attestation. In the example of FIG. 2D, the GUI shows an Attestation 140A of whether Data Asset 106A complies with the Data Standard 104A. The GUI provides the Attestor 116A with access to the Data Standard 104A and the Data Asset 106A so that the Attestor 116A can determine compliance. In some embodiments, the GUI may provide access to information about the Data Standard 104A. For example, the GUI may display a name and/or description of the Data Standard 104A. In another example, the GUI may provide the Attestor 116A with a link that, when selected, directs the user to a GUI displaying information about the Data Standard 104A. In some embodiments, the GUI may provide access information about the Data Asset 106A. For example, the GUI may display attribute values of the Data Asset 106A, a name of the Data Asset 106A, a description of the Data Asset 106A, and/or other information about the Data Asset 106A. In another example, the GUI may provide the Attestor 116A with a link that, when selected, directs the Attestor 116A to a GUI displaying information about the Data Asset 106A.

As shown in FIG. 2D, the GUI includes a section in which the user may input Attestation Information 142A for the Attestation 140A. The Attestation Information 142A includes input 144A indicating whether the Data Asset 106A complies with Data Standard 104A. As shown in FIG. 2D, the Attestor 116A can select "Yes" or "No" to indicate the attestation. In some embodiments, the input 144A may allow a user to provide input indicating that the Data Asset 106A complies with the Data Standard 104A, does not comply with the Data Standard 104A, partially complies with the Data Standard 104A, or that the Data Asset 106A is still under review. The Attestation Information 142A further includes Comments 144B in which the Attestor 116A may enter further comments for the attestation. In the example of FIG. 2D, the GUI provides a text field in which the user can enter comments. In some embodiments, the user may provide the Comments 144B through speech, text input, or any other suitable input mechanism. The Attestation Information 142A further includes Evidence 144C. In some embodiments, the Attestor 116A may be required to provide Evidence 144C supporting the attestation as to whether the Data Asset 106A meets the Data Standard 104A. In the example of FIG. 2D, the Attestor 116A may upload a file to support the input 144A of whether the Data Asset 106A meets the Data Standard 104A. In some embodiments, the Evidence 144C may include documents, files, screenshots, images, text, audio data, and/or other data as evidence for the Attestation 140A. The GUI of FIG. 2D further provides a "Submit Attestation" button 144D that the Attestor 116A may select to submit the Attestation 140A (e.g., after entering the Attestation Information 142A). The system may update the Attestation 140A in a system in response to selection of the button 144D. For example, the system may upload the Attestation Information 142A into a data object storing information about the Attestation 140A.

In some embodiments, the system may be configured to use Attestation 140A to verify whether the Data Asset 106A complies with the Data Standard 104A. The system may be configured to determine that the Data Asset 106A complies with Data Standard 104A when Attestation Information 142A indicates that the Data Asset 106A complies with the Data Standard 104A. The system may be configured to determine that the Data Asset 106A does not comply with the Data Standard 104A when Attestation Information 142A indicates that the Data Asset 106A does not comply with the Data Standard 104A. The system may be configured to determine that the Data Asset 106A partially complies with the Data Standard 104A when Attestation Information 142A indicates that the Data Asset 106A partially complies with the Data Standard 104A. In some embodiments, the system may be configured to obtain Attestation Information 142A from the computing device of the Attestor 116A. In some embodiments, the system may be configured to generate an attestation object, and store Attestation Information 142A in the attestation object. The attestation object may provide a record of the verification for reference (e.g., for review by Compliance Manager 118).

Figure 2E:
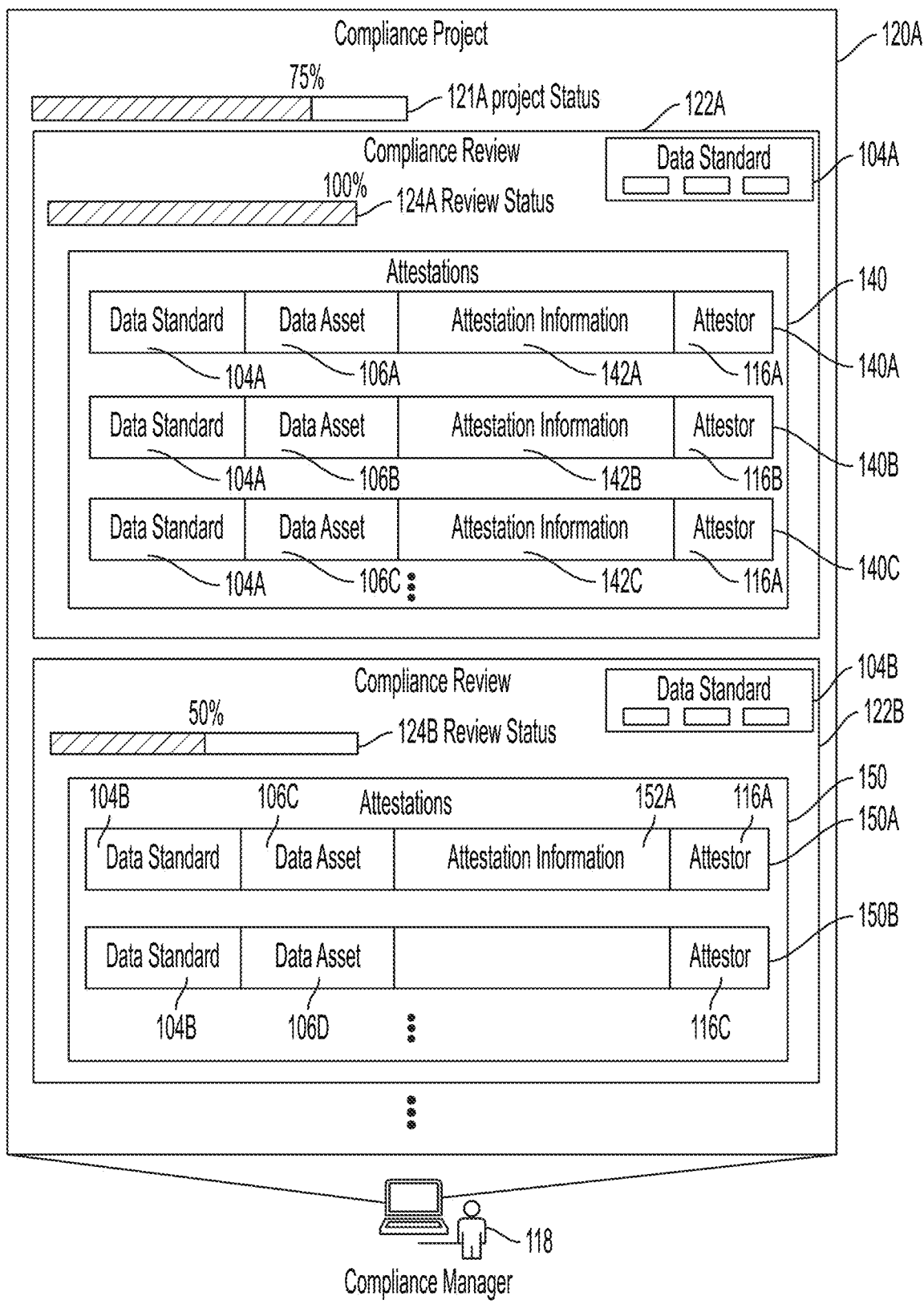
FIG. 2E shows an example graphical user interface (GUI) for a compliance project, according to some embodiments of the technology described herein.

FIG. 2E shows an example graphical user interface for Compliance Project 120A, according to some embodiments of the technology described herein. In some embodiments, a system may provide the GUI shown in FIG. 2E to the Compliance Manager 118 for the Compliance Manager 118 to determine compliance of data assets with data governance policies. For example, the system may create Compliance Project 120A to determine whether data assets comply with Data Governance Policy 102A. In the example of FIG. 2E, Compliance Project 120A includes Compliance Reviews 122A, 122B. Compliance Review 122A is for determining compliance of data assets with Data Standard 104A, and Compliance Review 122B is for determining compliance of data assets with Data Standard 104B. Example techniques for generating a compliance project are described herein with reference to FIG. 3 and FIG. 7.

As shown in FIG. 2E, Compliance Review 122A includes Attestations 140. The Attestations 140 may include an attestation for each data asset in data asset collection(s) associated with Data Standard 104A. In the example of FIG. 2E, the Attestations 140 include Attestations 140A, 140B, 140C. Attestation 140A includes a pairing of Data Standard 104A with Data Asset 106A, and Attestation Information 142A. Attestation 140B includes a pairing of Data Standard 104A with Data Asset 106B, and Attestation Information 142B. Attestation 140C includes a pairing of Data Standard 104A with Data Asset 106C, and Attestation Information 142C. As shown in FIG. 2E, each of Attestations 140A, 140B, 140C is assigned to respective Attestors 116A, 116B, 116A. The attestation information may be provided by an attestor as described herein with reference to FIG. 2D.

As shown in FIG. 2E, Compliance Review 122B includes Attestations 150. The Attestations 150 may include an attestation for each data asset in data asset collection(s) associated with Data Standard 104B. In the example of FIG. 2E, the Attestations 150 include Attestations 150A, 150B. Attestation 150A includes a pairing of Data Standard 104B with Data Asset 106C, and Attestation Information 152A. Attestation 150B includes a pairing of Data Standard 104B with Data Asset 106D. As shown in FIG. 2E, each of Attestations 150A, 150B is assigned to respective Attestors 116A, 116C. The attestation information may be provided by an attestor as described herein with reference to FIG. 2D. Attestation 150B does not include attestation information as Attestor 116C may not have submitted any attestation information. For example, Attestation 150B may be in an attestation queue for the Attestor 116C, but has not yet been performed by the Attestor 116C. In another example, the Attestor 116C may not have selected a "Submit Attestation" button in a GUI to submit attestation information.

The GUI of FIG. 2E includes status indications for Compliance Project 120A and for Compliance Reviews 122A, 122B. The Project Status 121A indicates a percentage of the compliance reviews of Compliance Project 120A that have been completed. In the example of FIG. 2E, 75% of the compliance reviews of Compliance Project 120A have been completed. Review Status 124A of Compliance Review 122A indicates that it is 100% complete. This may indicate that all of the Attestations 140 of Compliance Review 122A are complete. Review Status 124B of Compliance Review 122B indicates that it is 50% complete. This may indicate that 50% of the Attestations 150 of Compliance Review 122B are completed. In some embodiments, the system may determine the Project Status 121A using Review Statuses 124A, 124B. In the example of FIG. 2E, the system may average Review Status 124A indication of 100% complete with Review Status 124B indication of 50% to obtain the Project Status 121A indication of 75%.

Figure 2F:
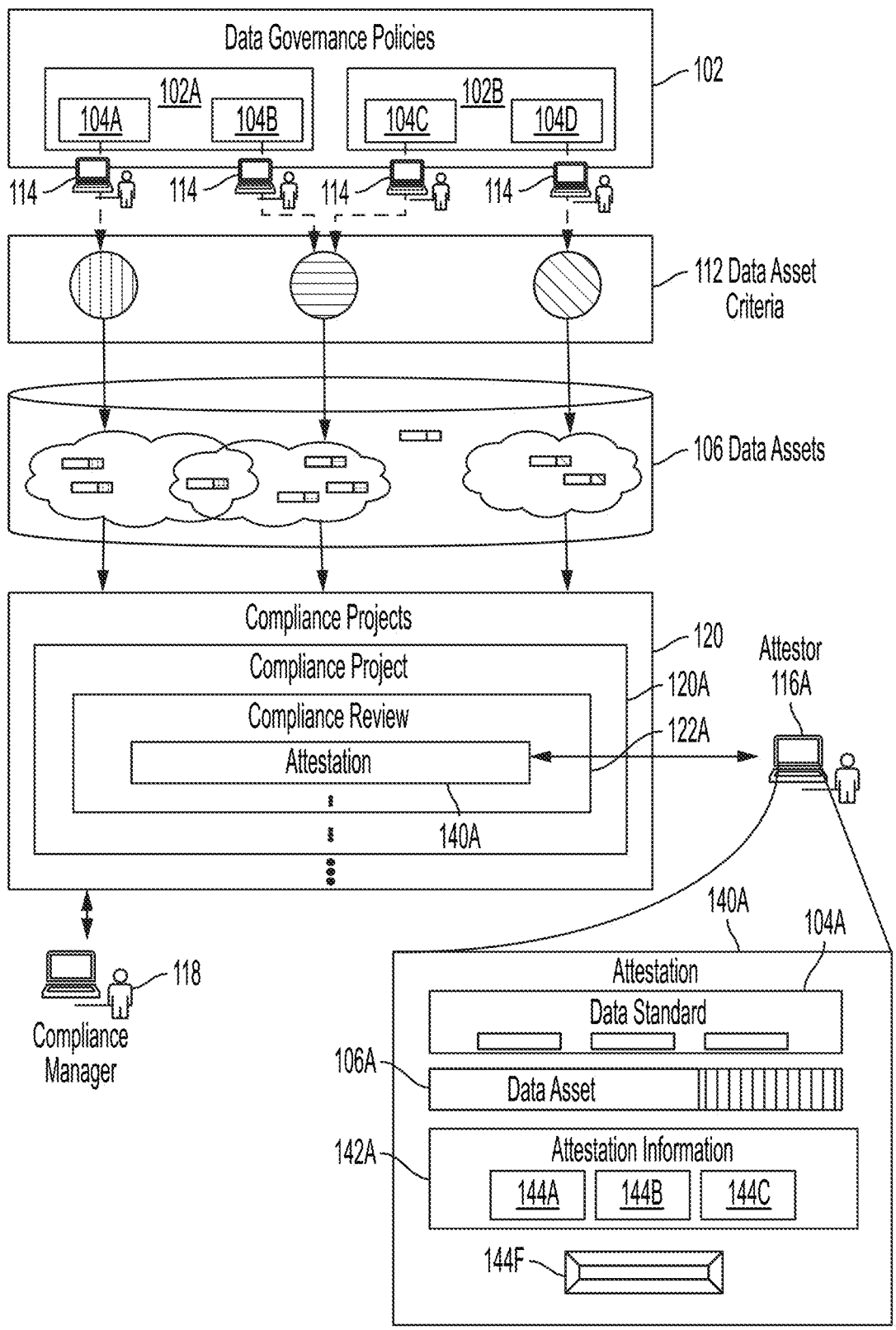
FIG. 2F shows a diagram illustrating interaction among components of the example system to facilitate governance in the data processing system 100, according to some embodiments of the technology described herein.

FIG. 2F shows a diagram illustrating interaction among components of the data processing system 100, according to some embodiments of the technology described herein. As shown in FIG. 2F, the data standards of Data Governance Policies 102A, 102B are associated with respective collections of the data assets 106 through respective sets of data asset criteria 112. For example, Policy Manager 114 may associate Data Standards 104A, 104B, 104C, 104D with data asset criteria as described herein with reference to FIG. 2B. The system may use the data asset collections to generate compliance projects 120. Compliance Manager 118 may use the compliance projects 120 to determine compliance of the data assets with Data Governance Policies 102A, 102B as described herein with reference to FIG. 2E. As shown in FIG. 2E, each compliance project includes one or more compliance reviews, each of which includes one or more attestations. Attestors may submit attestation information, which the system stores in the attestations. Attestor 116A submits Attestation Information 142A for Attestation 140A as described herein with reference to FIG. 2C.

Figure 3:
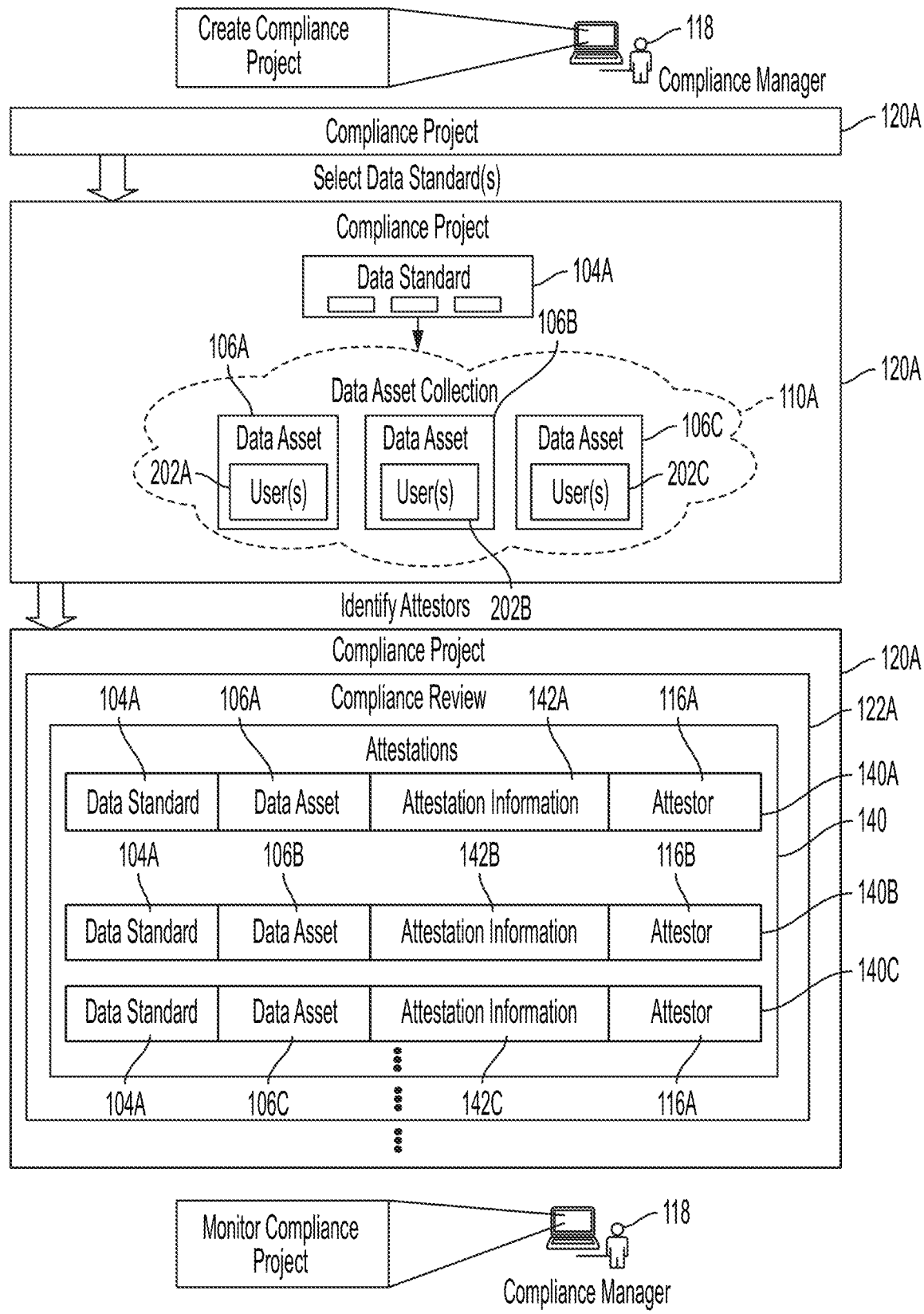
FIG. 3 shows a diagram illustrating a generation of an example compliance project, according to some embodiments of the technology described herein.

FIG. 3 shows a diagram illustrating a generation of an example compliance project 120A, according to some embodiments of the technology described herein. The process depicted by FIG. 3 may be performed by a data governance system of data processing system 100 described herein with reference to FIGS. 2A-2F. The system may generate compliance project 120A to verify whether one or more data assets of a data asset collection comply with one or more data standards.

As shown in FIG. 3, the system first generates the compliance project 120A. After generating the compliance project 120, the system identifies, using the data governance system illustrated by FIG. 2B, an association of Data Asset Collection 110A with Data Standard 104A. The system may be configured to use the association of Data Asset Collection 110A with Data Standard 104A to identify the assets that are to be reviewed in the compliance project 120A. In some embodiments, the system may be configured to use Data Asset Criteria 112A corresponding to Data Asset Collection 110A to identify the data assets. The system may be configured to identify Data Asset 106A, Data Asset 2 106B, and Data Asset 106C as meeting the Data Asset Criteria 112A (e.g., that the data assets include data sourced from the United States). The identified data assets may be those that are determined to be members of the Data Asset Collection 110A at a point in time. For example, the system may use attributes of data assets at a point when the compliance project 120A is generated to determine whether the data assets are members of the Data Asset Collection 110A. In another example, the system may use a previously determined membership of the Data Asset Collection 110A to identify the data assets.

As shown in FIG. 3, each of the data assets 106A, 106B, 106C is associated with one or more users. Data Asset 106A is associated with User(s) 202A, Data Asset 106B is associated with User(s) 202B, and Data Asset 106C is associated with User(s) 202C. In some embodiments, the system may identify a user responsible for a data asset using data in the data asset. For example, the data asset may include an attribute identifying the user. In some embodiments, the user may be one responsible for management of the data asset. For example, the user may be one specified as a "Business Data Steward" of the data asset. An identifier (e.g., name, identification number, or other identifier) may be stored as an attribute value in the data asset.

After identifying an association of Data Asset Collection 110A with Data Standard 104A, the system identifies users to attest whether the data assets 106A, 106B, 106C comply with Data Standard 104A. In some embodiments, the system may be configured to automatically identify users indicated by an attribute (e.g., a business data steward) of each of the data assets 106A, 106B, 106C as the users to attest whether the data assets 106A, 106B, 106C comply with Data Standard 104A. As shown in FIG. 3, the system identifies: (1) Attestor 116A to attest whether Data Asset 106A complies with Data Standard 104A; (2) Attestor 116B to attest whether Data Asset 106B complies with Data Standard 104A; and (3) Attestor 116A to attest whether Data Asset 106C complies with Data Standard 104A.

In some embodiments, the system may be configured to provide each user with information to perform the attestation (e.g., as described herein with reference to FIG. 2D). In the example of FIG. 3, the system may provide Attestor 116A with information indicating Data Standard 104A and information (e.g., attribute values) about Data Asset 106A and Data Asset 106C. The system may provide Attestor 116B with information indicating Data Standard 104A and information (e.g., attribute values) about Data Asset 2 106B. For example, the system may provide attestations to the attestators in respective queues of the attestors. An attestator may perform an attestation using a GUI such as one described herein with reference to FIG. 2D.

Figure 4A:
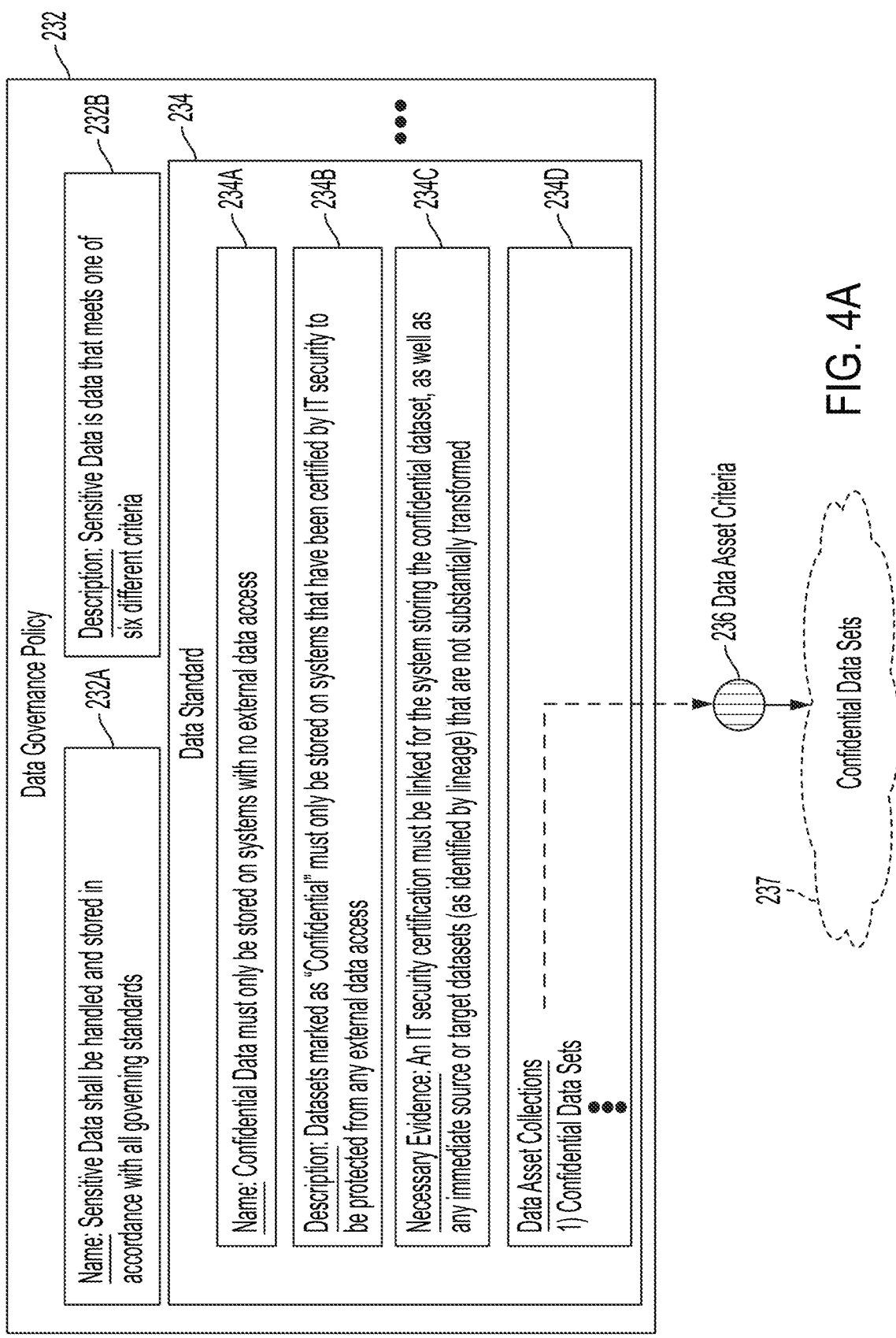
FIG. 4A shows an example of a Data Governance Policy 232 and constituent Data Standard 234, according to some embodiments of the technology described herein.

FIG. 4A shows an example of a Data Governance Policy 232 and constituent Data Standard 234, according to some embodiments of the technology described herein. The Data Governance Policy 232 may include other data standards not shown in FIG. 4B as indicated by the dots in the Data Governance Policy 232. The Data Governance Policy 232 includes a name 232A "Sensitive Data shall be handled and stored in accordance with all governing standards." The data governance policy further includes a description 232B "Sensitive Data is data that meets one or six different criteria". In some embodiments, the Data Governance Policy 232 may further include a listing of data standards of the Data Governance Policy 232. In some embodiments, the Data Governance Policy 232 may include a reference to the data standards.

Data Standard 234 includes a name 234A "Confidential Data must only be stored on systems with no external data access". The Data Standard 234 includes a description 234B: "Datasets marked as 'Confidential' must only be stored on systems that have been certified by IT security to be protected from any external data access". The Data Standard 234 includes an indication of attestation evidence 234C needed to confirm compliance with the Data Standard 234: "An IT security certification must be linked for the system storing the confidential dataset, as well as any immediate source or target datasets (as identified by lineage) that are not substantially transformed". The Data Standard 234 includes a listing 234D of data asset collections that the Data Standard 234 is associated with (e.g., "Confidential Datasets"). As shown in the example of FIG. 4A, the Data Standard 234 is associated with the data asset collection Confidential Data Sets 237 through an association with Data Asset Criteria 236 corresponding to Confidential Data Sets 237. The Data Standard 234 may be associated with the Data Asset Criteria 236 and/or Confidential Data Sets 237 as described herein with reference to FIG. 2B.

Figure 4B:
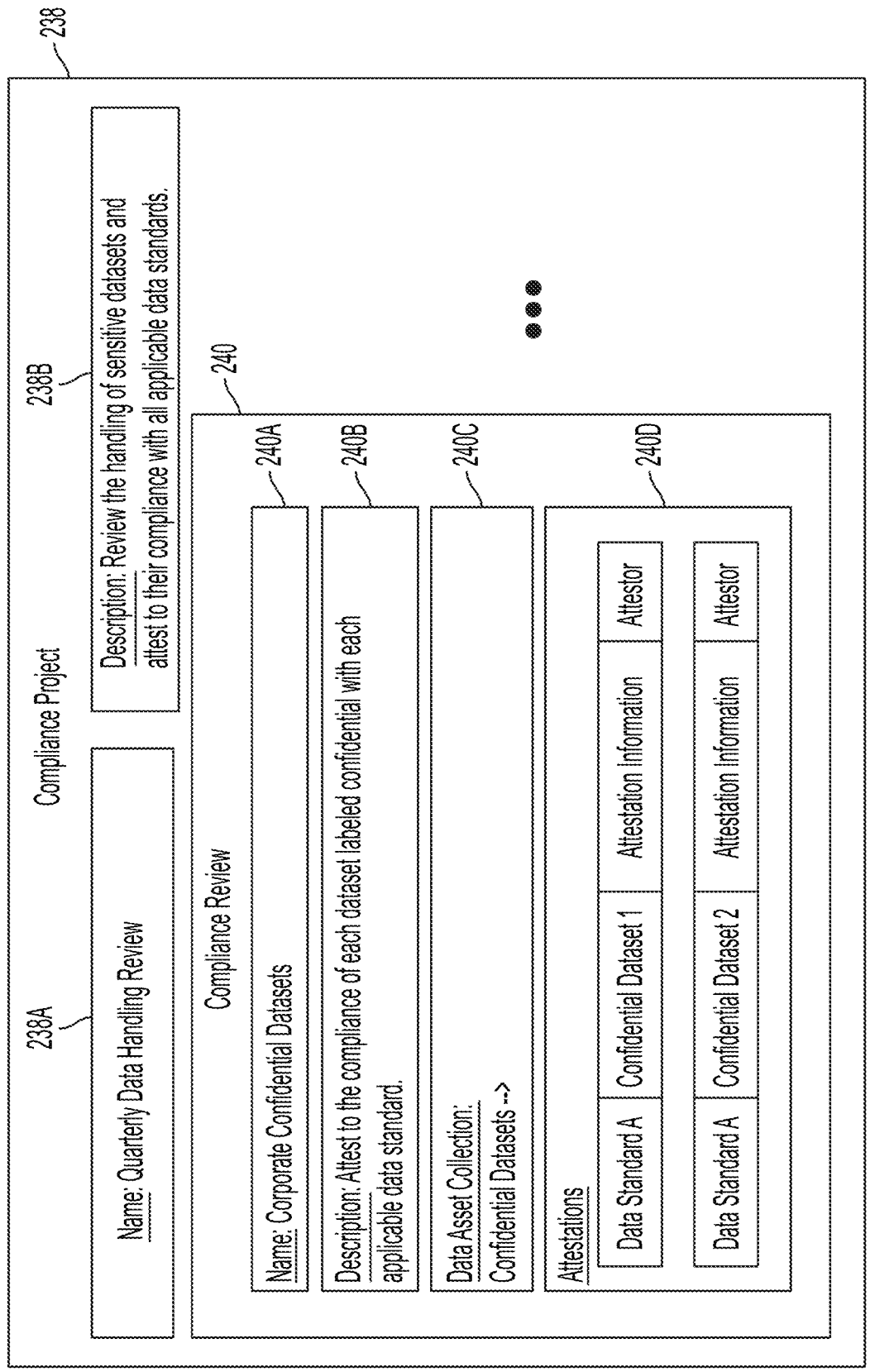
FIG. 4B shows an example of a Compliance Project 238 and constituent compliance review 122, according to some embodiments of the technology described herein.

FIG. 4B shows an example of a Compliance Project 238 and constituent Compliance Review 240, according to some embodiments of the technology described herein. The Compliance Project 238 may include other compliance reviews not shown in FIG. 4B, as indicated by the dots. The Compliance Project 238 includes a name 238A: "Quarterly Data Handling Review". The Compliance Project 238 includes a description 238B: "Review the handing of sensitive datasets and attest to their compliance with all applicable data standards". In some embodiments, the Compliance Project 238 may further include a listing of compliance reviews that are part of the Compliance Project 238.

Compliance Review 240 includes a name 240A: "Corporate Confidential Datasets". The Compliance Review 240 further includes a description 240B: "Attest to the compliance of each dataset labeled confidential with each applicable data standard". The Compliance Review 240 further includes a listing 240C of data asset collection(s) that the Compliance Review 240 may be associated with. In the example of FIG. 2E, the listing 240C includes the data asset collection "Confidential Datasets". The data asset collection may be one that is associated with a data standard associated with the Compliance Review 240. The Compliance Review 240 further includes a listing 240D of attestations that are part of the Compliance Review 240 (e.g., "Confidential Dataset 1" paired with "Data Standard A", and "Confidential Dataset 2" paired with "Data Standard A"). The attestations 240D include respective attestation information and attestors.

Figure 5A:
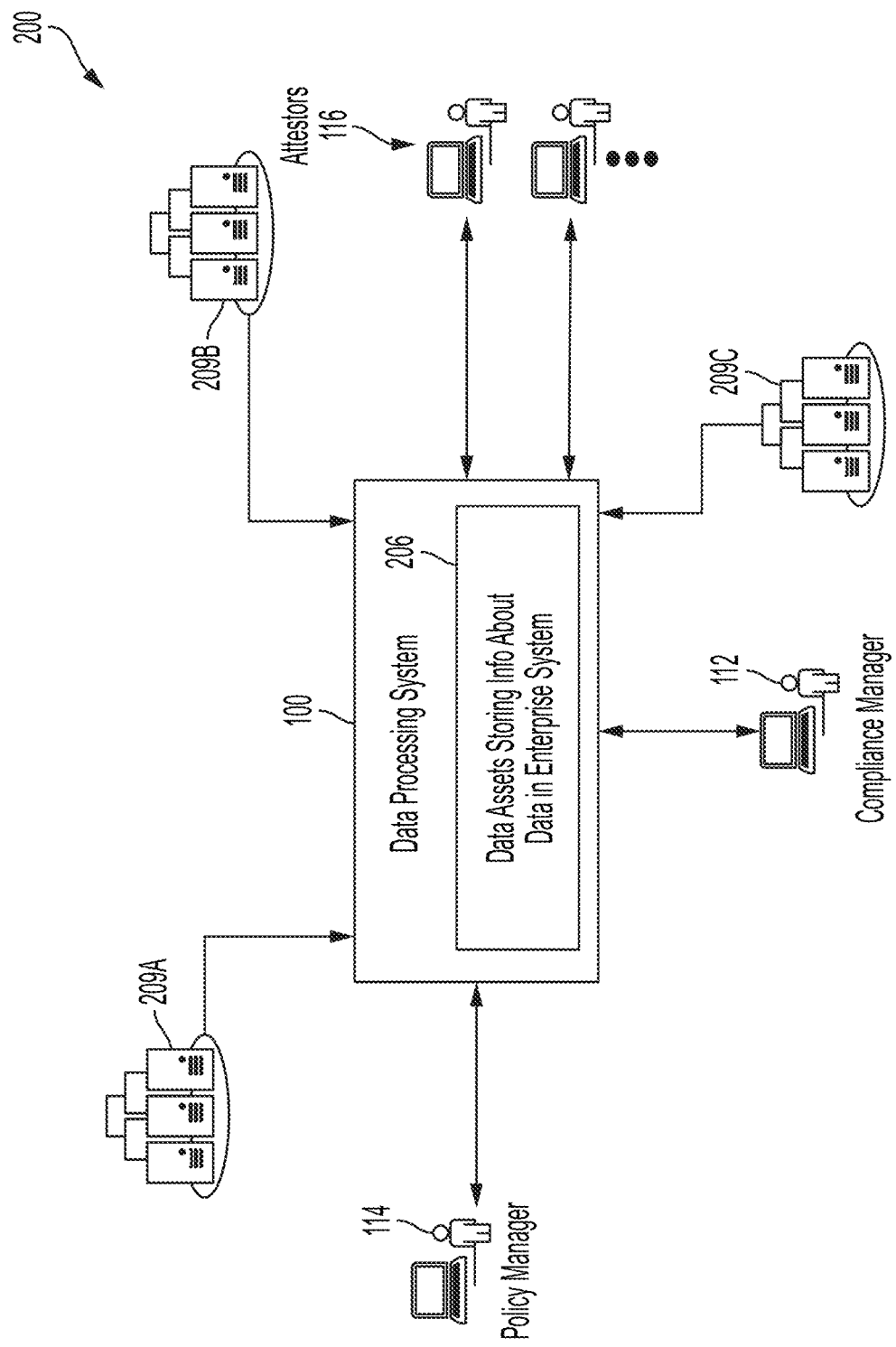
FIG. 5A is a diagram illustrating an example environment 200 in which a data processing system 100 may be used, according to some embodiments of the technology described herein.

FIG. 5A is a diagram illustrating an example environment 200 in which a data processing system 100 may be used, according to some embodiments of the technology described herein. The example of FIG. 5A is an implementation in which the data processing system 100 is used for metadata management. It should be appreciated that techniques described herein are not limited to being applied to any particular type of data and may be used within any data processing system using data assets to manage data irrespective of whether the managed data is metadata or any other type of data (e.g., transactions, files, data records, tables, etc.).

FIG. 5A illustrates an enterprise system comprising systems 209A, 209B, 209C. The systems 209A, 209B, 209C may be distributed across multiple geographic locations (e.g., different cites, countries, continents, etc.). Each of the systems 209A, 209B, 209C may store vast amounts of data (e.g., in one or more database systems, data warehouses, data lakes, etc.). For example, the systems 209A, 209B, 209C may be components of an enterprise system of a global bank, with the system 209A being located in the United States, system 209B being located in Brazil, and system 209C being located in Europe.

As shown in the example embodiment of FIG. 2A, each of the systems 209A, 209B, 209C includes a respective set of computing devices. For example, each of the systems may include one or more servers, user devices, and/or databases. During operation of the enterprise system, each of the systems 209A, 209B, 209C may generate and/or store large amounts of data (e.g., terabytes of data). For example, the enterprise system may be for a credit card company, where each of the systems 209A, 209B, 209C generates and/or stores transaction data, credit scores, and/or any other suitable data. In another example, the enterprise system may be for a bank, where each of the systems 209A, 209B, 209C generates and/or stores data about bank records, loans, account holders, and/or any other suitable data. In another example, the enterprise system may be for a phone company, where each of the systems 209A, 209B, 209C generates and/or stores data about phone calls, text messages, data usage, and/or any other suitable data.

In some embodiments, the systems 209A, 209B, 209C may be configured to store data (e.g., of an enterprise system). Each of the systems 209A, 209B, 209C may comprise a database, data warehouse, data lake, and/or any other database system. The systems 209A, 209B, 209C may be of any suitable type(s) of database systems, either the same type or different types. For example, each of these systems may include one or more relational database systems (e.g., ORACLE, SQL SERVER, etc.) As another example, in some embodiments, each of these systems may include one or more other types of database systems (e.g., non-relational (e.g., NoSQL) database system, a multi-file system, or any other suitable type of database system).

In the example embodiment of FIG. 2A, the data processing system 100 stores information 207 describing data stored in the systems 209A, 209B, 209C. In this sense, the information 207 may be considered to be metadata. The metadata may include any of numerous types of information about the data stored in the enterprise systems 209A, 209B, 209C. For example, the metadata may include information about systems that process data, software applications executing on the enterprise system that are used to process data, and/or rules for the applications in storing the data. In another example, the metadata may include information about data throughout the enterprise software system such as how the data were generated, the size of data, description of the data, which user(s) are permitted to read, update, create, delete or perform any other action with respect to the data, and/or any other suitable information about the data.

In some embodiments, the data processing system 100 may be configured to manage the metadata using data assets. For example, the data processing system 100 may store a data asset for each of multiple datasets (e.g., tables) stored by the enterprise system. Each such data asset may store information about the dataset (e.g., when the dataset was created or updated, where the dataset is stored, size of the dataset, the identity of the user(s) that are allowed to read, edit, delete, or perform any other suitable action with respect to the dataset, information identifying which software applications use the dataset, information identifying the sensitivity level of the data in the dataset, and/or any other suitable metadata). As another example, the data processing system 100 may store data assets for respective columns of tables in the enterprise system. Each such a data asset may store information about the column (e.g., the meaning of the values in the column, who is authorized to read, write, update, and/or delete values in the column, the range of permitted values of entries in the column, and/or any other suitable metadata). As yet another example, the data processing system 100 may store a data asset for each of multiple software applications configured to be executed by some system or device part of the enterprise system. Such a data asset may store information about the software application (e.g., which datasets the software application processes, where the application puts its output, a description of the application's functionality, the application's version, the application's dependency on data and/or other applications, where the executables of the application may be found, and/or any other suitable metadata). As yet another example, the data processing system 100 may store a data asset for each of multiple systems that are part of the enterprise system.

As can be readily appreciated from the foregoing, in such a metadata management scenario, the data processing system 100 may manage millions or billions of such data assets, which is why it is important to efficiently verify whether data assets comply with applicable data standards.

In some embodiments, the data processing system 100 may be configured to obtain the information about data from the various systems 209A, 209B, 209C. For example, the data processing system 100 may query databases of the systems 209A, 209B, 209C for metadata of the various systems 209A, 209B, 209C. In some embodiments, the data processing system 100 may be configured to generate metadata using information obtained from the systems 209A, 209B, 209C (e.g., by querying database systems for metadata). In some embodiments, the data processing system 100 may be configured to store metadata about data stored in the systems 209A, 209B, 209C. For example, the systems 209A, 209B, 209C may each be a data lake, data warehouse, database system, or other type of system. The metadata may be stored using data assets, as described herein.

In some embodiments, the data processing system 100 may be configured to store data governance policies and/or data standards as data assets of the data processing system 100. For example, the data processing system 100 may store Data Governance Policy 102A as a data asset. The data asset may include information (e.g., stored in one or more attribute fields). The data asset may store information indicating the data standards 104A, 104B of Data Governance Policy 102A. For example, the data asset may store references to the data standards 104A, 104B, which may each be stored as respective data assets managed by the data processing system 100. A data asset storing a data governance policy ("data governance policy asset") may store information including a textual description of the data governance policy. For example, the data governance policy asset may include a statement of the policy. A data asset storing a data standard ("data standard asset") may include a textual description of a measure of compliance with a data governance policy. For example, a data standard asset for Data Standard 104A may include a textual description of a compliance measure for a data asset (e.g., that the data asset must be from one of a trusted list of sources).

The data processing system 100 may be configured to associate a data standard with one or more data asset collections as described herein with reference to FIG. 2B. In some embodiments, the data processing system 100 may be configured to associate a data standard with a data asset collection by storing an association of the data standard with the data asset collection. For example, the system may store an association of Data Standard 104A with Data Asset Collection 110A. The system may store an indication of the Data Asset Collection 110A as part of data standard asset of Data Standard 104A. For example, the data standard asset may include a field listing associated data asset collections. The data standard asset of Data Standard 104A may list Data Asset Collection 110A in the field. In some embodiments, a data standard asset may include reference(s) to one or more data asset collections that the data standard is associated with.

In some embodiments, the data processing system 100 may be configured to dynamically update membership of data asset collections. The data processing system 100 may be configured to determine membership of a data asset collection at a point in time by: (1) selecting one or more data assets using one or more criteria that define the data asset collection; and (2) including the selected data asset(s) in the data asset collection. In some embodiments, the data processing system 100 may be configured to update membership of a data asset collection when an attestation that data assets of the data asset collection is to be performed (e.g., to provide an updated listing of data assets for which attestations are to be performed). In some embodiments, the data processing system 100 may be configured to periodically update membership of a data asset collection (e.g., once a day, once a week, once a month, or other suitable time interval). In some embodiments, the data processing system 100 may be configured to update membership of a data asset collection in response to a command (e.g., a command input by a user).

In some embodiments, a user identified for a pairing of a data standard with a data asset may be tasked with attesting whether the data asset complies with the data standard. The data processing system 100 may be configured to transmit information about the data asset and the data standard to a computing device associated with the user. The data processing system 100 may be configured to receive, from the computing device, input indicating an attestation by the user as to whether the data asset complies with the data standard. In some embodiments, the data processing system 100 may be configured to generate a workflow through which the user may view information about the data asset and data standard, and provide the input. In some embodiments, the data processing system 100 may be configured to provide a graphical user interface (GUI) that guides the user through an attestation process. The system may be configured to verify whether the data asset complies with the data standard based on the input indicating the attestation.

In some embodiments, the system may be configured to generate an attestation object. The attestation object may store an association of an identified user with a pairing of a data standard and a data asset. For example, the data processing system 100 may store an association of a user with the pairing of a data standard with a data asset in an attestation object. In some embodiments, an attestation object may be stored as a data asset ("attestation data asset") of the data processing system 100. In some embodiments, the data processing system 100 may be configured to use attestation objects to track a status of a compliance review and/or a compliance project. The system may store a status and/or result of an attestation in the attestation object. The system may be configured to determine a status of a compliance review and/or a compliance project based on statuses of attestations therein (e.g., indicated by attestation objects). In some embodiments, the system may be configured to determine statistics of attestations for compliance reviews and/or compliance projects. The statistics may provide a view of verification of compliance with data policies and/or data standards in the data processing system 100. For example, a user may view information such as a number of compliance projects, a number of compliance reviews, percent completion of a compliance review or project, percent incompletion of a compliance review or project, and other statistics.

Figure 5B:
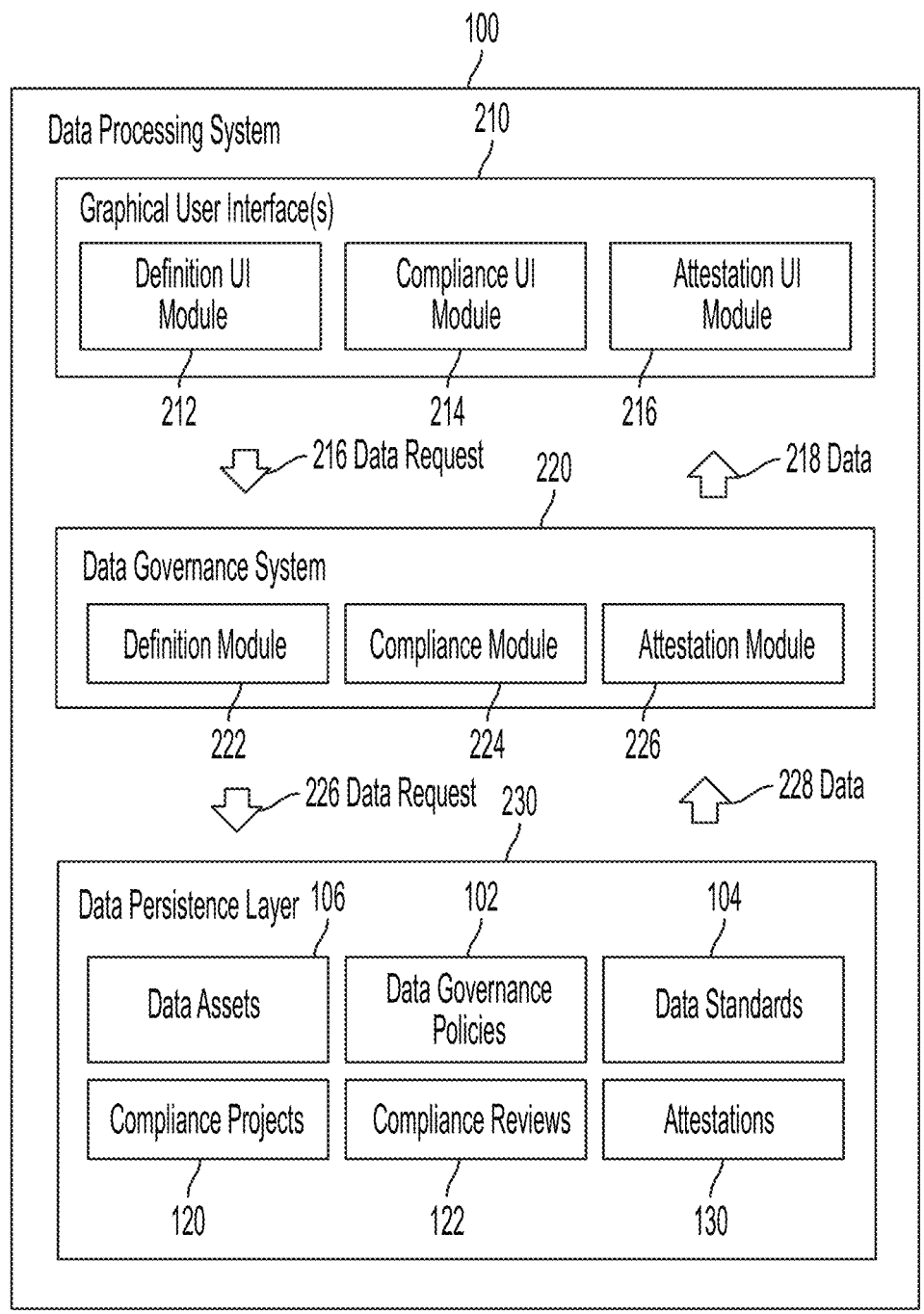
FIG. 5B shows a block diagram illustrating aspects of an example data processing system 100, according to some embodiments of the technology described herein.

FIG. 5B shows a block diagram illustrating aspects of an example data processing system 100, according to some embodiments of the technology described herein. Data processing system 100 includes graphical user interface (GUIs) modules 210, a data governance system 220, and a data persistence layer 230.

In some embodiments, the GUI modules 210 may allow users to interact with the data processing system 100 by generating various GUIs through which the users may interact with the data processing system 100. The GUI modules 210 include a definition user interface (UI) module 212, a compliance UI module 214, and an attestation UI module 216.

In some embodiments, the definition UI module 212 may be configured to generate a GUI that allows definition of data governance policies, data standards, and data asset collections in the data processing system 100. The GUI may allow a policy manager (e.g., Policy Manager 114) to define a data governance policy. For example, the GUI may allow the policy manager to create a new data governance policy and define the data governance policy (e.g., a guideline or regulation stated by the data governance policy). The GUI may allow the policy manager to generate one or more data standards as part of the data governance policy. The GUI may allow the policy manager to create a new data standard. The GUI may allow the policy manager to enter a rule and/or requirement of the data standard (e.g., that social security numbers are to adhere to a standard format of NNN-NN-NNNN where N is a digit between 0 and 9). The GUI may allow a compliance manager (e.g., Compliance Manager 118) to provide input indicating an association of a data standard with one or more data asset collections. For example, the GUI may allow the compliance manager to select one or more data asset collections that the data standard applies to from a list of previously generated data asset collections.

In some embodiments, the definition UI module 212 may be configured to generate a GUI that allows the policy manager to create a new data asset collection. The GUI may allow the policy manager to provide input through the GUI indicating one or more criteria that the data processing system 100 may use to generate the data asset collection. For example, the GUI may allow the user to specify criteria including location, data asset type, application, region, size, name, and/or other criteria that may be used by the data processing system 100 to generate a data asset collection.

In some embodiments, the definition UI module 212 may be configured to generate a GUI displaying information about a data governance policy. The GUI may display a name of the data governance policy, a regulation stated by the policy, and/or one or more data standards of the data governance policy. In some embodiments, the GUI may allow a user to navigate to a data standard of the data governance policy (e.g., by providing a link to a GUI displaying information about the data standard). In some embodiments, the definition UI module 212 may be configured to generate a GUI displaying information about a data standard. The GUI may display a name of the data standard, a compliance measure of the data standard, data asset collection(s) associated with the data standard, and/or a data governance policy that the data standard belongs to. The GUI may allow a user to view a listing of data assets in the data asset collection(s). For example, the GUI may allow the user to select a data asset collection and, in response, display a listing of data assets in the selected data asset collection.

In some embodiments, the compliance UI module 214 may be configured to generate a GUI that allows a compliance manager (e.g., Compliance Manager 118) to create a compliance project. The GUI may allow the user to provide input through the GUI indicating a data governance policy and/or data standard(s) that are to be verified in the compliance project. The GUI may further allow the compliance manager to generate one or more compliance reviews of the compliance project. For example, the GUI may allow the compliance manager to select data standard(s) for which compliance project(s) are to be generated. In another example, the GUI may allow the compliance manager to select data asset(s) for which compliance project(s) are to be generated. The compliance UI module 214 may be configured to generate a GUI that may allow the compliance manager to view information about compliance reviews of a compliance project. The GUI may display a name of the compliance project, an indication of a data standard (e.g., name, compliance measure, etc.), an indication of a data asset (e.g., name), and/or other information.

In some embodiments, the compliance UI module 214 may be configured to generate a GUI (e.g., as illustrated in FIG. 2E) that allows a compliance manager to view information about a generated compliance project. For example, the GUI may display a name of the compliance project, a listing of compliance reviews of the compliance project, a listing of attestations of the compliance project, a status of the compliance project (e.g., determined based on statuses of its constituent compliance reviews), statistics about the compliance project (e.g., number of data assets, data standards, percent attestations completed, percent attestations incomplete, etc.), and/or other information about the compliance project. The GUI may provide the compliance manager with a graphical view of the status of a compliance project. For example, the GUI may display a graphical element indicating a status of one or more compliance reviews that are part of the compliance project and/or a status of the compliance project as a whole. In some embodiments, the compliance UI module 214 may be configured to generate a GUI that allows a compliance manager to view information about a compliance review. For example, the GUI may display a listing of attestations of the compliance review, a data standard associated with the review, and/or data assets associated with the compliance review.

In some embodiments, the attestation UI module 216 may be configured to generate a GUI (e.g., as described herein with reference to FIG. 2D) through which an attestor may perform an attestation. The GUI may allow the attestor to view information about a data standard and a data asset. For example, the GUI may allow the attestor to navigate to a GUI displaying information about a data standard (e.g., compliance measure) and to a GUI displaying information about the data asset (e.g., attribute values). The GUI may be configured to allow the user to input information as part of the attestation. For example, the GUI may allow the attestor to provide textual statements, attach files, indicate a reference to another data asset, and/or provide other information. In some embodiments, the GUI may provide the attestor a list of options from which the attestor can select to provide input indicative of an attestation. For example, the list of options may include an input that a data asset complies with a data standard, that the data asset fails to comply with the data standard, that the data asset partially complies with the data standard, that the attestation is undefined, or that the data standard does not apply. In some embodiments, the GUI may allow the attestor to create a ticket (e.g., when a data asset does not comply with a data standard) to resolve a non-compliant data asset.

As shown in FIG. 5B, the modules 210 for the GUIs may submit a data request 216 to the data governance system 220. The data governance system may provide data 218. The modules 210 may use the data 218 to populate information in a GUI. For example, the modules 210 may use the data 218 to display information about a data governance policy, data standard, data asset collection, data asset, compliance project, or compliance review using the data 218.

As shown in FIG. 2F, the data governance system 220 of the data processing system 100 includes a definition module 222, a compliance module 224, and an attestation module 226.

In some embodiments, the definition module 222 may be configured to generate data governance policies, constituent data standards, and/or data asset collections. The definition module 222 may be configured to associate data asset collection with data standards (e.g., as described herein with reference to FIG. 2B). In some embodiments, the definition module 222 may be configured to store data governance policies and/or data standards as data assets of the data processing system 100. The definition module 222 may be configured to, for example, store information about a data governance policy (e.g., statement of regulation, name, constituent data standards) as attribute values in the data asset. The definition module 222 may be configured to, for example, store information about a data standard (e.g., name, description of a compliance measure, listing of associated data asset collection(s), and/or reference to data governance policy) as attribute values of a data asset.

In some embodiments, the definition module 222 may be configured to generate a data asset collection. The definition module 222 may be configured to generate a data asset collection using one or more criteria (e.g., indicated by user input through a GUI). The definition module 222 may be configured to use the one or more criteria to select one or more of the data assets managed by the data processing system 100 that meet the one or more criteria. The definition module 222 may be configured to include the selected data asset(s) in the data asset collection. In some embodiments, the definition module 222 may be configured to update a data asset collection. The definition module 222 may be configured to update a data asset collection after selecting data asset(s) of the data asset collection by: (1) identifying one or more of the data assets that meet the one or more criteria; and (2) including the identified data asset(s) in the data asset collection. The data asset(s) identified may be different from data asset(s) previously in the data asset collection (e.g., due to updates to one or more data asset(s)).

In some embodiments, the definition module 222 may be configured to store an association of a data standard with one or more data asset collections. For example, the definition module 222 may store a listing of data asset collection(s) in a field of a data standard asset. In some embodiments, the definition module 222 may be configured to store a reference to the data asset collection(s) in a field of a data standard asset.

In some embodiments, the compliance module 224 may be configured to manage verification of compliance with data governance policies and/or data standards. The compliance module 224 may be configured to generate a compliance project and constituent compliance reviews (e.g., Compliance Project 238 and compliance reviews 122, 246). The compliance module 224 may be configured to pair data standards with data assets that they apply to. The compliance module 224 may be configured to pair a data standard with data assets by: (1) identifying a data asset collection associated with the data standard (e.g., by the definition module 222); and (2) pairing the data standard with each of the data asset(s) of the data asset collection. The compliance module 224 may further be configured to identify users for the pairings of data standards with data assets. The compliance module 224 may be configured to automatically identify a user to associate with a pairing of a data standard with a data asset (e.g., to perform an attestation) using information from the data asset (e.g., attribute value indicating a user responsible for the data asset).

In some embodiments, the compliance module 224 may be configured to generate a compliance project. In some embodiments, the compliance module 224 may be configured to generate a compliance project to manage verification of compliance with a data governance policy. The compliance project may include compliance reviews for respective data standards of the data governance policy. For example, the compliance project may include a compliance review for each data standard of the data governance policy. In another example, the compliance project may include a compliance review for each data asset collection associated with data standard(s) of a data governance policy. The compliance module 224 may be configured to further generate an attestation object for each pairing of data asset and applicable data standard. The compliance module 224 may identify users to perform attestations of data assets comply with applicable data standards.

In some embodiments, the compliance module 222 may be configured to determine information about the compliance project. For example, the compliance module 222 may be configured to determine a status of the compliance project and/or its constituent compliance reviews. The compliance module 222 may be configured to determine a status of a compliance review based on a status of one or more attestations within the compliance review. For example, the compliance module 222 may determine a number of attestations that are complete or incomplete in a compliance review and/or compliance project based on which the compliance module 222 may determine a status of the compliance review and/or the compliance project. The compliance module 222 may, in some embodiments, determine that an attestation is complete when an attestation of whether the data asset complies with the data standard has been determined (e.g., indicated by input from a computing device). In some embodiments, for data assets that do not comply and/or partially comply with a data standard may further require an action to be performed for the compliance module 222 to determine that the attestation is complete. For example, the compliance module 222 may require that a ticket is created for non-compliant and/or partially compliant data assets.

In some embodiments, the attestation module 226 may be configured to obtain an attestation of whether a data asset complies with a data standard. In some embodiments, the attestation module 226 may be configured to obtain an attestation by obtaining input indicative of a user's attestation as to whether the data asset complies with the data standard (e.g., received through a GUI generated by the attestation UI module 216). The attestation module 226 may be configured to generate an attestation object that stores information indicative of the attestation. In some embodiments, the attestation object may further store a status of the attestation (e.g., complete or incomplete) determined by the attestation module 226. In some embodiments, the attestation module 226 may be configured to guide an attestor through a process flow for performing an attestation. For example, the process flow may provide the attestors 202C with information about a data standard, a data asset, and mechanism through which the attestor can indicate an attestation. The attestation module 226 may further store information associated with an attestation. For example, the attestation module 226 may store, in an attestation object, data as evidence of an attestation and/or a statement from an attestor regarding the attestation.

In some embodiments, the data governance system 220 may be configured to access data stored by the data processing system 100 (e.g., in the data persistence layer 230). As shown in FIG. 5B, the data governance system 220 may be configured to submit a data request 226 to the data persistence layer 230 and receives data in response to the data request 226. In some embodiments, the data governance system 220 may be configured to submit a query for data. For example, the data governance system 220 may submit an SQL query for data. In some embodiments, the data 228 may be data specified by the request. For example, the data 228 may be one or more values requested in a query.

In some embodiments, the query may be customized in a vendor-specific manner. For example, different vendors (e.g., MICROSOFT, ORACLE, IBM, POSTGRESQL, etc.) may implement different dialects of SQL and/or provide extensions to the SQL standard. In such situations, the executable query may be generated for a target database system (e.g., ORACLE) using the syntax and/or commands implemented by the target database system (e.g., using any special syntax and/or commands implemented by ORACLE). Additionally or alternatively, the query may include optimizations to the query that may be supported using the target database system. Accordingly, in some embodiments, a query for one type of database (e.g., an executable SQL query for MICROSOFT SQL SERVER database) may be different from a query for another type of database (e.g., an executable SQL query for IBM DB2) even where both queries would be generated from the same underlying intermediate representation.

As shown in FIG. 5B, the data persistence layer 230 stores data assets 106, data governance policies 102, data standards 104, compliance projects 120, compliance reviews 122, and attestations 130. In some embodiments, the data persistence layer 230 may include a data store to store the data. In some embodiments, a data store may include a relational database system so that data may be stored in tables of the relational database system. However, a data store is not limited to being relational database systems, as a data store may be configured to store data in any suitable way. For example, a data store may comprise an object-oriented database, a distributed database, a NoSQL database and/or any other suitable database. In some embodiments, the data governance policies 102, data standards 104, compliance projects 120, compliance reviews 122, and/or attestations 130 may be stored as data assets.

In some embodiments, each of the data persistence layer 230 may include one or multiple storage devices storing data in one or more formats of any suitable type. For example, the storage device(s) part of a data store may store data using one or more database tables, spreadsheet files, flat text files, and/or files in any other suitable format (e.g., a native format of a mainframe). The storage device(s) may be of any suitable type and may include one or more servers, one or more database systems, one or more portable storage devices, one or more non-volatile storage devices, one or more volatile storage devices, and/or any other device(s) configured to store data electronically. In embodiments where a data store includes multiple storage devices, the storage devices may be co-located in one physical location (e.g., in one building) or distributed across multiple physical locations (e.g., in multiple buildings, in different cities, states, or countries). The storage devices may be configured to communicate with one another using one or more networks of any suitable type, as aspects of the technology described herein are not limited in this respect.

In some embodiments, the data persistence layer 230 may be configured to store the data assets as data entity instances. A data asset may thus be a data entity instance defined by a data entity. For example, data processing system 100 may include a data entity defining a data governance policy, a data standard, a compliance project, a compliance review, and/or an attestation. Information about data governance policies, data standards, compliance projects, and compliance review may be stored in instances of respective data entities.

In some embodiments, the data assets 106 may include data assets managed by the data processing system 100. The data assets 106 may store, for example, metadata about datasets of a system (e.g., an enterprise system). In some embodiments, the data governance policies 102 may include definitions of data governance policies. For example, the data governance policies 102 may include statements of regulation of data assets. The data governance policies 102 may include constituent data standards. For example, the data governance policies 102 may include data standards 104 that make up the data governance policies 102.

In some embodiments, the data standards 104 include a definition of a data standard (e.g., name and/or rule or standard). The data standards 104 may further include listings of associated data asset collection(s). The data standards 104 may further include references to data governance policies, and compliance projects and/or reviews that the data standards 104 are being verified in. The data standards 104 may further include descriptions.

In some embodiments, the compliance projects 120 may include information about a data governance policy that the compliance project is for. The compliance projects 120 may include a listing of compliance reviews of the compliance projects 120. The compliance projects 120 may include data standards and/or attestations that are part of the compliance projects 120. The compliance projects 120 may further include statuses of the compliance projects 120. In some embodiments, the compliance projects 120 include information about users who are responsible for aspects of the compliance projects (e.g., project owners and/or attestors).

In some embodiments, the compliance reviews 122 may include information about a data standard associated with the compliance review. The compliance reviews 122 may further include information about data assets of the compliance reviews 122. For example, the compliance reviews 122 may include information from the data assets and/or references to the data assets. The compliance reviews 122 may further include a status. In some embodiments, a compliance review may include information about user(s) in charge of a compliance review (e.g., a project manager).

In some embodiments, the attestations 130 may include information about data assets and data standards that are subjects of the attestations 130. For example, an attestation may include information about a compliance measure of the data standard and information about the data asset. The attestation may include a reference to the data standard and/or the data asset. In some embodiments, the attestation includes a status of the attestation (e.g., complete, incomplete, started, in progress). In some embodiments, the attestation includes an indication of an attestor that is to perform the attestation.

Figure 6:
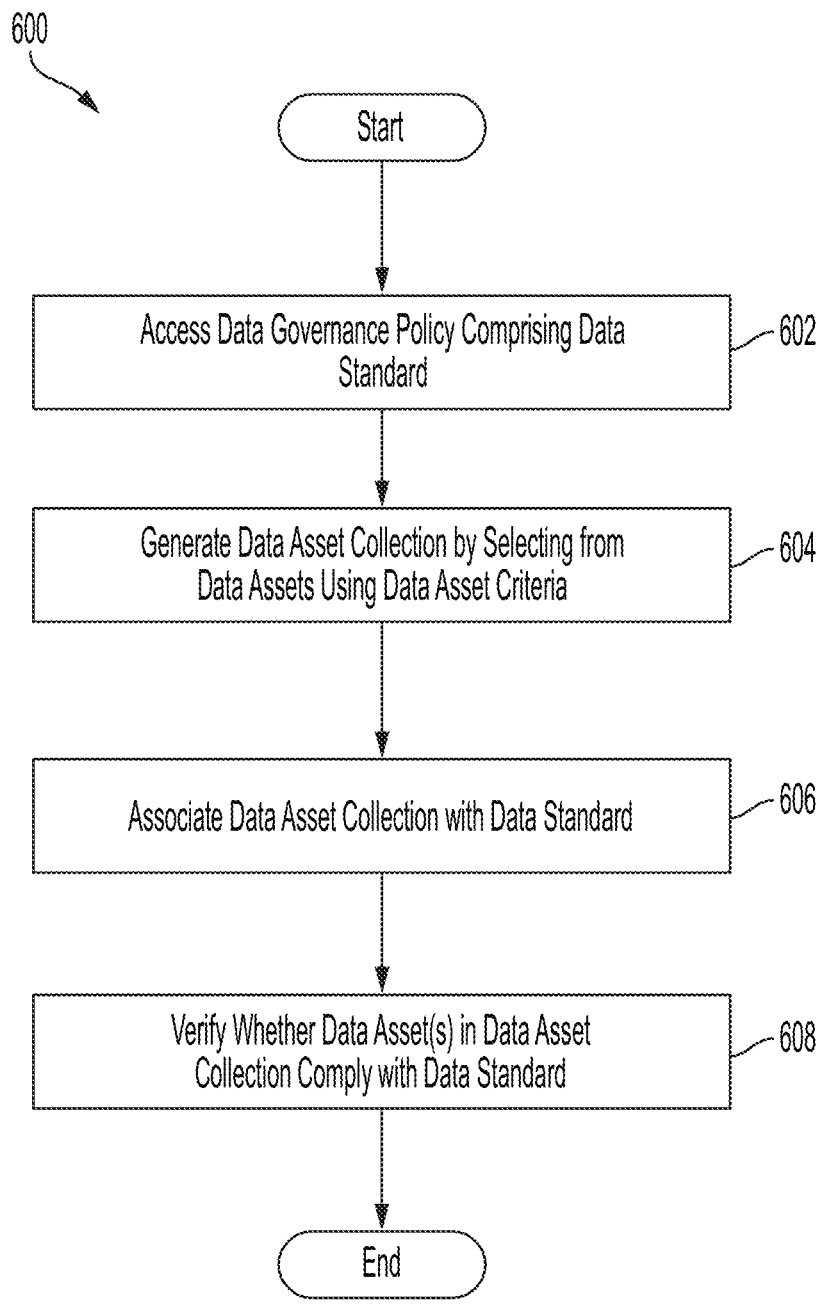
FIG. 6 shows a flowchart of an example process 600 for use in connection with governance of data assets managed by a data processing system, according to some embodiments of the technology described herein.

FIG. 6 shows a flowchart of an example process 600 for use in connection with governance of data assets managed by a data processing system (e.g., data processing system 100), according to some embodiments of the technology described herein. Process 600 may be performed by any suitable computing device. For example, process 600 may be performed by data processing system 100 described herein with reference to FIGS. 2A-2F.

Process 600 begins at block 602, where the system accesses a data governance policy comprising a data standard. The system may be configured to access the data governance policy by accessing information defining the data governance policy. For example, the system may access the data governance policy by accessing information from a data asset storing information (e.g., description and listing of constituent data standard(s)) about the data governance policy. As an illustrative example, the system may transmit a request (e.g., a query) to a data persistence layer to obtain the information about the data governance policy. The information may include information about the data standard.

In some embodiments, the system may be configured to generate the data standard of the data governance policy. For example, the system may be configured to generate the data standard by generating a new data asset associated with the data governance policy. The new data asset may store information about the data standard of the data governance policy. The system may then access the generated data standard.

Next, process 600 proceeds to block 604, where the system generates a data asset collection by selecting from data assets using one or more data asset criteria. In some embodiments, the data assets may be data assets managed by a data processing system (e.g., data processing system 100). The system may be configured to select from the data assets by: (1) identifying one or more data assets that meet the one or more criteria; and (2) selecting the identified data asset(s). For example, the system may perform a search using the one or more criteria to identify the data asset(s). As an illustrative example, for a banking system, the one or more criteria may include: (1) that the data asset be a "credit score" data asset; and (2) that the data asset store information about a resident of the United States. In this example, the system may identify "credit score" data assets for residents of the United States. The system may include the identified data asset(s) in the data asset collection.

In some embodiments, the data asset collection may have been previously generated and at block 604, the system may be configured to update the data asset collection. The system may be configured to update the data asset collection by: (1) identifying one or more data assets that meet the one more criteria; and (2) selecting the identified data asset(s). The identified data asset(s) may be different than data asset(s) previously included in the data asset collection (e.g., as a result of updates to data assets). The system may be configured to update the data asset collection to include the identified data asset(s). Accordingly, the data asset collection may reflect a current state of the data assets.

In some embodiments, the system may be configured to obtain the one or more criteria. The system may be configured to obtain the one or more criteria by receiving user input (e.g., through a GUI) indicating the one or more criteria. For example, the system may receive user input indicating selections in a search and/or filter GUI that indicate the one or more criteria.

Next, process 600 proceeds to block 606, where the system associates the data asset collection with the data standard. In some embodiments, the system may be configured to associate the data asset collection with the data standard by storing an association of the data asset collection with the data standard. For example, the system may store a reference to the data asset collection in the data standard (e.g., in a data standard asset of the system). In some embodiments, the associating the data asset collection with the data standard may comprise associating the data standard with a set of data asset criteria used to generate the data asset collection. For example, the system may store, in the data standard, a reference to the set of data asset criteria.

In some embodiments, the system may be configured to associate the data asset collection with the data standard in response to a command. The command may be a user input indicating a command to associate the data asset collection with the data standard. For example, the system may receive, through a GUI, user input indicative of the command. In response to receiving the command, the system may associate the data asset collection with the data standard. In some embodiments, the system may be configured to receive a user input indicating a selection of the data asset collection from a list of one or more data asset collections (e.g., that were previously generated by the system). For example, the system may receive selection of a GUI element representing the data asset collection from a selection of GUI elements representing respective data asset collections.

Next, process 600 proceeds to block 608, where the system verifies whether one or more data assets of the data asset collection comply with the data standard. The system may be configured to verify whether the data asset(s) of the data asset comply with the data standard by performing process 700 described herein with reference to FIG. 7.

Figure 7:
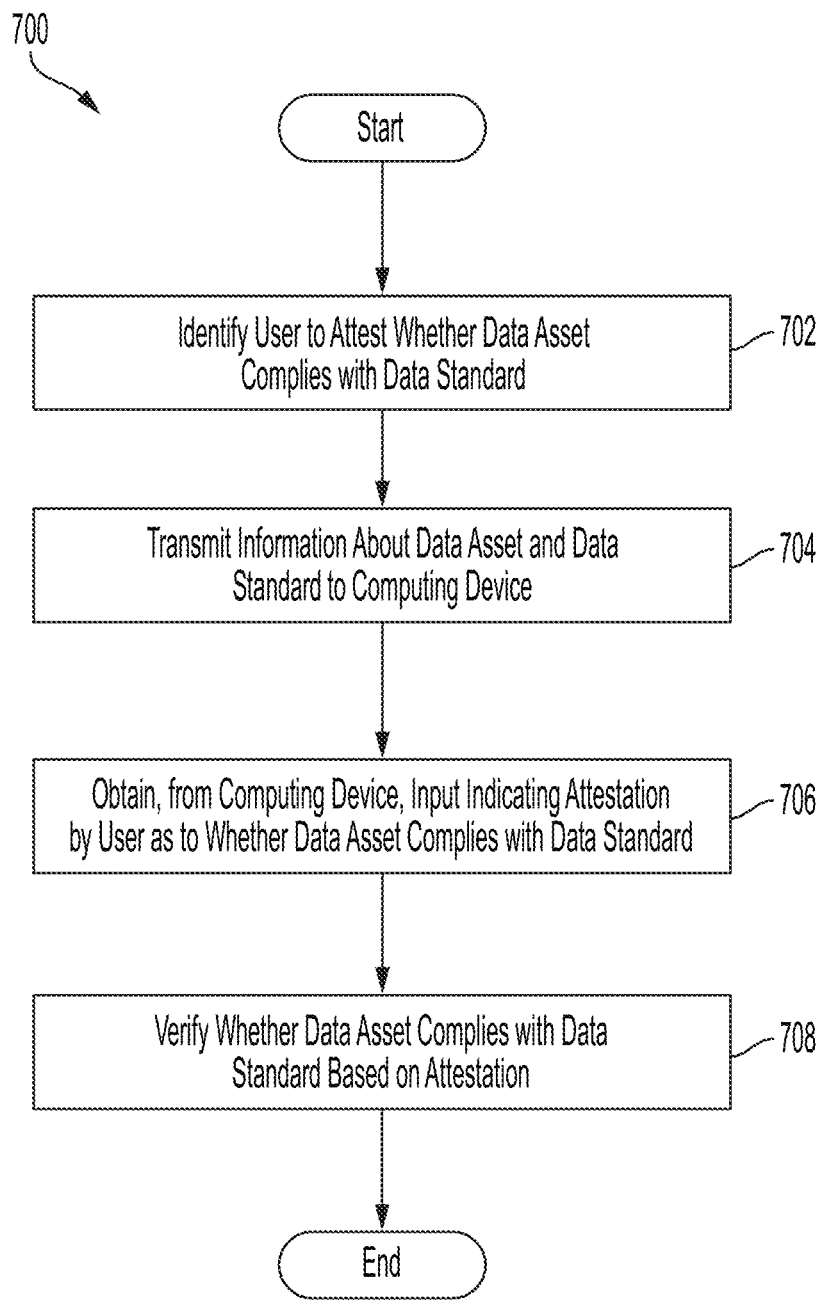
FIG. 7 shows a flowchart of an example process 700 of verifying whether data assets managed by a system comply with a data governance policy comprising a data standard associated with a data asset, according to some embodiments of the technology described herein.

FIG. 7 shows a flowchart of an example process 700 of verifying whether data assets managed by a system comply with a data governance policy comprising a data standard associated with a data asset, according to some embodiments of the technology described herein. Process 700 may be performed by any suitable computing device. For example, process 700 may be performed by data processing system 100 described herein with reference to FIGS. 2A-2F.

Process 700 begins at block 702, where the system identifies a user to attest whether the data asset complies with the data standard. In some embodiments, the system may be configured to identify the user using information from the data asset. For example, the data asset may include an attribute value indicating a person responsible for the data asset. The system may identify the user to be the person indicated by the attribute value. The system may thus automatically determine the person to be an attestor.

In some embodiments, the system may be configured to generate a compliance project including one or more compliance reviews (e.g., as described herein with reference to FIG. 3. The system may identify the user to match the user to a pairing of the data asset with the data standard in a compliance review. The user may be assigned to the pairing to perform an attestation.

Next, process 700 proceeds to block 704, where the system transmits information about the data asset and the data standard to a computing device. The computing device may be associated with the user. In some embodiments, the system may be configured to transmit the information about the data asset and the data standard to the computing device through a communication network (e.g., the Internet).

In some embodiments, the system may be configured to obtain information about the data asset and the data standard. The system may be configured to obtain the information by transmitting a request (e.g., a query) to a database system storing the data asset and the data standard (e.g., data persistence layer 230). The system may be configured to receive the information about the data asset and the data standard in response to transmitting the request.

Next, process 700 proceeds to block 706, where the system obtains, from the computing device, input indicating attestation by the user as to whether the data asset complies with the data standard. In some embodiments, the system may be configured to provide the user (e.g., through a GUI and/or a workflow) one or more options. For example, the options may be that the data asset fails to comply with the data standard, partially complies with the data standard, does not comply with the data standard, or that the data standard does not apply. The system may be configured to receive input indicating selection of an option. In some embodiments, the system may be configured to obtain attestation information that includes the input indicating the attestation by the user as to whether the data asset complies with the data standard. In some embodiments, the attestation information may include other information such as comments and evidence (e.g., file(s), document(s), link(s), and/or other suitable evidence).

In some embodiments, the system may be configured to store a record of the attestation. In some embodiments, the system may be configured to the record of the attestation in an attestation object. For example, the attestation object may include one or more fields and/or attributes. The system may be configured to store an indication of the attestation in a field or attribute.

Next, process 700 proceeds to block 708, where the system verifies whether the data asset complies with the data standard based on the attestation. For example, the system may determine that the data asset complies with the data standard if the user indicates an attestation that the data asset fully complies or partially complies with the data standard. Otherwise, the system may determine that the data asset does not comply with the data asset. In another example, the system may determine that the data asset complies with the data standard only if the user indicates an attestation that the data asset fully complies with the data standard. Otherwise, the system may determine that the data asset does not comply with the data asset.

In some embodiments, the system may be configured store information indicative of the attestation in an attestation object (e.g., that is part of a compliance review). In some embodiments, the system may be configured to update a status of an attestation, compliance review, and/or compliance project based on the attestation. For example, the system may update the completion percentage of the compliance review, compliance project, and/or the attestation to indicate that the attestation is complete.

Figure 8:
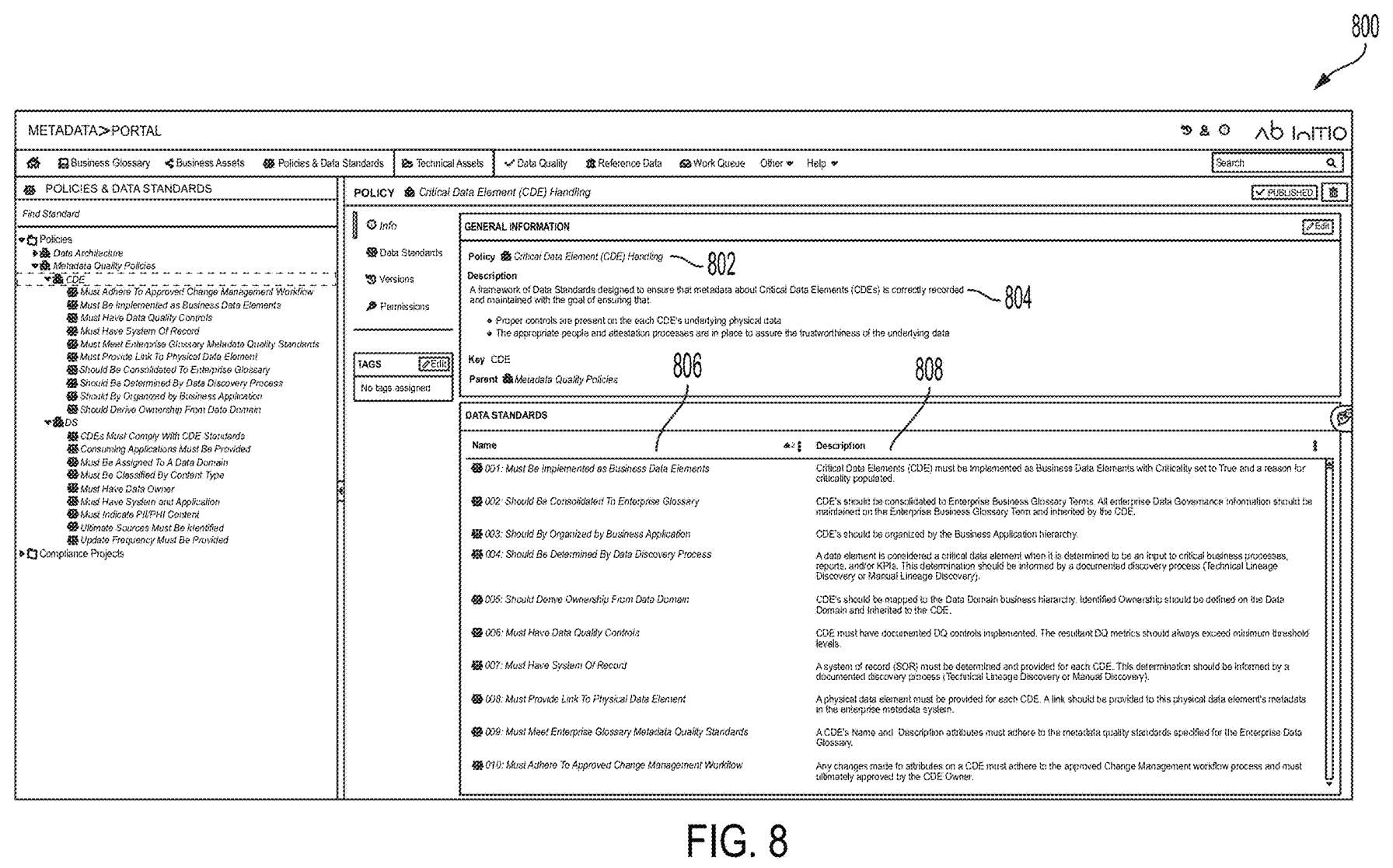

FIG. 8 is an illustration of example graphical user interface (GUI) 800 displaying information about a data governance policy, according to some embodiments of the technology described herein. The GUI 800 shows information including a name of the policy 802 "Critical Data Element (CDE) Handling", and a description 804 of the policy. The GUI 800 also displays a listing 806 of constituent data standards of the data governance policy. The listing 806 includes descriptions 808 of the data standards.

Figure 9:
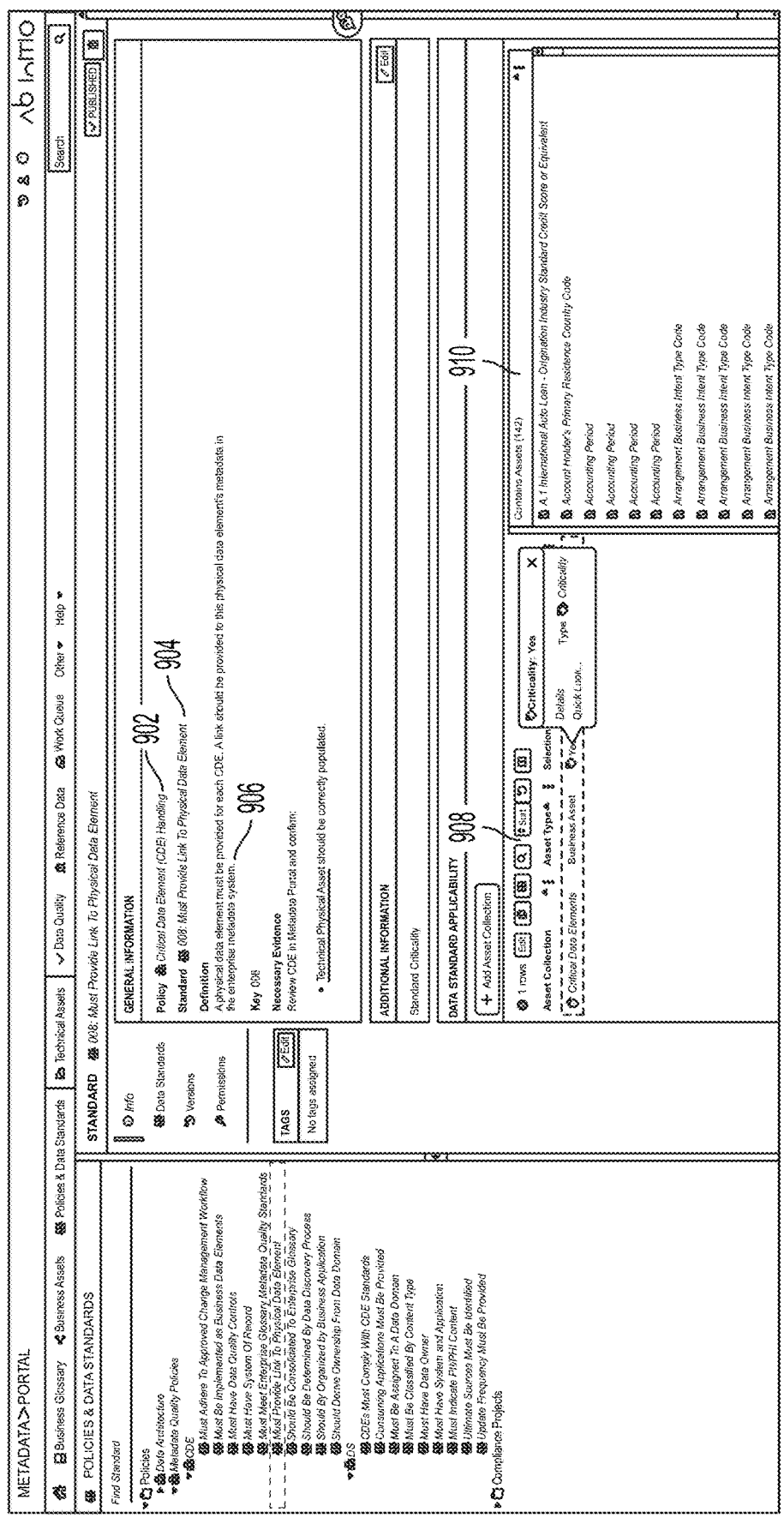
FIG. 9 is an illustration of example graphical user interface (GUI) 900 displaying information about a data standard, according to some embodiments of the technology described herein.

FIG. 9 is an illustration of example graphical user interface (GUI) 900 displaying information about a data standard, according to some embodiments of the technology described herein. The GUI 900 displays an indication 902 of a data governance policy (e.g., for which information is displayed in GUI 800 of FIG. 8) that the data standard belongs to. The GUI 900 displays a name 904 of the standard and a definition 906 of the standard. The GUI 900 displays a listing 908 of data asset collections associated with the data standard. As shown in the example of FIG. 9, when a data asset collection is selected from the listing 908, the GUI 900 displays a listing 910 of asset(s) of the data asset collection.

Figure 10:
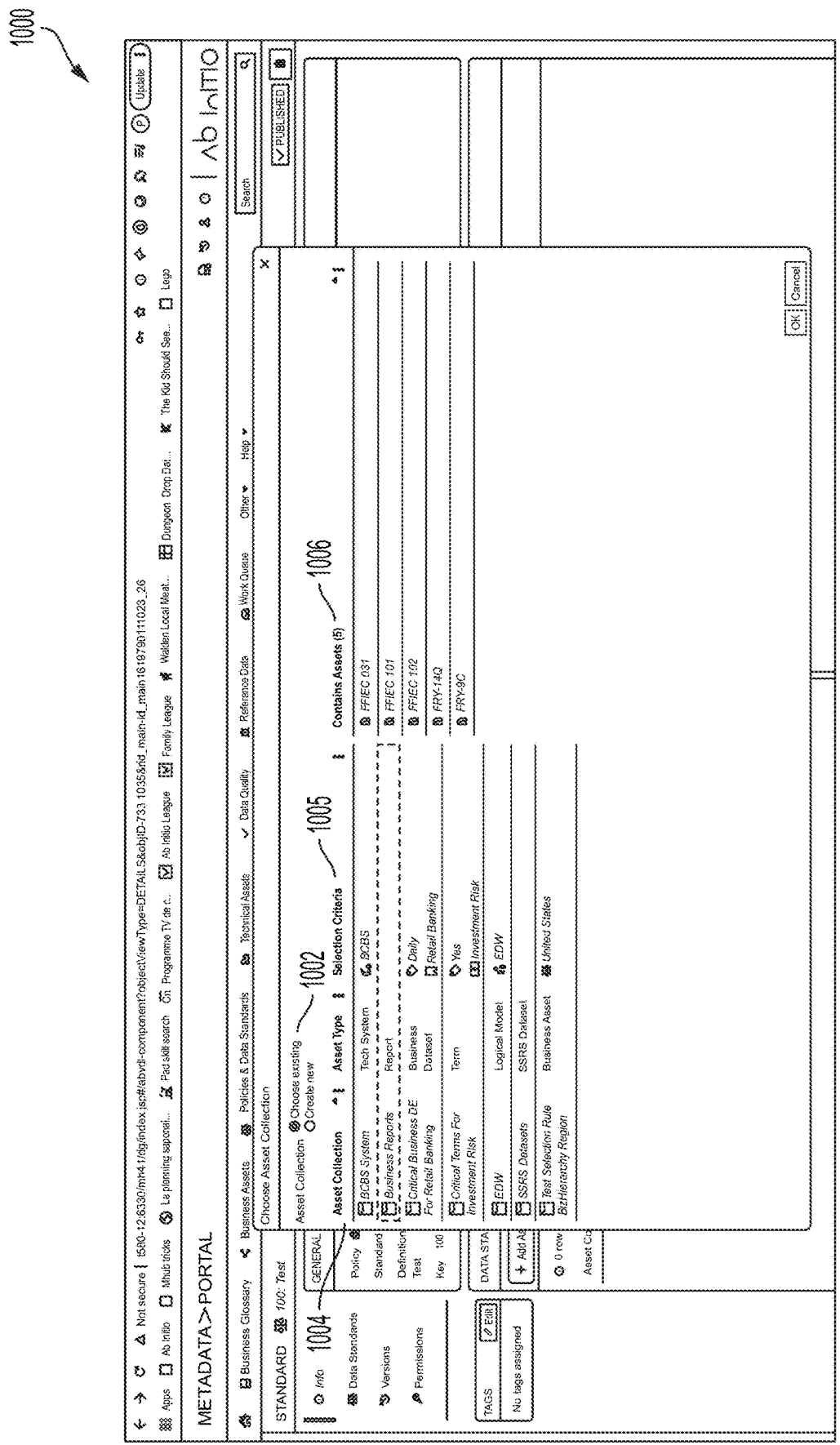
FIG. 10 is an illustration of example graphical user interface (GUI) 1000 that allows a user to select a data asset collection to associate with a data standard from a list of existing data asset collections, according to some embodiments of the technology described herein.

FIG. 10 is an illustration of example graphical user interface (GUI) 1000 that allows a user to select a data asset collection to associate with a data standard from a list of existing data asset collections, according to some embodiments of the technology described herein. As indicated by the graphical element 1002 indicating selection of "Choose existing", the GUI 1000 displays a listing 1004 of previously generated data asset collections that may be selected from to associate with a data standard. The GUI 1000 displays selection criteria 1005 associated with the listed data asset collections. As shown in the example of FIG. 10, when a data asset collection is selected from the listing 1004, the GUI 1000 displays a listing 1006 of data asset(s) of the selected data asset collection.

Figure 11:
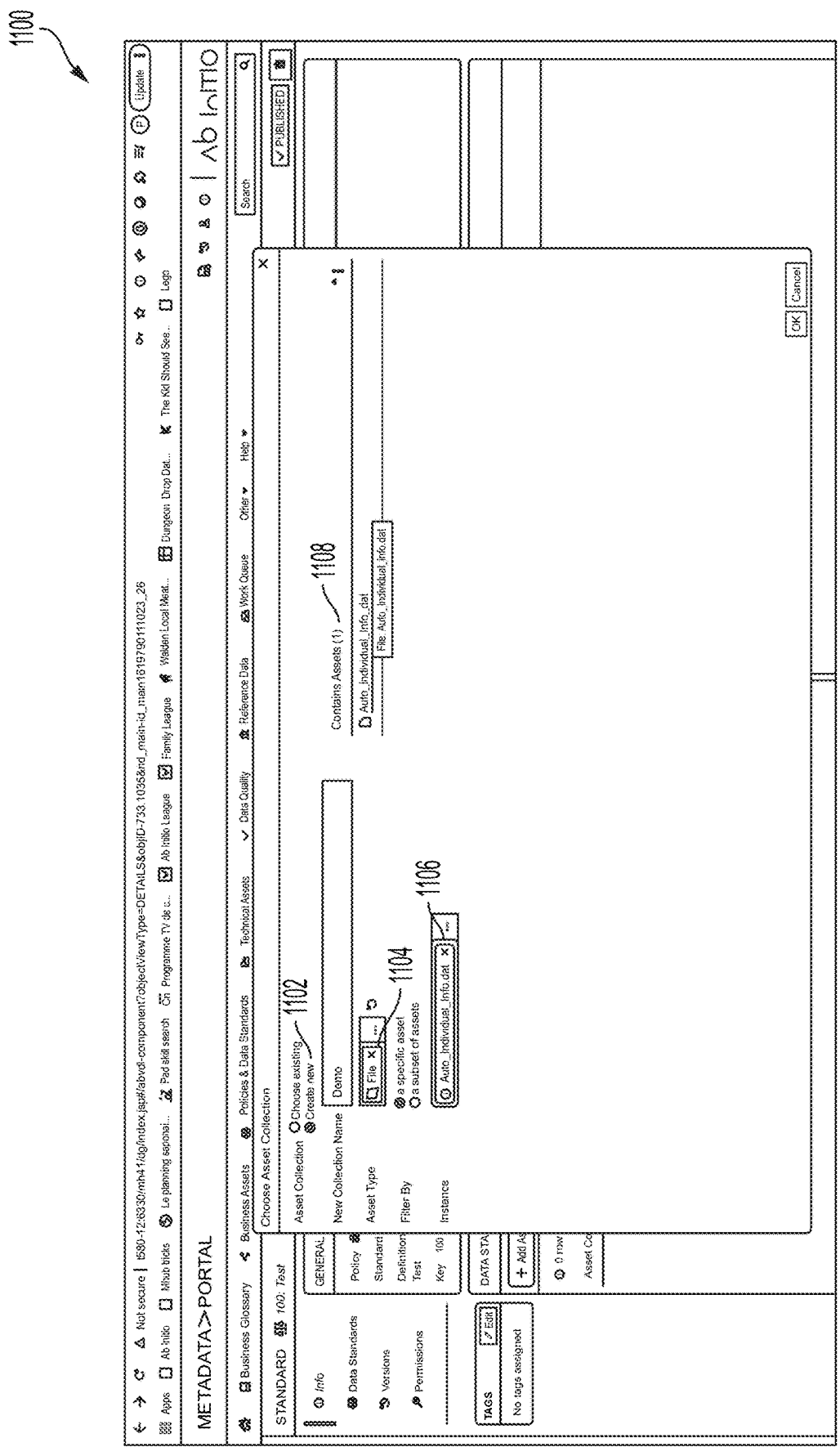
FIG. 11 is an illustration of example graphical user interface (GUI) 1100 that allows a user to create a new data asset collection to associate with a data standard, according to some embodiments of the technology described herein.

FIG. 11 is an illustration of example graphical user interface (GUI) 1100 that allows a user to create a new data asset collection to associate with a data standard, according to some embodiments of the technology described herein. As indicated by the GUI element 1102, the GUI 1100 allows a user to create a new data asset collection. The GUI 1100 allows the user to indicate an asset type 1104 and select a specific Data Asset 1106. The GUI 1100 displays a listing of assets 1108 that would appear in the new data asset collection.

Figure 12:
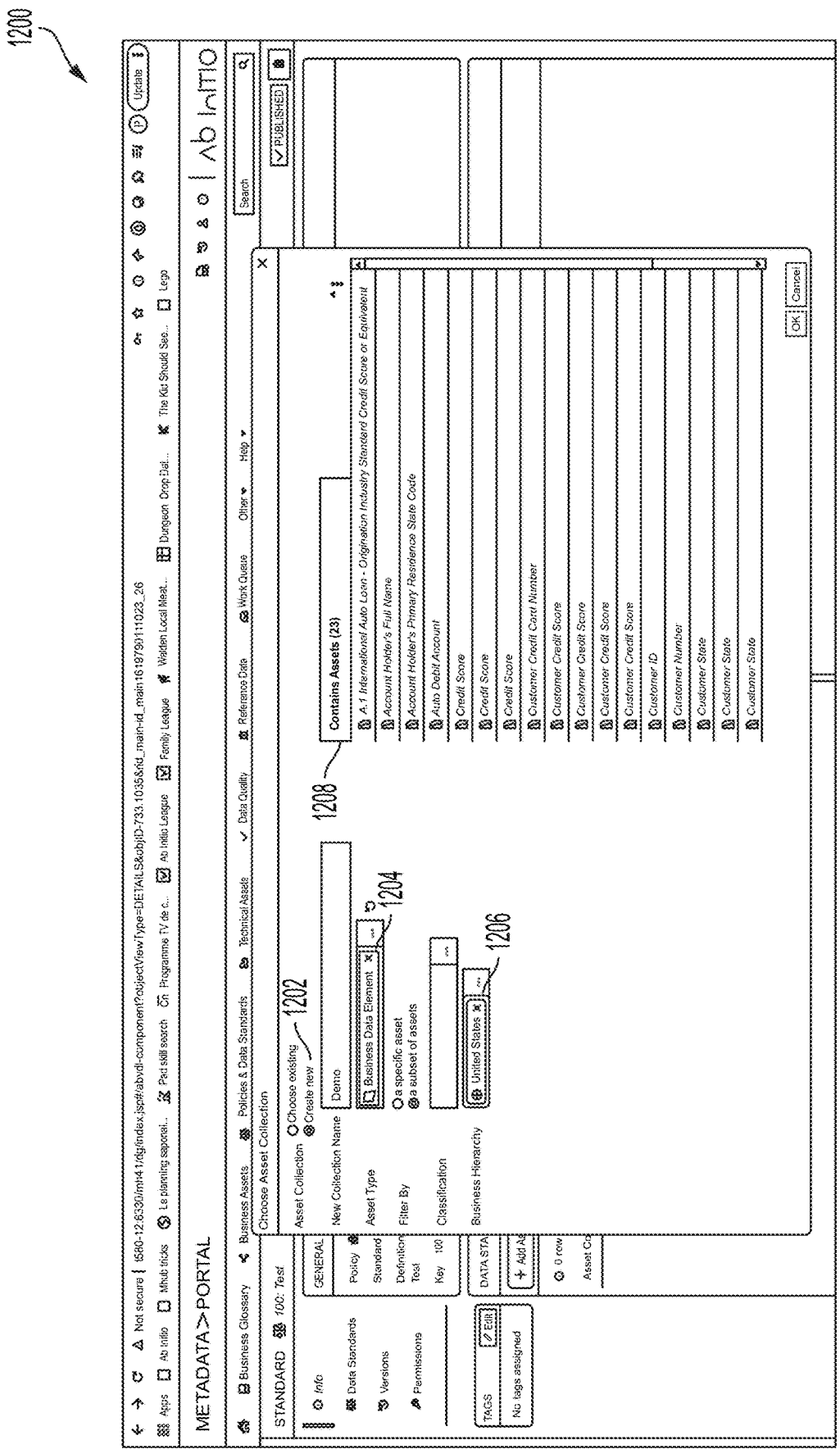
FIG. 12 is an illustration of example graphical user interface (GUI) 1200 that allows a user to create a new data asset collection to associate with a data standard, according to some embodiments of the technology described herein.

FIG. 12 is an illustration of example of another graphical user interface (GUI) 1200 that allows a user to create a new data asset collection to associate with a data standard, according to some embodiments of the technology described herein. As indicated by GUI element 1202, the user has selected to create a new data asset collection. The GUI 1200 allows the user to indicate one or more criteria to use to generate the data asset collection. The GUI 1200 allows the user to indicate a data asset type 1204. In the example of FIG. 12, the selected data asset type is "Business Data Element". The GUI 1200 allows the user to indicate a region criteria 1206 for the data asset collection. In the example of FIG. 12, the indicated region is "United States". The GUI 1200 further displays a listing 1208 of data assets that would be included in the data asset collection based on criteria indicated by the user.

Figure 13:
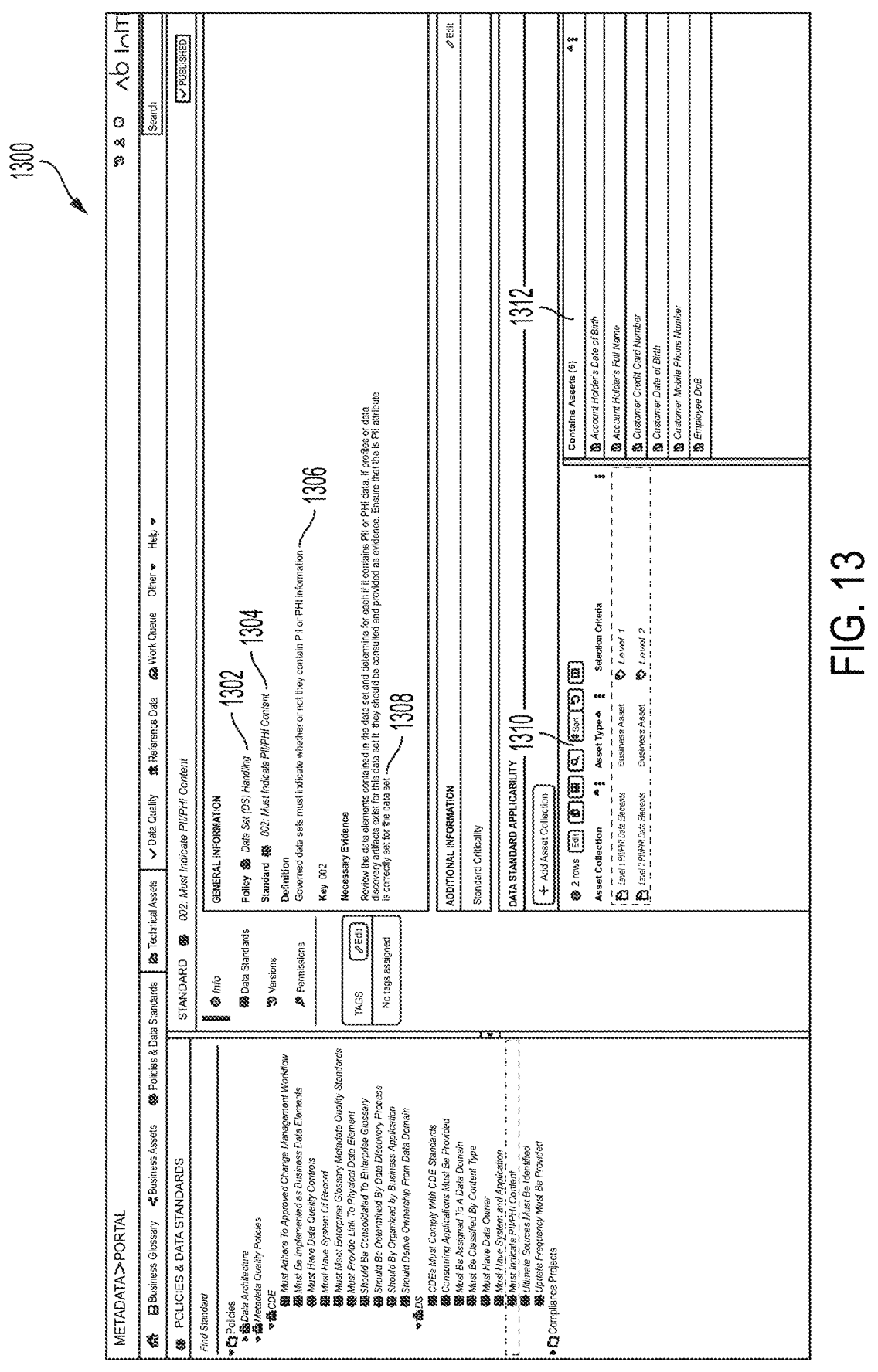

FIG. 13 is an illustration of example graphical user interface (GUI) 1300 displaying information about a data standard, according to some embodiments of the technology described herein. The GUI 1300 displays an indication 1302 of a data governance policy to which the data standard belongs. The GUI 1300 displays a name 1304 of the data standard, a definition 1306 of the data standard, and a description 1308 of evidence needed to show whether a data asset meets the data standard. The GUI 1300 displays a listing 1310 of data asset collections associated with the GUI 1300. As shown in FIG. 13, the GUI 1300 displays a listing 1312 of data assets in a data asset collection selected from the listing 1310.

FIG. 14 is an illustration of example graphical user interface (GUI) 1400 displaying information about a compliance project, according to some embodiments of the technology described herein. The GUI 1400 displays a name 1402 of the compliance project, a description 1404 of the compliance project, and a time period 1406 of the compliance project (e.g., in which the compliance project is to be completed). The GUI 1400 further displays a project owner 1407 of the compliance project. The GUI 1400 displays a listing 1408 compliance reviews that are part of the compliance project. The listing includes a description 1410 of each compliance review, a name of a standard 1412 associated with each compliance review, and a status 1414 of the compliance review. As shown in FIG. 14, the status 1414 may be a graphical element indicative of a current status of the compliance project.

FIG. 15 is an illustration of example graphical user interface (GUI) 1500 displaying information about a compliance review, according to some embodiments of the technology described herein. The GUI 1500 displays an indication 1502 of the compliance project that the compliance review is a part of The GUI 1500 displays a name 1504 of the compliance review, a description 1506 of the compliance review, and a time period 1508 of the compliance review (e.g., in which the compliance review is to be completed). The GUI 1500 further displays a project owner 1507 of the compliance review and/or the compliance project that the compliance review is a part of. As shown in FIG. 15, the GUI 1500 displays a listing 1510 of attestations that are to be performed as part of the compliance review. The listing 1510 includes identifiers 1512 of the attestations and names 1514 of data assets for which the attestations are to be performed. The GUI 1500 displays a statuses 1516 of whether the data assets meets the standard (e.g., determined from the attestations).

Figure 16:
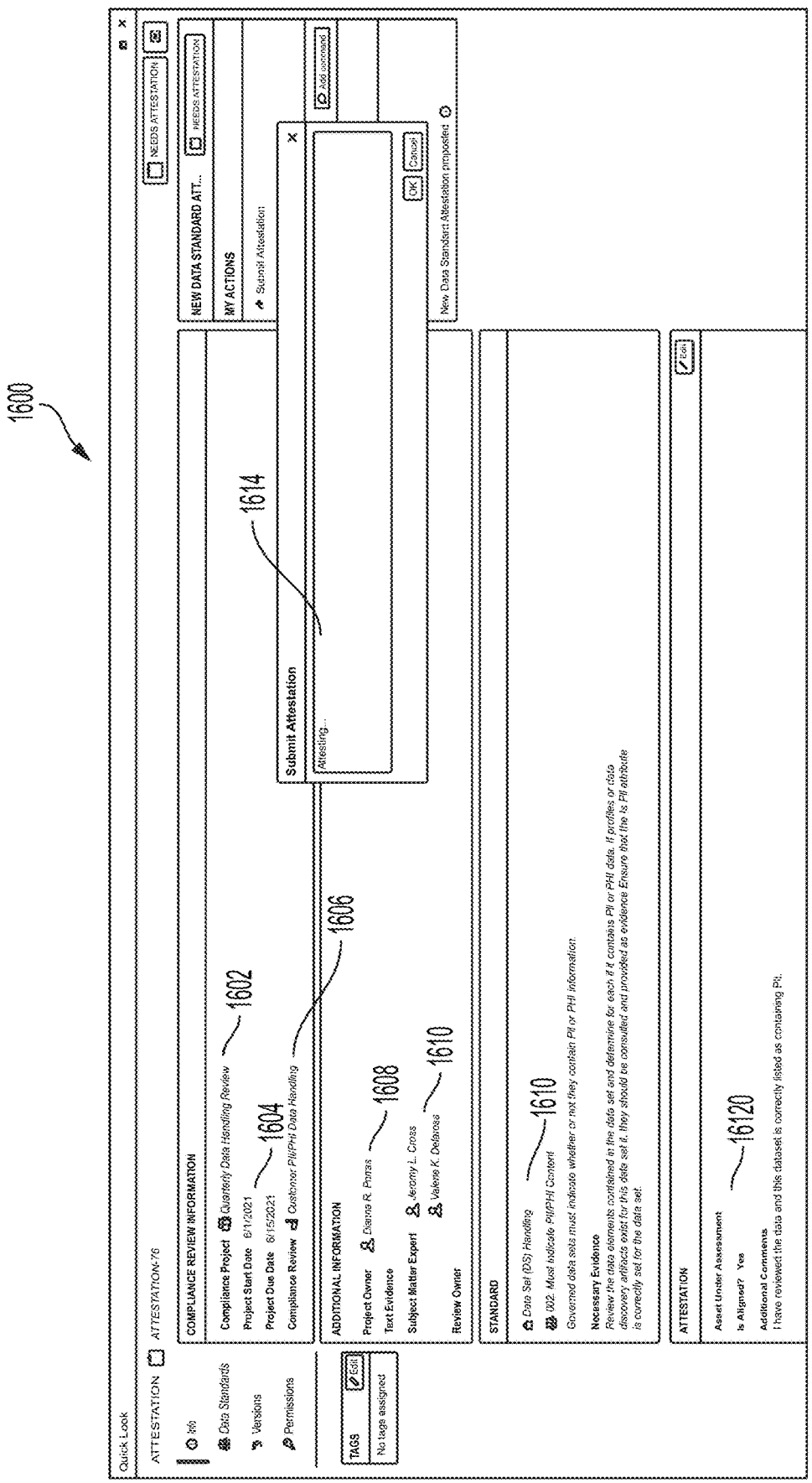
FIG. 16 is an illustration of example graphical user interface (GUI) 1600 displaying information about an attestation, according to some embodiments of the technology described herein.

FIG. 16 is an illustration of example graphical user interface (GUI) 1600 displaying information about an attestation, according to some embodiments of the technology described herein. The GUI 1600 displays information about a compliance project that the attestation is from including a name 1602 of the compliance project, a time period 1604 of the compliance project, and a name 1606 of the compliance review that the attestation is part of. The GUI 1600 further displays information about people associated with the attestation including a compliance project owner 1608, and one or more subject matter experts 1610. The GUI 1600 further displays information 1310 about a data standard with which the attestation is to be performed. As shown in FIG. 16, the information 1610 about the data standard includes a name of the data standard, a name of a data governance policy to which the data standard belongs, a description of the data standard (e.g., a rule of requirement of the data standard), and a description of evidence needed to attest that a data asset complies with the data standard. The GUI 1600 further displays attestation information 1612. The attestation information 1612 includes a status (e.g., "Asser Under Assessment"), and comments (e.g., "I have reviewed the data and this dataset is correctly listed as containing PIP"). The GUI 1600 provides a GUI portion 1614 through which the user can submit an attestation. For example, the user can provide a statement attesting as to whether the data asset associated with the attestation complies with the data standard associated with the attestation.

Figure 17:
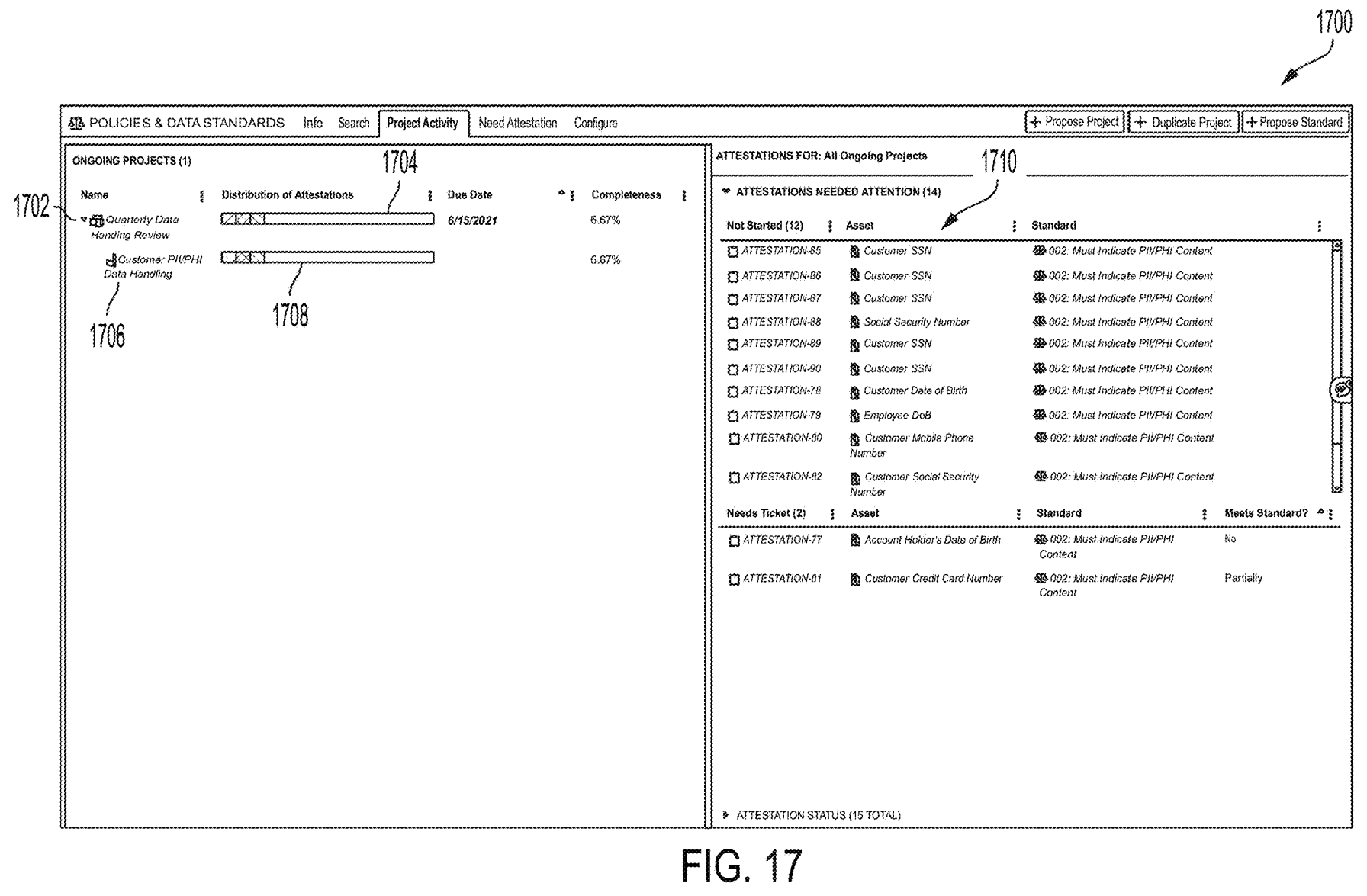

FIG. 17 is an illustration of example graphical user interface (GUI) 1700 displaying information about ongoing compliance project(s), according to some embodiments of the technology described herein. GUI 1700 displays a listing 1702 of ongoing compliance projects. The listing may be an expandable listing in which, when a compliance project is selected, the GUI 1700 displays compliance reviews of the compliance project. For example, in the example of FIG. 17, the GUI displays 1700 a listing 1706 of a compliance review of a selected compliance project in the listing 1702. The GUI 1700 further displays a GUI element 1704 indicating a status of the compliance project and a GUI element 1708 indicating a status of the compliance review. The GUI 1700 further displays a listing 1710 of attestations of the ongoing compliance projects. The listing 1710 may be divided by status (e.g., "Not Started", "Needs Ticket", "Complete").

Figure 18:
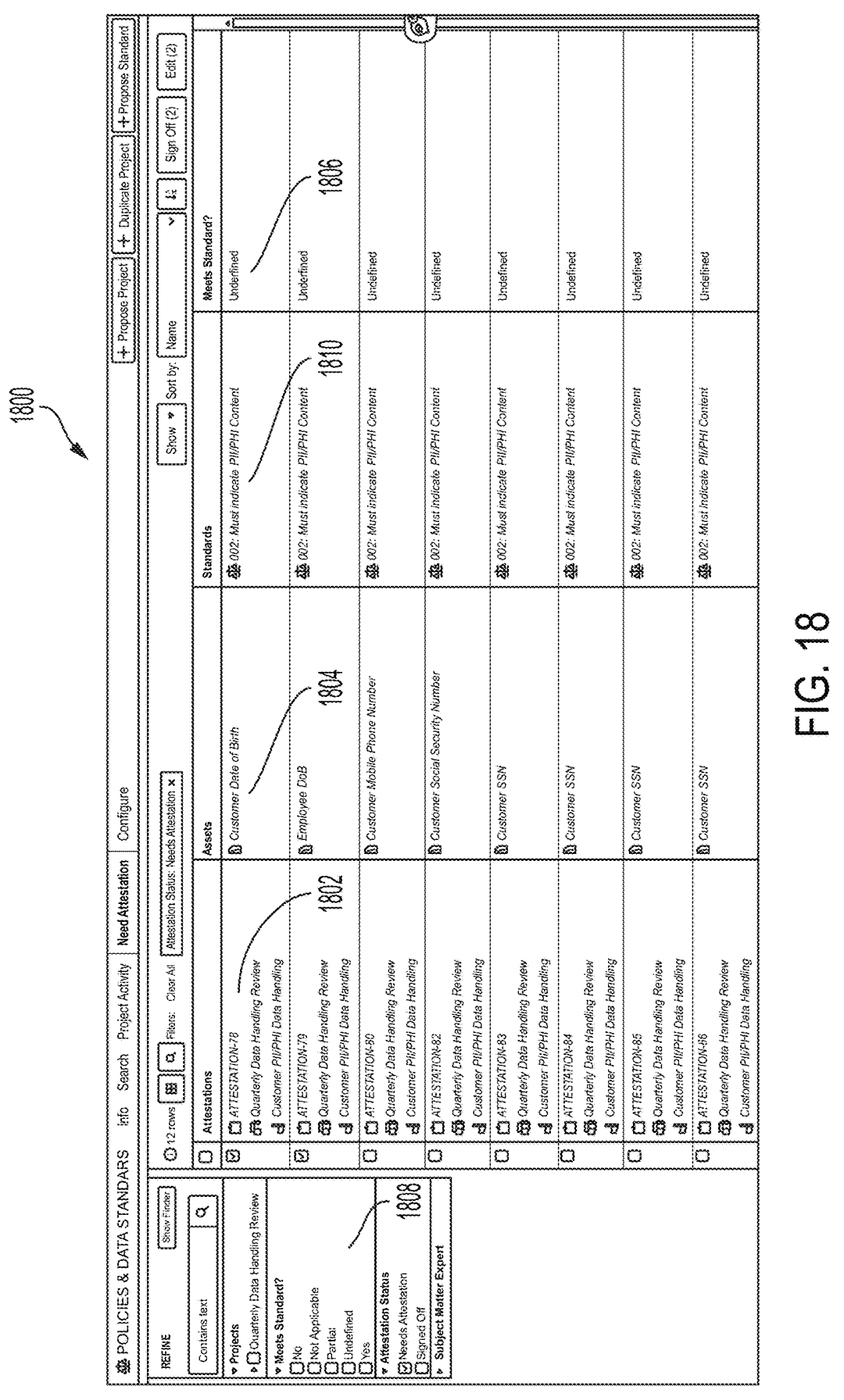

FIG. 18 is an illustration of example graphical user interface (GUI) 1800 that displays information about a status of attestations of a compliance project, according to some embodiments of the technology described herein. The GUI 1800 provides an interface through which a user may view attestations (e.g., all attestations or attestations for one or more compliance projects). The GUI 1800 provides a filter 1808 through which the user may filter attestations. For example, as shown in FIG. 18, the GUI 1800 may allow the user to filter based on compliance project, an indicated attestation (e.g., does not meet data standard, not applicable, partially complies with data standard, undefined, and complies with data standard as shown in FIG. 18). The GUI 1800 may further allow the user to filter based on attestation status (e.g., needs attention or signed off), and subject matter expert. The GUI 1800 displays a listing 1802 of attestations based on the selected criteria. The GUI 1800 displays a listing 1804 of assets for which each attestation is to be performed, and a listing of standards 1810 that are to be attested to for each attestation. The GUI 1800 also displays a listing 1806 of statuses of the listed attestations.

Figure 19:
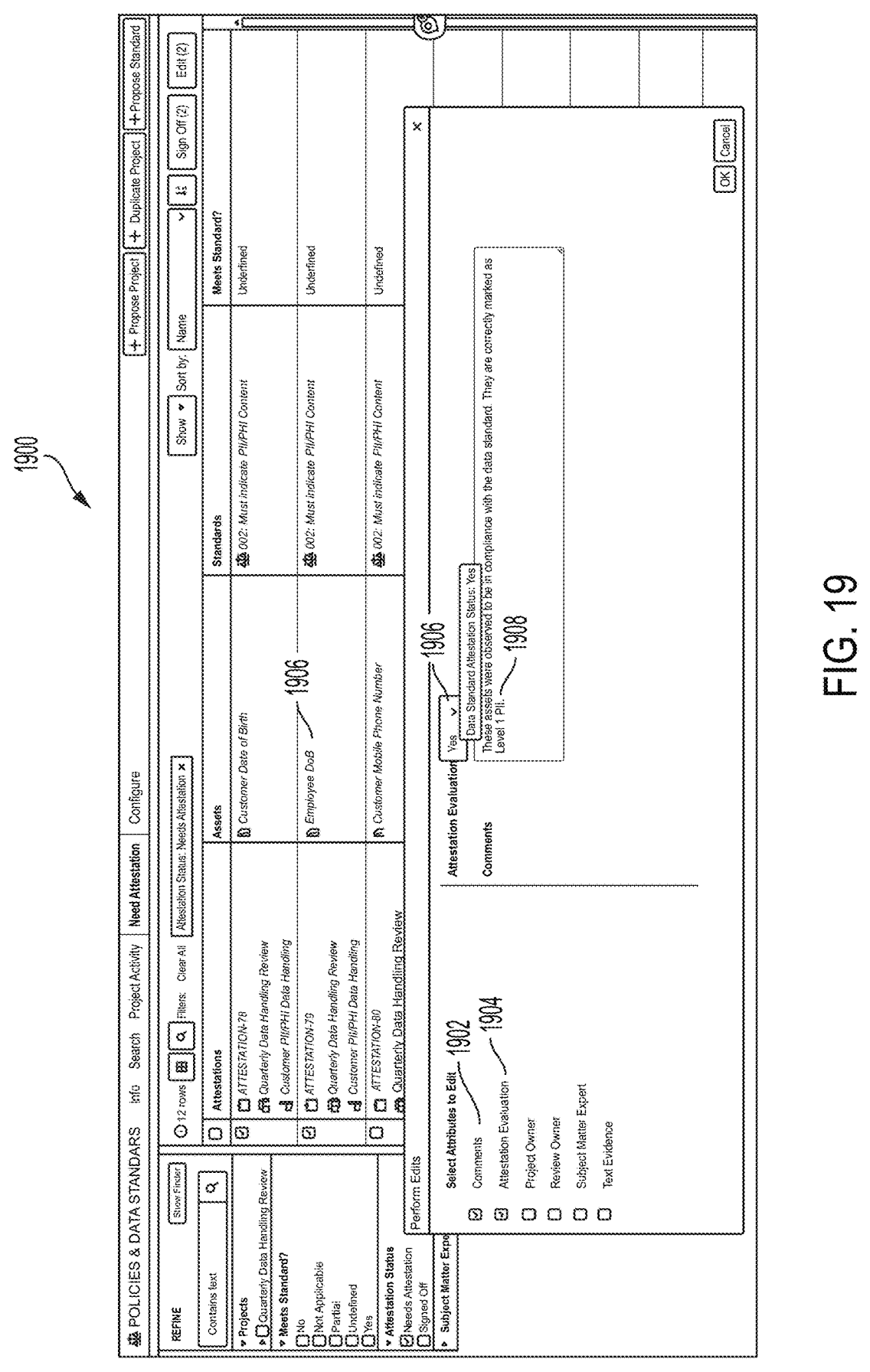

FIG. 19 is an illustration of example graphical user interface (GUI) 1900 that allows a user to perform edits to one or more attestations selected from the GUI 1800 of FIG. 18, according to some embodiments of the technology described herein. GUI 1900 allows a user to edit attributes of the selected attestation(s). The attributes include comments, attestation evaluation, project owner, review owner, subject matter expert, and text evidence. In the example of FIG. 19, the user has selected comments 1902 and attestation evaluation 1904. The GUI 1900 provides a selectable option 1906 which the user may use to indicate an attestation evaluation. The GUI 1900 provides a text input 1908 for the user to provide comments in the selected attestation(s).

Figure 20:
FIG. 20 is an illustration of example graphical user interface (GUI) 2000 that allows a user to sign off on one or more attestations, according to some embodiments of the technology described herein.

FIG. 20 is an illustration of example graphical user interface (GUI) 2000 that allows a user to sign off on one or more attestations, according to some embodiments of the technology described herein. The GUI 2000 displays a listing 2002 of the selected attestation(s). The GUI 2000 provides the user with options 2008 to sign off, or to submit an attestation for the selected attestation(s).

Figure 21:
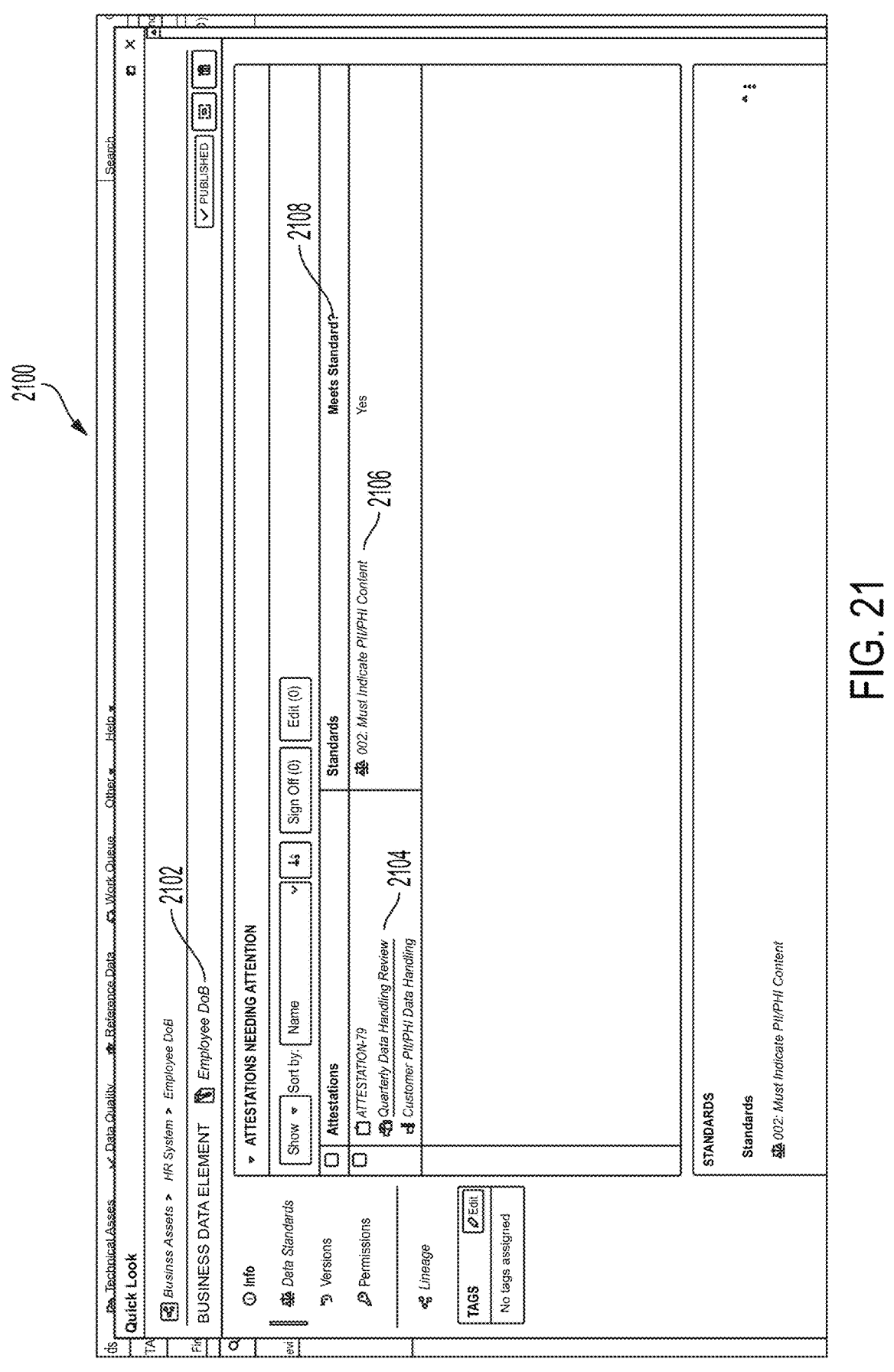

FIG. 21 is an illustration of example graphical user interface (GUI) 2100 displaying information about a data asset, according to some embodiments of the technology described herein. GUI 1800 displays a name 2102 of the data asset. The GUI 2100 further displays a listing 2104 of attestation(s) involving the data asset. The GUI 2100 displays a listing 2106 of data standard(s) of the attestations(s). The GUI 2100 further displays a listing 2108 of statuses for the attestations of the listing 2104.

Example Computer System

Figure 22:
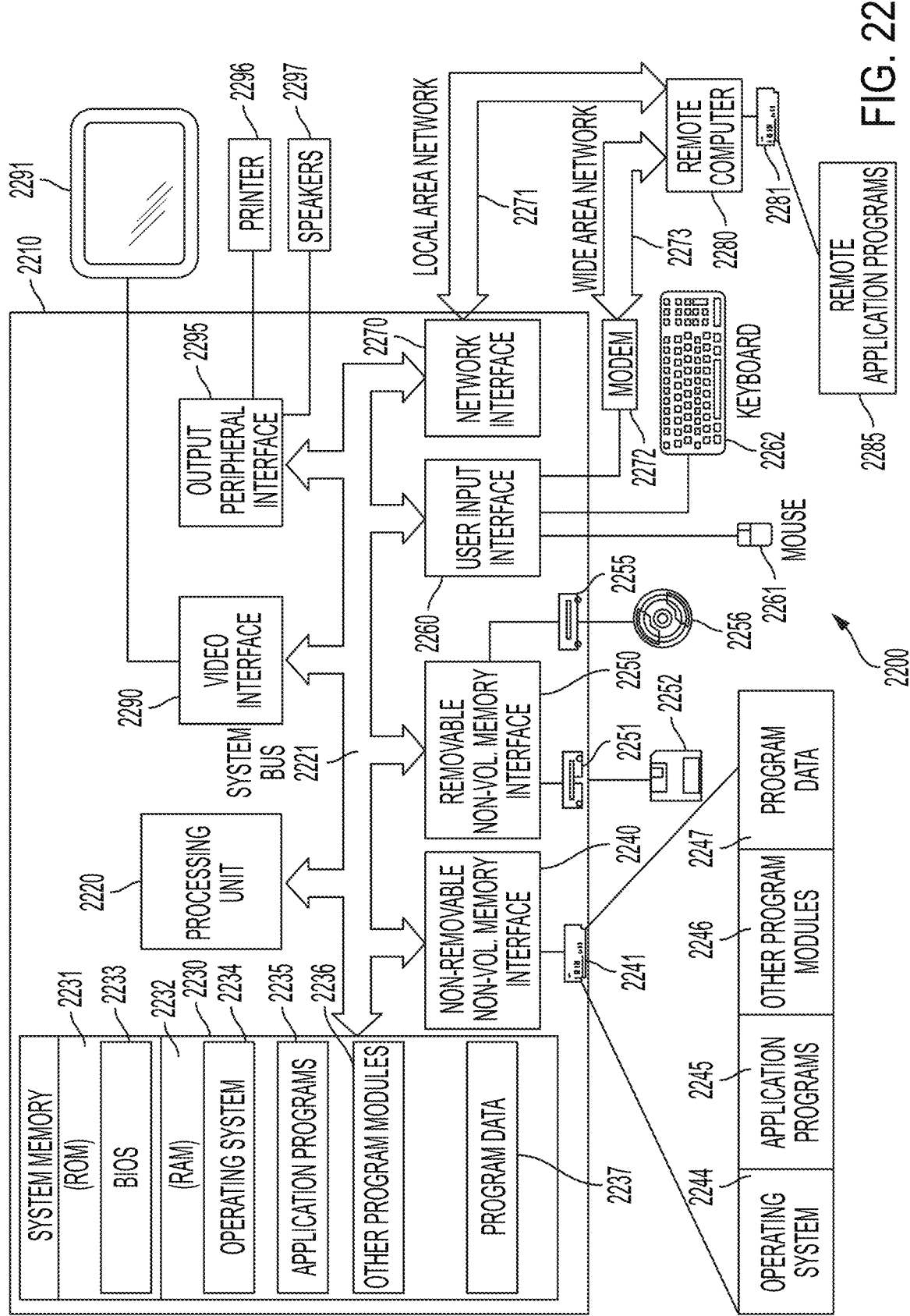
FIG. 22 is a block diagram of an illustrative computing system 2200 that may be used in implementing some embodiments of the technology described herein.

FIG. 22 illustrates an example of a suitable computing system environment 2200 on which the technology described herein may be implemented. The computing system environment 2200 is only one example of a suitable computing environment and is not intended to suggest any limitation as to the scope of use or functionality of the technology described herein. Neither should the computing environment 2200 be interpreted as having any dependency or requirement relating to any one or combination of components illustrated in the exemplary operating environment 2200.

The technology described herein is operational with numerous other general purpose or special purpose computing system environments or configurations. Examples of well-known computing systems, environments, and/or configurations that may be suitable for use with the technology described herein include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The computing environment may execute computer-executable instructions, such as program modules. Generally, program modules include routines, programs, objects, components, data structures, etc. that perform particular tasks or implement particular abstract data types. The technology described herein may also be practiced in distributed computing environments where tasks are performed by remote processing devices that are linked through a communications network. In a distributed computing environment, program modules may be located in both local and remote computer storage media including memory storage devices.

With reference to FIG. 22, an exemplary system for implementing the technology described herein includes a general purpose computing device in the form of a computer 2200. Components of computer 2210 may include, but are not limited to, a processing unit 2220, a system memory 2230, and a system bus 2221 that couples various system components including the system memory to the processing unit 2220. The system bus 2221 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (ELISA) bus, Video Electronics Standards Association (VESA) local bus, and Peripheral Component Interconnect (PCI) bus also known as Mezzanine bus.

Computer 2210 typically includes a variety of computer readable media. Computer readable media can be any available media that can be accessed by computer 2210 and includes both volatile and nonvolatile media, removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information, and which can be accessed by computer 2210. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 2230 includes computer storage media in the form of volatile and/or nonvolatile memory such as read only memory (ROM) 2231 and random access memory (RAM) 2232. A basic input/output system 2233 (BIOS), containing the basic routines that help to transfer information between elements within computer 2210, such as during start-up, is typically stored in ROM 2231. RAM 2232 typically contains data and/or program modules that are immediately accessible to and/or presently being operated on by processing unit 2220. By way of example, and not limitation, FIG. 22 illustrates operating system 2234, application programs 2235, other program modules 2236, and program data 2237.

The computer 2210 may also include other removable/non-removable, volatile/nonvolatile computer storage media. By way of example only, FIG. 22 illustrates a hard disk drive 2241 that reads from or writes to non-removable, nonvolatile magnetic media, a flash drive 2251 that reads from or writes to a removable, nonvolatile memory 2252 such as flash memory, and an optical disk drive 2255 that reads from or writes to a removable, nonvolatile optical disk 2256 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 2241 is typically connected to the system bus 2221 through a non-removable memory interface such as interface 2240, and magnetic disk drive 2251 and optical disk drive 2255 are typically connected to the system bus 2221 by a removable memory interface, such as interface 2250.

The drives and their associated computer storage media described above and illustrated in FIG. 22, provide storage of computer readable instructions, data structures, program modules and other data for the computer 2210. In FIG. 22, for example, hard disk drive 2241 is illustrated as storing operating system 2244, application programs 2245, other program modules 2246, and program data 2247. Note that these components can either be the same as or different from operating system 2234, application programs 2235, other program modules 2236, and program data 2237. Operating system 2244, application programs 2245, other program modules 2246, and program data 2247 are given different numbers here to illustrate that, at a minimum, they are different copies. An actor may enter commands and information into the computer 2210 through input devices such as a keyboard 2262 and pointing device 2261, commonly referred to as a mouse, trackball or touch pad. Other input devices (not shown) may include a microphone, joystick, game pad, satellite dish, scanner, or the like. These and other input devices are often connected to the processing unit 2220 through a user input interface 2260 that is coupled to the system bus, but may be connected by other interface and bus structures, such as a parallel port, game port or a universal serial bus (USB). A monitor 2291 or other type of display device is also connected to the system bus 2221 via an interface, such as a video interface 2290. In addition to the monitor, computers may also include other peripheral output devices such as speakers 2297 and printer 2296, which may be connected through an output peripheral interface 2295.

The computer 2210 may operate in a networked environment using logical connections to one or more remote computers, such as a remote computer 2280. The remote computer 2280 may be a personal computer, a server, a router, a network PC, a peer device or other common network node, and typically includes many or all of the elements described above relative to the computer 2210, although only a memory storage device 2281 has been illustrated in FIG. 22. The logical connections depicted in FIG. 22 include a local area network (LAN) 2281 and a wide area network (WAN) 2283, but may also include other networks. Such networking environments are commonplace in offices, enterprise-wide computer networks, intranets and the Internet.

When used in a LAN networking environment, the computer 2210 is connected to the LAN 2281 through a network interface or adapter 2280. When used in a WAN networking environment, the computer 2210 typically includes a modem 2282 or other means for establishing communications over the WAN 2283, such as the Internet. The modem 2282, which may be internal or external, may be connected to the system bus 2221 via the actor input interface 2260, or other appropriate mechanism. In a networked environment, program modules depicted relative to the computer 2210, or portions thereof, may be stored in the remote memory storage device. By way of example, and not limitation, FIG. 22 illustrates remote application programs 2285 as residing on memory device 2281. It will be appreciated that the network connections shown are exemplary and other means of establishing a communications link between the computers may be used.

Having thus described several aspects of at least one embodiment of the technology described herein, it is to be appreciated that various alterations, modifications, and improvements will readily occur to those skilled in the art.

Such alterations, modifications, and improvements are intended to be part of this disclosure, and are intended to be within the spirit and scope of disclosure. Further, though advantages of the technology described herein are indicated, it should be appreciated that not every embodiment of the technology described herein will include every described advantage. Some embodiments may not implement any features described as advantageous herein and in some instances one or more of the described features may be implemented to achieve further embodiments. Accordingly, the foregoing description and drawings are by way of example only.

The above-described embodiments of the technology described herein can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component, including commercially available integrated circuit components known in the art by names such as CPU chips, GPU chips, microprocessor, microcontroller, or co-processor. Alternatively, a processor may be implemented in custom circuitry, such as an ASIC, or semicustom circuitry resulting from configuring a programmable logic device. As yet a further alternative, a processor may be a portion of a larger circuit or semiconductor device, whether commercially available, semi-custom or custom. As a specific example, some commercially available microprocessors have multiple cores such that one or a subset of those cores may constitute a processor. However, a processor may be implemented using circuitry in any suitable format.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, aspects of the technology described herein may be embodied as a computer readable storage medium (or multiple computer readable media) (e.g., a computer memory, one or more floppy discs, compact discs (CD), optical discs, digital video disks (DVD), magnetic tapes, flash memories, circuit configurations in Field Programmable Gate Arrays or other semiconductor devices, or other tangible computer storage medium) encoded with one or more programs that, when executed on one or more computers or other processors, perform methods that implement the various embodiments described above. As is apparent from the foregoing examples, a computer readable storage medium may retain information for a sufficient time to provide computer-executable instructions in a non-transitory form. Such a computer readable storage medium or media can be transportable, such that the program or programs stored thereon can be loaded onto one or more different computers or other processors to implement various aspects of the technology as described above. As used herein, the term "computer-readable storage medium" encompasses only a non-transitory computer-readable medium that can be considered to be a manufacture (i.e., article of manufacture) or a machine. Alternatively or additionally, aspects of the technology described herein may be embodied as a computer readable medium other than a computer-readable storage medium, such as a propagating signal.

The terms "program" or "software" are used herein in a generic sense to refer to any type of computer code or set of computer-executable instructions that can be employed to program a computer or other processor to implement various aspects of the technology as described above. Additionally, it should be appreciated that according to one aspect of this embodiment, one or more computer programs that when executed perform methods of the technology described herein need not reside on a single computer or processor, but may be distributed in a modular fashion amongst a number of different computers or processors to implement various aspects of the technology described herein.

Computer-executable instructions may be in many forms, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

Various aspects of the technology described herein may be used alone, in combination, or in a variety of arrangements not specifically described in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the technology described herein may be embodied as a method, of which examples are provided herein including with reference to FIGS. 3 and 7. The acts performed as part of any of the methods may be ordered in any suitable way. Accordingly, embodiments may be constructed in which acts are performed in an order different than illustrated, which may include performing some acts simultaneously, even though shown as sequential acts in illustrative embodiments.

Further, some actions are described as taken by an "actor" or a "user". It should be appreciated that an "actor" or a "user" need not be a single individual, and that in some embodiments, actions attributable to an "actor" or a "user" may be performed by a team of individuals and/or an individual in combination with computer-assisted tools or other mechanisms.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A method for determining whether data managed by a data processing system complies with a data governance policy, the data processing system storing the data in multiple data assets each comprising one or more attribute-value pairs, the data governance policy comprising one or more data standards each indicating one or more rules that data assets have to satisfy in order to meet the data standard, the method comprising:
using at least one computer hardware processor to perform:
receiving user input indicating at least one criterion for inclusion of data assets into a first data asset collection;
generating the first data asset collection by automatically identifying, from among the multiple data assets, data assets that meet the at least one criterion;
selecting a first data standard from among the one or more data standards of the data governance policy;
associating the first data standard with the first data asset collection;
determining whether the data managed by the data processing system complies with the data governance policy at least in part by verifying whether data assets in the first data asset collection satisfy one or more rules specified by the first data standard;
receiving user input indicating at least one second criterion for inclusion of data assets into a second data asset collection;
generating the second data asset collection by automatically identifying, from among the multiple data assets, data assets that meet the at least one second criterion for inclusion of data assets into the second data asset collection;
selecting a second data standard from among the one or more data standards of the data governance policy;
associating the second data standard with the second data asset collection; and
determining whether the data managed by the data processing system complies with the data governance policy at least in part by verifying whether data assets in the second data asset collection satisfy one or more rules specified by the second data standard.

2. The method of claim 1, wherein the at least one criterion is indicative of at least one value that at least one attribute in a data asset must take on to meet the at least one criterion.

3. The method of claim 1, further comprising:
selecting a second data standard from among the one or more data standards of the data;
associating the second data standard with the first data asset collection; and
determining whether the data managed by the data processing system complies with the data governance policy at least in part by verifying whether the data assets in the first data asset collection satisfy one or more rules specified by the second data standard.

4. The method of claim 1, wherein associating the first data standard with the first data asset collection comprises:
receiving, through a graphical user interface (GUI), user input indicating selection of the first data asset collection from among a plurality of data asset collections; and
associating the first data standard with the first data asset collection in response to receiving the user input.

5. The method of claim 1, wherein associating the first data standard with the first data asset collection comprises:
receiving, through a graphical user interface (GUI), user input indicating selection of the first data standard; and
associating the first data standard with the first data asset collection in response to receiving the user input.

6. The method of claim 5, wherein the GUI displays GUI elements representing multiple data asset collections, and the user input indicates a selection of the first data asset collection by indicating a selection of one of the GUI elements.

7. The method of claim 5, wherein the GUI displays, after selection of the first data asset collection, information indicating one or more data assets that meet the at least one criterion.

8. The method of claim 5, wherein the GUI comprises an interface that allows a user to search for data assets that meet the at least one criterion.

9. The method of claim 1, further comprising:
generating a first GUI displaying a listing of at least some of the data assets in the first data asset collection;
generating a first GUI displaying information about the first data standard, the information including an indication of the first data asset collection;
receiving, through the first GUI, user input indicating a selection of a data asset in the list of the at least some data assets; and
in response to receiving the user input, generating a second GUI displaying information about the selected data asset.

10. The method of claim 1, wherein verifying whether the data assets in the first data asset collection satisfy the one or more rules indicated by the first data standard comprises automatically verifying whether the data assets satisfy the one or more rules indicated by the first data standard.

11. The method of claim 1, further comprising:
selecting a second data standard from among the one or more data standards of the data governance policy;
associating the second data standard with the first data asset collection; and
determining whether the data managed by the data processing system complies with the data governance policy at least in part by verifying whether the data assets in the first data asset collection satisfy one or more rules specified by the second data standard.

12. The method of claim 1, wherein associating the first data standard with the first data asset collection comprises storing an indication of the first data asset collection in the first data standard.

13. The method of claim 1, wherein the data managed by the data managed by the data processing system comprises information associated with data in an enterprise system.

14. A method for determining whether data managed by a data processing system complies with a data governance policy, the data processing system storing the data in multiple data assets each comprising one or more attribute-value pairs, the data governance policy comprising one or more data standards each indicating one or more rules that data assets have to satisfy in order to meet the data standard, the method comprising:
using at least one computer hardware processor to perform:
receiving user input indicating at least one criterion for inclusion of data assets into a first data asset collection;
generating the first data asset collection by automatically identifying, from among the multiple data assets, data assets that meet the at least one criterion;
selecting a first data standard from among the one or more data standards of the data governance policy;
associating the first data standard with the first data asset collection;
determining whether the data managed by the data processing system complies with the data governance policy at least in part by verifying whether data assets in the first data asset collection satisfy one or more rules specified by the first data standard; and
updating the first data asset collection using the at least one criterion prior to verifying whether the data assets in the first data asset collection satisfy the one or more rules specified by the first data standard,
wherein updating the first data asset collection using the at least one criterion comprises:
identifying at least one data asset in the multiple data assets that is not in the first data asset collection and meets the at least one criterion; and
in response to identifying the at least one data asset that meets the at least one criterion, adding the at least one data asset to the data asset collection.

15. A method for determining whether data managed by a data processing system complies with a data governance policy, the data processing system storing the data in multiple data assets each comprising one or more attribute-value pairs, the data governance policy comprising one or more data standards each indicating one or more rules that data assets have to satisfy in order to meet the data standard, the method comprising:
using at least one computer hardware processor to perform:
receiving user input indicating at least one criterion for inclusion of data assets into a first data asset collection;
generating the first data asset collection by automatically identifying, from among the multiple data assets, data assets that meet the at least one criterion;
selecting a first data standard from among the one or more data standards of the data governance policy;
associating the first data standard with the first data asset collection;
determining whether the data managed by the data processing system complies with the data governance policy at least in part by verifying whether data assets in the first data asset collection satisfy one or more rules specified by the first data standard; and
updating the first data asset collection using the at least one criterion prior to verifying whether the data assets in the first data asset collection satisfy the one or more rules specified by the first data standard,
wherein updating the first data asset collection using the at least one data asset criterion comprises:
identifying at least one data asset in the first data asset collection that no longer meets the at least one data asset criterion; and
in response to identifying the at least one data asset that does not meet the at least one data asset criterion, removing the at least one data asset from the first data asset collection.

16. A method for determining whether data managed by a data processing system complies with a data governance policy, the data processing system storing the data in multiple data assets each comprising one or more attribute-value pairs, the data governance policy comprising one or more data standards each indicating one or more rules that data assets have to satisfy in order to meet the data standard, the method comprising:
using at least one computer hardware processor to perform:
receiving user input indicating at least one criterion for inclusion of data assets into a first data asset collection;
generating the first data asset collection by automatically identifying, from among the multiple data assets, data assets that meet the at least one criterion;
selecting a first data standard from among the one or more data standards of the data governance policy;
associating the first data standard with the first data asset collection;

determining whether the data managed by the data processing system complies with the data governance policy at least in part by verifying whether data assets in the first data asset collection satisfy one or more rules specified by the first data standard, wherein verifying whether the data assets in the first data asset collection satisfy the one or more rules indicated by the first data standard comprises, for at least one of the data assets in the first data asset collection:

identifying, based on at least one attribute of the at least one data asset, a user to determine whether the at least one data asset satisfies the one or more rules indicated by the first data standard;

transmitting, to a computing device associated with the user and through a communication network, information about the at least one data asset and the first data standard; and receiving, from the computing device associated with the user through the communication network, information indicating whether the at least one data asset satisfies the one or more rules indicated by the first data standard.

17. A method for determining whether data managed by a data processing system complies with a data governance policy, the data processing system storing the data in multiple data assets each comprising one or more attribute-value pairs, the data governance policy comprising one or more data standards each indicating one or more rules that data assets have to satisfy in order to meet the data standard, the method comprising:

using at least one computer hardware processor to perform:

receiving user input indicating at least one criterion for inclusion of data assets into a first data asset collection;

generating the first data asset collection by automatically identifying, from among the multiple data assets, data assets that meet the at least one criterion;

selecting a first data standard from among the one or more data standards of the data governance policy;

associating the first data standard with the first data asset collection;

determining whether the data managed by the data processing system complies with the data governance policy at least in part by verifying whether data assets in the first data asset collection satisfy one or more rules specified by the first data standard, wherein verifying whether the data assets in the first data asset collection satisfy the one or more rules indicated by the first data standard comprises, for each particular data asset of at least some of the data assets in the first data asset collection:

identifying, based on at least one attribute of the particular data asset, a user to determine whether the particular data asset satisfies the one or more rules indicated by the first data standard;

transmitting, to a computing device associated with the user and through a communication network, information about the particular data asset and the first data standard; and receiving, from the computing device associated with the user through the communication network, information indicating whether the particular data asset satisfies the one or more rules indicated by the first data standard.

18. The method of claim 17, wherein the information indicating whether the particular data asset satisfies the one or more rules indicated by the first data standard comprises an attestation by the user as to whether the particular data asset satisfies the one or more rules indicated by the first data standard.

19. At least one non-transitory computer-readable storage medium storing processor-executable instructions that, when executed by at least one computer hardware processor, cause the at least one computer hardware processor to perform a method for determining whether data managed by a data processing system complies with a data governance policy, the data processing system storing the data in multiple data assets each comprising one or more attribute-value pairs, the data governance policy comprising one or more data standards each indicating one or more rules that data assets have to satisfy in order to meet the data standard, the method comprising:

receiving user input indicating at least one criterion for inclusion of data assets into a first data asset collection;

generating the first data asset collection by automatically identifying, from among the multiple data assets, data assets that meet the at least one criterion;

selecting a first data standard from among the one or more data standards of the data governance policy;

associating the first data standard with the first data asset collection;

determining whether the data managed by the data processing system complies with the data governance policy at least in part by verifying whether data assets in the first data asset collection satisfy one or more rules specified by the first data standard;

receiving user input indicating at least one second criterion for inclusion of data assets into a second data asset collection;

generating the second data asset collection by automatically identifying, from among the multiple data assets, data assets that meet the at least one second criterion for inclusion of data assets into the second data asset collection;

selecting a second data standard from among the one or more data standards of the data governance policy;

associating the second data standard with the second data asset collection; and determining whether the data managed by the data processing system complies with the data governance policy at least in part by verifying whether data assets in the second data asset collection satisfy one or more rules specified by the second data standard.

20. A system, comprising:

at least one computer hardware processor; and at least one non-transitory computer-readable storage medium storing processor-executable instructions that, when executed by the at least one computer hardware processor, cause the at least one computer hardware processor to perform a method for determining whether data managed by a data processing system complies with a data governance policy, the data processing system storing the data in multiple data assets each comprising one or more attribute-value pairs, the data governance policy comprising one or more data standards each indicating one or more rules that data assets have to satisfy in order to meet the data standard, the method comprising:

receiving user input indicating at least one criterion for inclusion of data assets into a first data asset collection;

generating the first data asset collection by automatically identifying, from among the multiple data assets, data assets that meet the at least one criterion;

selecting a first data standard from among the one or more data standards of the data governance policy;

associating the first data standard with the first data asset collection;

determining whether the data managed by the data processing system complies with the data governance policy at least in part by verifying whether data assets in the first data asset collection satisfy one or more rules specified by the first data standard;

receiving user input indicating at least one second criterion for inclusion of data assets into a second data asset collection;

generating the second data asset collection by automatically identifying, from among the multiple data assets, data assets that meet the at least one second criterion for inclusion of data assets into the second data asset collection;

selecting a second data standard from among the one or more data standards of the data governance policy;

associating the second data standard with the second data asset collection; and determining whether the data managed by the data processing system complies with the data governance policy at least in part by verifying whether data assets in the second data asset collection satisfy one or more rules specified by the second data standard.

\* \* \* \* \*